United States Patent
Reece et al.

(10) Patent No.: US 9,205,420 B2
(45) Date of Patent: Dec. 8, 2015

(54) NANOSTRUCTURES, SYSTEMS, AND METHODS FOR PHOTOCATALYSIS

(75) Inventors: Steven Y. Reece, Cambridge, MA (US); Thomas D. Jarvi, Manchester, CT (US)

(73) Assignee: President and Fellows of Harvard College, Cambridge, MA (US)

(*) Notice: Subject to any disclaimer, the term of this patent is extended or adjusted under 35 U.S.C. 154(b) by 568 days.

(21) Appl. No.: 13/452,258

(22) Filed: Apr. 20, 2012

(65) Prior Publication Data

US 2012/0267234 A1    Oct. 25, 2012

Related U.S. Application Data

(60) Provisional application No. 61/478,364, filed on Apr. 22, 2011, provisional application No. 61/566,078, filed on Dec. 2, 2011, provisional application No. 61/581,822, filed on Dec. 30, 2011.

(51) Int. Cl.

| | |
|---|---|
| *C01B 13/00* | (2006.01) |
| *C01B 15/00* | (2006.01) |
| *B01J 35/00* | (2006.01) |
| *B01J 23/00* | (2006.01) |
| *B01J 23/70* | (2006.01) |
| *B01J 23/74* | (2006.01) |
| *B01J 19/12* | (2006.01) |

(Continued)

(52) U.S. Cl.
CPC .............. *B01J 35/004* (2013.01); *B01J 19/127* (2013.01); *B01J 19/2475* (2013.01); *B01J 23/745* (2013.01); *B01J 35/0013* (2013.01); *B01J 35/06* (2013.01); *B82Y 30/00* (2013.01); *C01B 3/042* (2013.01); *C01B 13/0207* (2013.01); *C25B 1/003* (2013.01); *Y02E 60/364* (2013.01); *Y02E 60/368* (2013.01)

(58) Field of Classification Search
USPC ............ 204/157.5, 158.2; 977/700, 762, 773, 977/811, 840, 902; 502/335–338
See application file for complete search history.

(56) References Cited

U.S. PATENT DOCUMENTS

| 4,382,846 A | 5/1983 | Gratzel et al. |
| 6,361,660 B1 * | 3/2002 | Goldstein .................. 204/157.5 |

(Continued)

FOREIGN PATENT DOCUMENTS

WO    WO 2010/042196    4/2010

OTHER PUBLICATIONS

U.S. Appl. No. 61/073,701, filed Jun. 18, 2008, Nocera et al.

(Continued)

*Primary Examiner* — Cam N. Nguyen
(74) *Attorney, Agent, or Firm* — Wolf, Greenfield & Sacks, P.C.

(57) ABSTRACT

The present invention generally relates to nanostructures and compositions comprising nanostructures, methods of making and using the nanostructures, and related systems. In some embodiments, a nanostructure comprises a first region and a second region, wherein a first photocatalytic reaction (e.g., an oxidation reaction) can be carried out at the first region and a second photocatalytic reaction (e.g., a reduction reaction) can be carried out at the second region. In some cases, the first photocatalytic reaction is the formation of oxygen gas from water and the second photocatalytic reaction is the formation of hydrogen gas from water. In some embodiments, a nanostructure comprises at least one semiconductor material, and, in some cases, at least one catalytic material and/or at least one photosensitizing agent.

41 Claims, 12 Drawing Sheets

(51) Int. Cl.
*B01J 19/24* (2006.01)
*B01J 23/745* (2006.01)
*B01J 35/06* (2006.01)
*B82Y 30/00* (2011.01)
*C01B 3/04* (2006.01)
*C01B 13/02* (2006.01)
*C25B 1/00* (2006.01)

(56) References Cited

U.S. PATENT DOCUMENTS

| | | | |
|---|---|---|---|
| 6,723,461 | B2 | 4/2004 | Gorman et al. |
| 7,442,288 | B2 | 10/2008 | Sumita |
| 7,939,218 | B2 | 5/2011 | Niu |
| 8,202,500 | B2 * | 6/2012 | Fahs et al. ............... 204/157.15 |
| 8,829,485 | B2 * | 9/2014 | Modawar et al. ............... 257/9 |
| 2007/0084507 | A1 * | 4/2007 | Noh et al. ............... 136/263 |
| 2007/0200477 | A1 * | 8/2007 | Tuominen et al. ............. 313/309 |
| 2008/0223713 | A1 * | 9/2008 | Xu et al. ............... 204/157.15 |
| 2009/0215276 | A1 | 8/2009 | Vereecken et al. |
| 2010/0044209 | A1 | 2/2010 | Banin et al. |
| 2010/0101955 | A1 | 4/2010 | Nocera et al. |
| 2010/0179054 | A1 | 7/2010 | Swager et al. |
| 2011/0180779 | A1 * | 7/2011 | Han et al. ............... 257/13 |
| 2011/0281719 | A1 * | 11/2011 | Liu et al. ............... 502/1 |
| 2011/0297214 | A1 * | 12/2011 | Kim et al. ............... 136/255 |
| 2011/0297913 | A1 * | 12/2011 | Kim et al. ............... 257/9 |
| 2012/0027666 | A1 | 2/2012 | Hill et al. |
| 2012/0111396 | A1 * | 5/2012 | Saylor et al. ............... 136/255 |
| 2012/0145532 | A1 * | 6/2012 | Smolyakov et al. ............... 502/1 |
| 2012/0181502 | A1 * | 7/2012 | Modawar et al. ............... 257/9 |
| 2013/0118912 | A1 * | 5/2013 | Reece et al. ............... 502/1 |

OTHER PUBLICATIONS

U.S. Appl. No. 61/084,948, filed Jul. 30, 2008, Nocera et al.
U.S. Appl. No. 61/103,879, filed Oct. 8, 2008, Nocera et al.
U.S. Appl. No. 61/103,898, filed Oct. 8, 2008, Nocera et al.
U.S. Appl. No. 61/103,905, filed Oct. 8, 2008, Nocera et al.
U.S. Appl. No. 61/146,484, filed Jan. 22, 2009, Nocera et al.
U.S. Appl. No. 61/179,581, filed May 19, 2009, Nocera et al.
U.S. Appl. No. 61/187,995, filed Jun. 17, 2009, Nocera et al.
U.S. Appl. No. 61/218,006, filed Jun. 17, 2009, Nocera et al.
Abe et al., "Significant influence of solvent on hydrogen production from aqueous I3-/I-redox solution using dye-sensitized Pt/TiO2 photocatalyst under visible light irradiation," Chem. Phys. Letters, Sep. 26, 2003, 379(3-4), 230-235.
Crowley et al., "Synthesis of Metal and Metal Oxide Nanowire and Nanotube Arrays within a Mesoporous Silica Template," Chem. Mater., Sep. 9, 2003, 15(18), 3518-3522.
Kajiwara et al., "Dynamics of luminescence from Ru(bpy)/sub 3/Cl adsorbed on semiconductor surfaces," J. Phys. Chem., Nov. 11, 1982, 86(23), 4516-4522.
Leygraf et al., "Mg- and Si-doped iron oxides for the photocatalyzed production of hydrogen from water by visible light (2.2 eV ≤ hv ≤ 2.7 eV)," J. Catalysis, Dec. 1982, 78(2), 341-351.
Turner et al., "The Characterization of Doped Iron Oxide Electrodes for the Photodissociation of Water: Stability, Optical, and Electronic Properties," J. Electrochem. Soc., 1984, 131(8), 1777-1783.
Hranisavljevic et al., "Photoinduced Charge Separation Reactions of J-Aggregates Coated on Silver Nanoparticles," J. Am. Chem. Soc., Feb. 2002, 124(7), 4536-4537.
International Patent Application No. PCT/US2012/034442: International Search Report and Written Opinion dated Sep. 20, 2012, 16 pages.

* cited by examiner

Figure 1
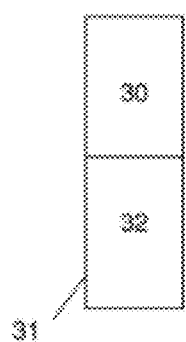
FIG. 1A
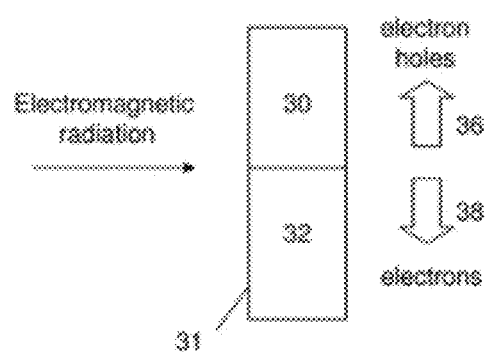
FIG. 1B
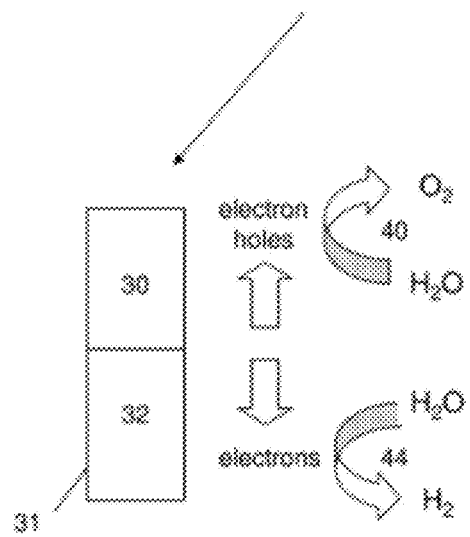
FIG. 1C

Figure 2
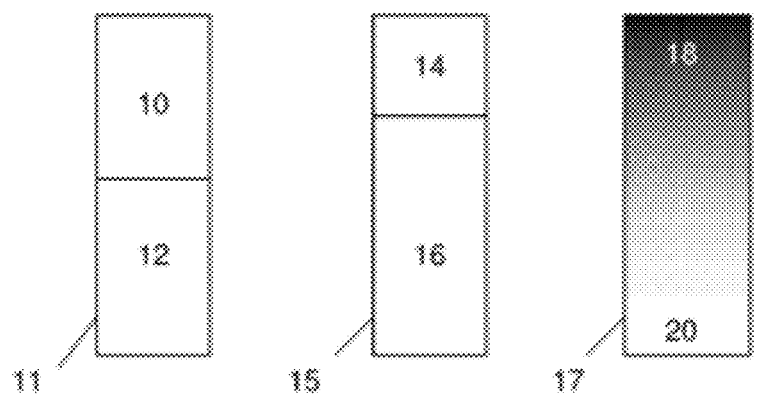
FIG. 2A  FIG. 2B  FIG. 2C
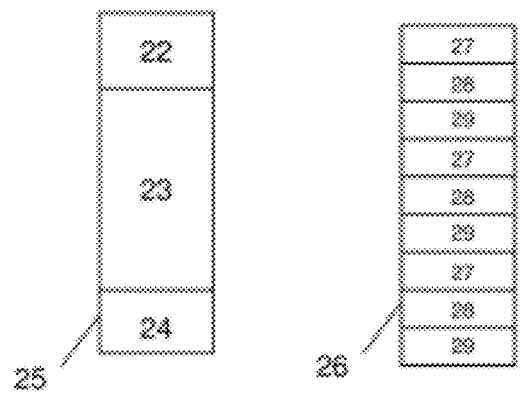
FIG. 2D  FIG. 2E

Figure 2
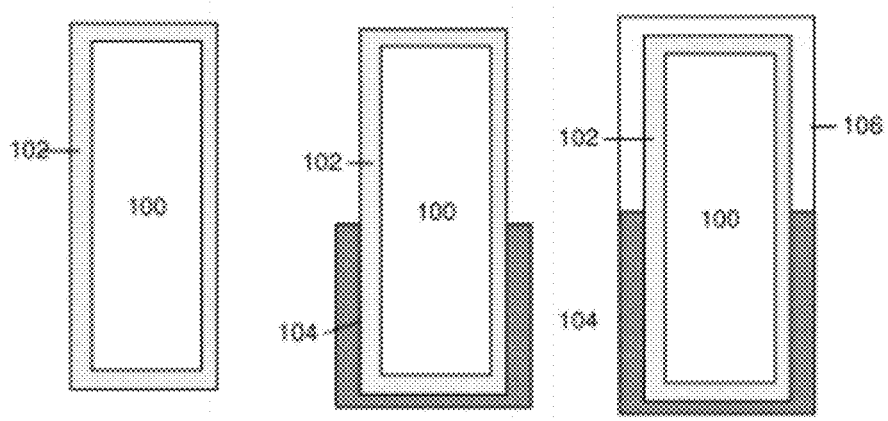
FIG. 2F  FIG. 2G  FIG. 2H
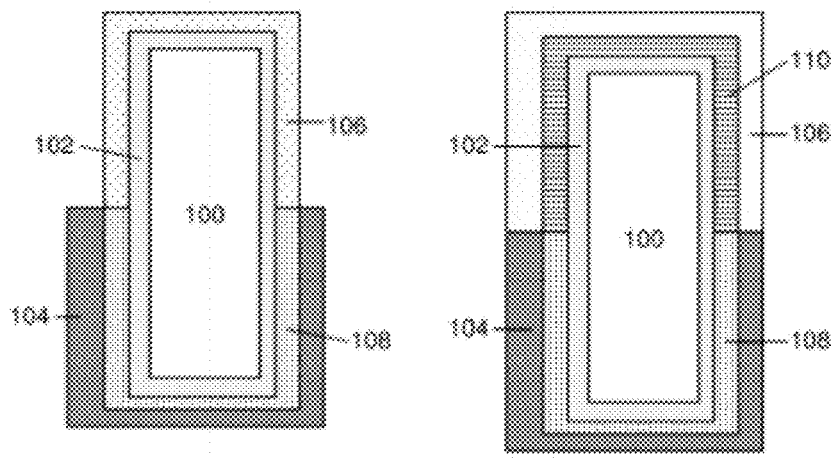
FIG. 2I  FIG. 2J

Figure 3
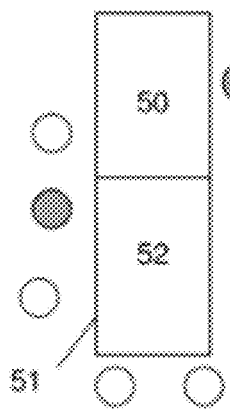
FIG. 3A
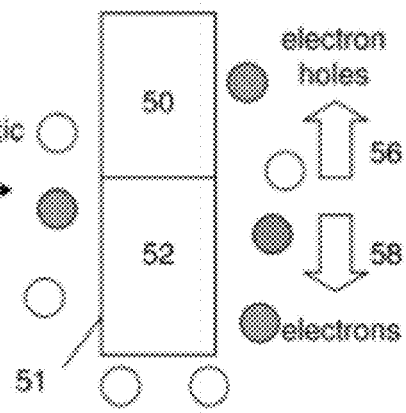
FIG. 3B
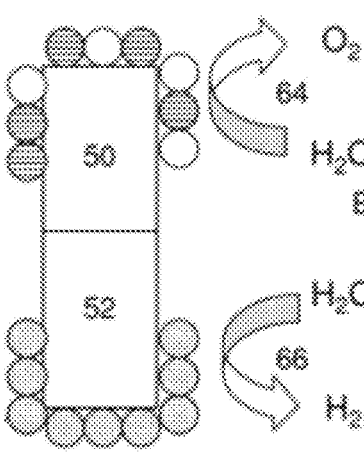
FIG. 3D
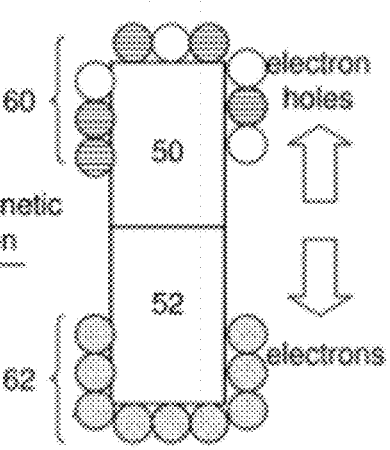
FIG. 3C

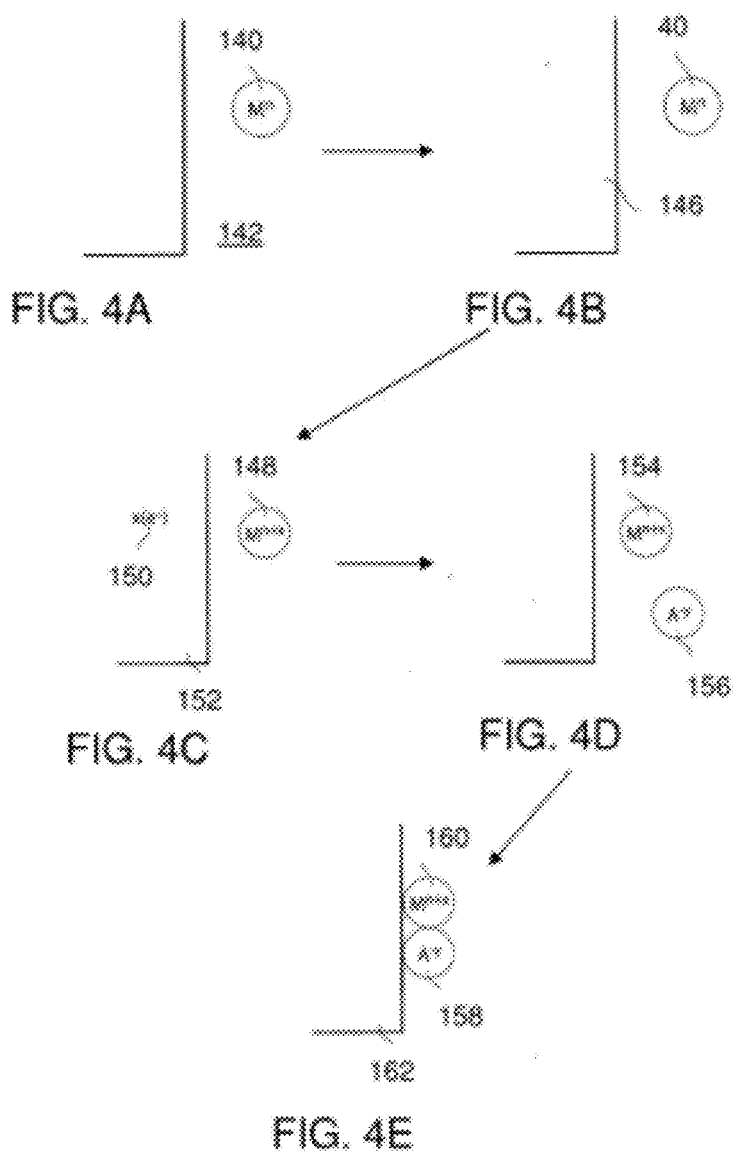

NANOSTRUCTURES, SYSTEMS, AND METHODS FOR PHOTOCATALYSIS

RELATED APPLICATIONS

This application claims priority to U.S. application 61/478,364, "Nanostructures, Systems, and Methods for Photocatalysis," filed Apr. 22, 2011; to U.S. application 61/566,078, "Systems and Methods for Photocatalytic Production of Hydrogen from Water," filed Dec. 2, 2011; and to U.S. application 61/581,822, "Materials for Photocatalytic Splitting of Water into Hydrogen and Oxygen, filed Dec. 30, 2011." All of the foregoing applications are incorporated herein by reference in their entireties for any and all purposes.

STATEMENT OF GOVERNMENT INTEREST

This invention was made with the support under government contract DE-AR0000036, awarded by the Department of Energy (DOE) Advanced Research Project Agency-Energy (ARPA-E). The government has certain rights in the invention.

FIELD OF THE INVENTION

The present invention relates to the field of nanostructures and to the field of photocatalytic reactions.

BACKGROUND OF THE INVENTION

Photocatalysis involves the use of light to overcome thermodynamic and kinetic reaction barriers in chemical reactions. The energy change associated with a given chemical reaction may be described by the Gibbs Free Energy, G. In the case where the $\Delta G$ for a reaction is positive, energy must be added to the system to accomplish the desired reaction. This energy may be provided in the form of light, and photocatalysts may be used to facilitate the conversion of photons into stored chemical energy.

A non-limiting application of this concept is the capture, conversion, and storage of solar energy through the rearrangement of chemical bonds to make fuel. Solar energy can be considered to be a carbon-neutral energy source of sufficient scale to meet future global energy demand. Thus, the conversion of sunlight into chemical fuels offers a viable mechanism for renewable energy storage and utilization. A typical photocatalytic system employs at least one photoactive composition, which, upon exposure to sunlight, produces electron/hole pairs that may be used to drive chemical reactions that store energy.

In this context, several energy storing reactions are particularly suitable, including the conversion of water to hydrogen and oxygen (i.e., "water splitting"), the conversion of nitrogen to ammonia, the conversion of hydrohalic acids to hydrogen and halide (e.g. $2HBr \rightarrow H_2 + Br_2$), and the conversion of carbon dioxide to any number hydrocarbon fuel products. Production of materials that may be used as fuels (e.g., the foregoing materials) is considered especially suitable; reduction of metals (e.g., $Ag+$ to $Ag$) is somewhat less suitable.

However, light does not readily cause each of these chemical reactions to occur and catalysts are needed to effect the overall transformation with efficiencies suitable for practical applications. Photochemical systems comprised of photocatalysts that may be suspended or dissolved in solution offer a low-cost mechanism solar energy conversion. Traditional approaches to photocatalysis have relied on the use of expensive materials and/or systems that operate with low efficiency. Therefore, a need remains for the development of novel photocatalysts comprised of low-cost materials that operate with high efficiency for solar energy conversion.

SUMMARY OF THE INVENTION

In one embodiment, the present disclosure provides nanostructures, the nanostructures suitably comprising a first region comprising a first material that catalyzes the formation of $O2$ from water; and a second region comprising a second material that catalyzes the formation of hydrogen, a reduced form of nitrogen, a reduced form of carbon dioxide, or any combination thereof, the first and second regions comprising semiconductors.

In another embodiment, the present disclosure provides nanostructures, the nanostructures comprising an iron oxide and comprising a first, n-type region and a second, p-type region.

The present disclosure also provides compositions, the compositions comprising a plurality of nanostructures as described herein. The present disclosure further provides photocatalytic devices, the photocatalytic devices comprising a plurality of nanostructures as described herein.

Also provided are method of forming systems. These methods include providing a semiconductor substrate; exposing the semiconductor substrate to a solution comprising at least one metal ionic species and an anionic species; and exposing the semiconductor substrate to electromagnetic radiation forming a first surface-presenting catalytic material comprising a reduced metal species in a first region and a second surface presenting catalytic material comprising an oxidized metal species in a second region.

Further provided are methods, the methods suitably including exposing, to electromagnetic radiation, a plurality of nanostructures, at least one of which nanostructures is a nanostructure according to the present disclosure, and catalyzing the formation of $O2$ from water.

Additionally provided are methods. These methods include exposing, to electromagnetic radiation, a plurality of nanostructures, at least one of which nanostructure is a nanostructure according to the present disclosure, and effecting a reduction reaction involving at least some of the nanostructures.

The present disclosure also provides compositions, the compositions suitably including a catalytic material that catalyzes the production of H2 from water in the presence of O2; the catalytic material being capable of catalyzing the production of H2 at a current density at least 1000 times greater than the current density for the reduction of O2 at the catalytic material, at overpotentials less negative than –400 mV for the production of H2 from water. The present disclosure also provides devices for solar energy conversion, the devices suitably including the foregoing compositions.

BRIEF DESCRIPTION OF THE DRAWINGS

Non-limiting embodiments of the present invention will be described by way of example with reference to the accompanying figures, which are schematic and are not intended to be drawn to scale. Unless indicated as representing the prior art, the figures represent aspects of the invention. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 1A-1C illustrate a non-limiting embodiment of a nanostructure of the present invention and use of the nanostructure for photocatalytic water splitting.

FIGS. 2A-2J illustrate non-limiting examples of nanostructures of the present invention.

FIGS. 3A-3D illustrate a non-limiting example of a method of the formation of a nanostructure comprising association of a first catalytic material and a second catalytic material with a first and a second region of a bulk, respectively, thereby forming a nanostructure, followed by use of the nanostructure for photocatalytic water splitting.

FIGS. 4A-4E illustrate the formation of a catalytic material on a bulk material to form a nanostructure, according to some embodiments.

Figure 5:
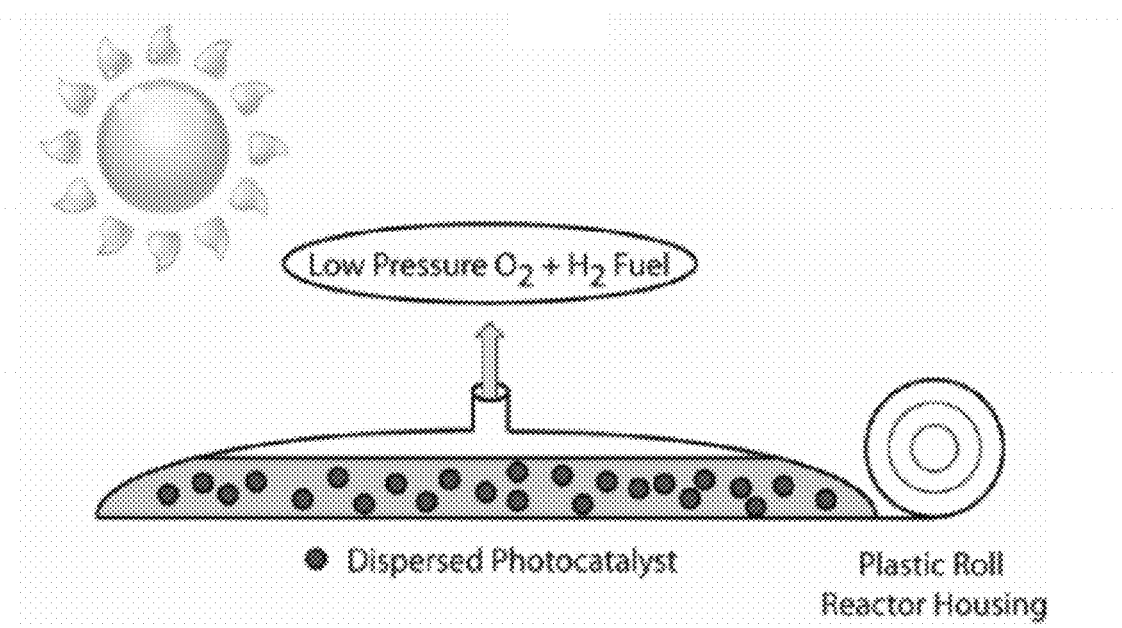
FIG. 5 depicts a dispersed photocatalyst in a plastic reactor.
Figure 6:
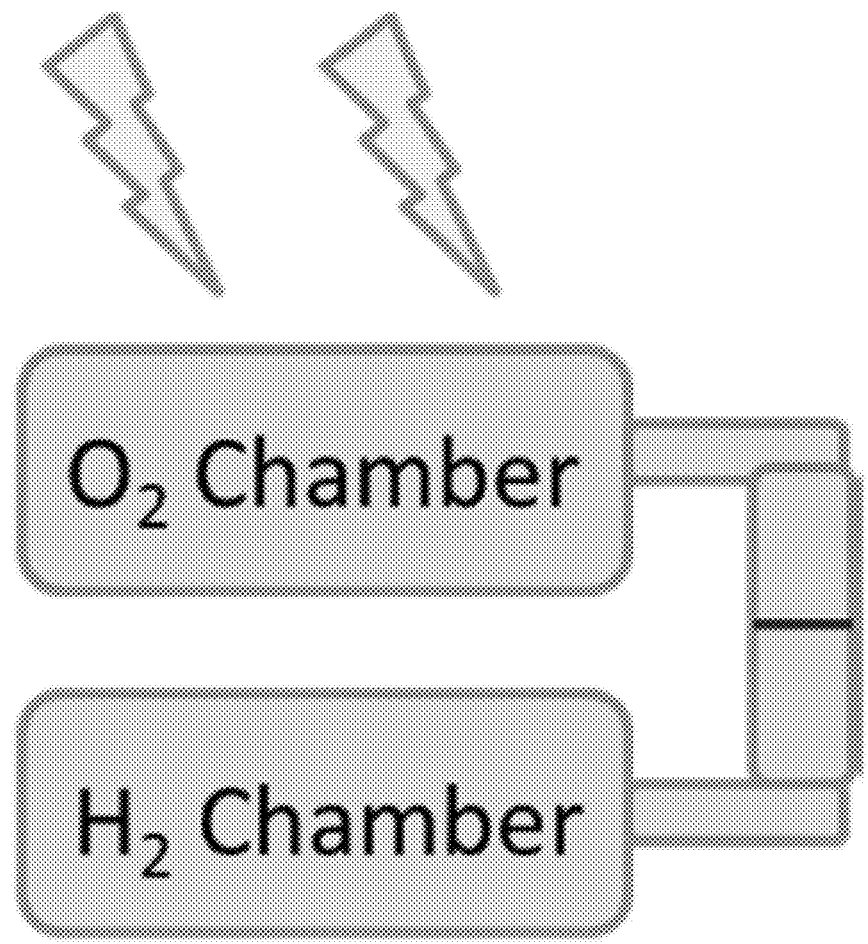
FIG. 6 depicts a tandem configuration for a two-compartment reactor design.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to nanostructures and related compositions, methods of making and using the nanostructures, and related systems. Many aspects and embodiments of the invention involve nanometer-scale articles and systems, but larger articles and systems are provided as well. The subject matter of the present invention involves, in some cases, interrelated products, alternative solutions to a particular problem, and/or a plurality of different uses of one or more systems and/or articles.

According to some aspects of the present invention, nanostructures are provided for a variety of applications. In some embodiments, the nanostructures may be used for photocatalytic reactions. Photocatalysis (e.g., involving an oxidation and/or reduction reaction) may proceed upon exposure of the nanostructures to electromagnetic radiation, without the need for an external voltage source. For example, in some cases, the nanostructures allow for the conversion of water to hydrogen gas and/or oxygen gas using at least one nanostructure and without an external power and/or energy source. Thus, energy can be stored, via a reactive pathway involving nanostructures of the invention, in the form of oxygen gas and hydrogen gas. It should be understood that a user may expose one or even a plurality of nanostructures according to any part of the present disclosure to electromagnetic radiation so as to catalyze the formation of O2 from water. In some embodiments, a user may expose one or more nanostructures according to any part of the present disclosure so as to catalyze a reduction reaction.

It should be noted that while photochemical of water splitting is discussed in many embodiments described herein, this is by no means limiting, and other photochemical reactions may be carried out using the nanostructures, compositions, methods, and systems of the present invention, as described herein. These reactions include, but are not limited to, the conversion of nitrogen to ammonia, the conversion of hydrohalic acids to hydrogen and halide (e.g. $2HBr \rightarrow H_2 + Br_2$), the conversion of methanol to hydrogen and an oxidized form of carbon, and the conversion of carbon dioxide to carbon monoxide and/or the conversion of and/or formation of any number hydrocarbon fuels (e.g., methane, ethane, etc.).

Nanostructures of the invention can comprise at least one catalytic material. The catalytic material may include a low-cost, earth-abundant material, or multiple materials of this type (and/or other materials), and the methods for forming the catalytic material may be carried out with ease. In addition, many of the methods and systems may be operated under ambient conditions (e.g., temperature, pressure) and at about neutral pH, with good efficiency. In some cases, water for photocatalysis may be supplied from an impure water source. Accordingly, because the systems can be operated under mild conditions, the system components may be greatly simplified as compared to systems which are not operated under mild conditions. For example, a photocatalytic system for water splitting may comprising a plurality of nanostructures suspended in impure water in a plastic bag, and the electrolysis may occur upon exposure of the nanostructures to sunlight. Further benefits of the nanostructures, compositions, methods, and systems are described herein.

The term "nanostructure," as used herein, refers to structures which are nanoscopic. As used herein, "nanoscopic-scale," "nanoscopic," "nanometer-scale," "nanoscale," the "nano-" prefix (for example, as in "nanostructured"), and the like, generally refers to elements or articles having widths or diameters of less than about 1 micron. The specified widths can be a smallest width (i.e. a width as specified where, at that location, the article can have a larger width in a different dimension), or a largest width (i.e. where, at that location, the article has a width that is no wider than as specified, but can have a length that is greater). Non-limiting examples of nanostructures include nanowires, nanorods, nanotubes, nanoparticles, etc., as describe herein. As described herein, a nanostructure may comprise one or more materials and/or components.

Without wishing to be bound by theory, many of the nanostructures of the present invention operate according to the following mechanism. In embodiments where a nanostructure comprising a first region and a second region is exposed to light, charge separation may occur between the first region and the second region, wherein an excess of electrons are present in the first region and an excess of holes are present in the second region. For example, for a nanostructure comprising a first region defining primarily or exclusively a first semiconductor material and a second region defining primarily or exclusively a second semiconductor material, upon exposure to electromagnetic radiation, electrons may be excited from the valence band to the conduction band in the first region (e.g., comprising an n-type semiconductor), thereby creating holes in the valence band and free electrons in the conduction band. The excited electron and corresponding electron-hole may separate spatially within the n-type semiconductor material from the point of generation. The electrons produced at the first region may be transported (e.g., via the nanostructure material) to the second region of the nanostructure (e.g., comprising a p-type semiconductor). It should be understood that embodiments where the first and second regions are both semiconductors are considered especially suitable. The first and second regions need not be the same semiconductor. The separated electron-holes may be transported to a nanostructure-electrolyte interface at each region where they may be used to carry out an electrochemical reaction, e.g., a redox reaction. For example, the holes/electrons can react with a water molecule, resulting in the formation of oxygen gas and/or hydrogen ions. As one non-limiting example, the nanostructure may include a first region that catalyzes the formation of O2 from water. The nanostructure may also include a second region that catalyzes the formation of one or more of H2, a reduced form of N2, or even a reduced form of CO2. Suitable reduced forms of N2 include NH3, NH4+ ions, N2H4, urea, and the like. Suitable reduced forms of CO2 include CO, formic acid, formate, formaldehyde, hydrocarbons, and even alcohols. Some such materials include methane, ethylene, ethanol, methanol, and the like. As another example, the holes/electrons can react with a halide ion (e.g., Br—; alternatively in the form HBr), resulting in the formation of halogen (e.g., $Br_2$; or $H_2$ and $Br_2$). Those of ordinary skill in the art will understand the mechanism described herein, and the similarities of the mechanism with those described for heterojunction photovoltaic cells or p/n-junction photovoltaic cells.

Nanostructures of the invention, whether in the form of nanorods or otherwise, in most embodiments, are composed of a bulk composition or material, and a surface-presenting catalytic material (which can be the same or different than the underlying bulk material). In some embodiments of the invention, another material, hereafter referred to as a shell material, may cover at least a portion of the surface of the bulk composition and may, in some cases, partially or fully separate the bulk material from the surface-presenting catalytic material. The bulk material, in most embodiments, is a composition including at least one type of semiconductor material.

In one aspect of the invention, the combination of the nanostructure bulk, any optional shell material, and any surface-presenting catalytic material (if different from the bulk), together, defines a nanostructure that is at least somewhat non-uniform with respect to semiconductor characteristic, and/or becomes at least somewhat non-uniform upon exposure to electromagnetic radiation. For example, in some embodiments, the nanostructure comprises a semiconductor material with dopants which are primarily n-type in nature in a first region and dopants which are primarily p-type in nature in a second region. For example, where the nanostructure is a nanorod, one region (e.g., end) of the nanorod can exhibit more n-type dopants with a second region (e.g., the other end) exhibiting more p-type dopants.

"Bulk" in this context, means a majority of the mass of the nanostructure including, or excluding, a small region near the surface of the nanostructure. E.g., the bulk can define at least 60%, 70%, 80%, 90%, or greater the mass of the nanostructure, typically the central portion of the nanostructure extending outwardly toward the surface. Those of ordinary skill in the art will readily understand the meaning of this term from this definition and as it is used in the context of the description of this invention.

In one set of embodiments, the makeup of the bulk composition of the nanostructure defines a non-uniform semiconductor characteristic. In one embodiment, the nanostructure includes two relatively discrete sections, one comprising a primarily n-type semiconductor material and the other comprising a primarily p-type semiconductor material, with a relatively abrupt transition between those two semiconductor materials. For example, a nanorod can be made up of essentially uniform n-type semiconductor material along a portion of its length and then, relatively abruptly, the material can shift to p-type semiconductor material and remain relatively uniformly p-type semiconductor material for the remainder of its length. In other arrangements, a transition between any n-type or p-type semiconductor material is not abrupt and the structure defines a first section of relatively uniform n-type semiconductor material, a second section of relatively p-type semiconductor material, and an intermediate section involving different material or a transition, gradual, or otherwise, between the n-type and p-type semiconductor material sections. In another arrangement, various sections of nanostructure bulk can exist, with different characteristics of any number of them, so long as, overall, the nanostructure exhibits primarily n-type dopants at one section and primarily p-type dopants at a different section. In another arrangement the nanostructure bulk is primarily (but not exclusively) p-type at one end, primarily (but not exclusively) n-type at another end, with a transition between those ends from n-type to p-type where the transition can represent a mixture of the two semiconductor types in changing ratio along the pathway from the first end to the second end. The transition can be linear (i.e., essentially consistently gradual) or can be non-linear as would be understood by those of ordinary skill in the art. Those of ordinary skill in the art will recognize that in addition to this description, the invention contemplates any number of other arrangements of n-type and p-type material within the bulk of the nanostructure that provide a result suitable for use in the invention.

In some embodiments the bulk material may be silicon with a dopant or dopants (e.g. germanium), the concentration of which varies from one end or region of the nanostructure to another end or region of the nanostructure. In some arrangements, the changes in concentration may be abrupt, such as in a multi junction Si nanorod, between neighboring regions of the nanostructure. In another embodiment, the changes in concentration of the dopant may vary smoothly or in a more linear fashion from one region of the nanostructure to another region. For non-limiting examples of compositions suitable for use as a bulk material, see FIGS. 2A-2E and additional configurations described herein.

Moreover, in the description above, any number of materials can substitute from n-type and/or p-type semiconductor material so long as the bulk (in this set of embodiments in which bulk composition varies) can be used to establish a nanostructure particle allowing different photocatalytic reactions to occur at different sections of the nanostructure. For example, in the section described above, the first region may comprise a first type of semiconductor material and the second region may comprise a second type of semiconductor material, wherein the first type of semiconductor material and the second type of semiconductor materials do not differ only by the dopant (e.g., the materials are not simply a semiconductor material doped with a first dopant to produce the n-type material and the same or essentially similar semiconductor material doped with a second dopant to produce a p-type material). In one embodiment, the first type of semiconductor material may be CdSe and the second type of semiconductor material may be CdS.

In the description above, there need not be a significant transition between the bulk of the nanostructure and surface-presenting catalytic material of the nanostructure. I.e., there can be a transition from one section of the nanostructure to another in terms of composition (as described) but with the surface being essentially similar to that of the underlying bulk. In another set of embodiments one or more sections of the nanostructure can include a surface-presenting catalytic material that is significantly different than that of the bulk. In one set of embodiments, the bulk of the nanostructure can be essentially homogeneous throughout, without the different n-type/p-type regions as described above, but where one section of the nanostructure includes more surface-presenting catalytic material, or a different surface-presenting catalytic material than another. For example, a nanorod can have an essentially uniform bulk with one end (e.g., a first region) of the nanorod having a surface-presenting catalytic material that is present in less quantity, or essentially absent from the other end (e.g., a second region) of the nanorod. In another embodiment within this category, one end (e.g., a first region) of the nanorod can carry a first surface-presenting catalytic material and the other end (e.g., a second region) of the nanorod can carry a second, different, surface-presenting catalytic material. In another embodiment the entire nanorod can include, uniformly or nonuniformly, a surface-presenting catalytic material that differs in composition across the nanostructure, e.g., the nanostructure might include a first material and a second material (and, optionally, additional materials) with the first material present predominantly at a first section (e.g., a first region) of the nanostructure surface and a second material present predominantly at a second section (e.g., a second region) of the nanostructure surface with a mixture of the first and second materials present at a third section of the nanostructure surface. In one embodiment within this category, the mixture of the first and second materials can exist essentially throughout the surface of the nanostructure but in different ratios such that the first material is more prevalent at one section or region (e.g., one end) of the nanostructure and the second material is more prevalent at another section or region (e.g., the opposite end) of the nanostructure.

The first and second materials can be catalytic materials that catalyze different oxidation and/or reduction reactions, respectively, and/or can be materials which can attract and/or bind, in later synthetic steps and/or within a photocatalytic reaction itself, catalytic materials. As noted, the first and/or second materials can be both provided (optionally in combination with other materials), or one material only can be provided, distributed disproportionately at one section of the surface of the nanostructure. This arrangement of surface-presenting catalytic materials can be provided, as described, upon an essentially uniform bulk nanostructure, or in combination with a nanostructure bulk that differs in composition as described above. For example, the bulk of the nanostructure can include one section or region (e.g., one end) that is predominantly an n-type semiconductor material and another section or region (e.g., another end) that is predominantly a p-type semiconductor material, and one or both of the n-type and/or p-type sections can carry a surface-presenting catalytic material that is different from the majority of the n-type and/or p-type bulk. Surface-presenting catalytic materials are described herein, and in some cases, may comprise photosensitizing agent and/or a catalytic material As noted, an optional shell material can be provided between the bulk of the nanostructure and any surface-presenting catalytic material. The shell can be selected to provide any of a variety of functionalities, as will be understood by those of ordinary skill in the art upon reading the description of this invention, which may be advantageous in carrying out the invention. For example, the shell can be made of material selected to inhibit corrosion of a bulk semiconductor material of the nanostructure. A variety of such materials can be used for the shell, as those of ordinary skill in the art would understand. In some embodiments the shell may be a semiconductor material that is transparent to visible light, including, but not limited to, $TiO_2$, $SrTiO_3$, ZnO, indium tin oxide (ITO), fluorine tin oxide (FTO), $CeO_2$, $SiO_2$, In another embodiment, the shell may be a polymer that is transparent to visible light, such as PTFE.

In a particular embodiment, a shell of titanium dioxide that covers portions of the nanostructure bulk, i.e., which separates portions of the semiconductor bulk from a surrounding medium and/or from a surface-presenting catalytic material, can be selected. In one arrangement the shell coats portions or all of the nanostructure bulk. In such an arrangement, for example, a semiconductor bulk can be presented (e.g., comprising a predominantly n-type semiconductor material in a first region or section and a predominantly p-type semiconductor material is a second region or section) and coated with a shell of titanium dioxide or other material selected to prevent corrosion of the semiconductor materials. Surface-presenting catalytic material can exist upon one or more sections of the shell, as described above with respect to the arrangement to surface-presenting catalytic materials on sections of the bulk material. In such arrangements, the shell may be selected to be of a composition and thickness so as to be sufficiently transparent to electromagnetic radiation at a wavelength that activates catalytic activity of the bulk nanostructure material, and of a conductivity that allows electron and/or hole transport between the bulk nanostructure material, across the shell to a surface-presenting catalytic material, if present, wherein the material selected provide parameters which are sufficient to allow the nanostructure (and any surface-presenting catalytic materials which are present) to carry out photocatalysis as described herein. In one set of embodiments, the shell is selected, both in material composition and thickness, to be transparent in a direction orthogonal to the surface to electric magnetic radiation at a wavelength promoting photocatalysis in an amount of at least 50%, 60%, 70%, 80%, or 90% transmittance.

Non-limiting examples of suitable arrangements for a nanostructure of the present invention are shown in FIGS. 2F-2J. It should be understood, that each of the bulk materials 100 in FIGS. 2F-2J may comprise a single or any number of combinations of materials, for example, those described throughout the specification, included those depicted in FIGS. 2A-2E. It is also to be understood that a shell material is optional in each case, and may or may not completely or evenly coat the bulk of the nanostructure. Further, where surface-presenting catalytic materials are illustrated, they can but need not define a relatively even coating on the bulk and/or on the shell.

FIG. 2F is an illustration of one embodiment, including a nanostructure comprising bulk material 100 and shell material 102. FIG. 2G is an illustration of an embodiment including a nanostructure comprising bulk material 100, shell material 102, and first type of catalytic material 104. FIG. 2G is a non-limiting illustration of a nanostructure comprising bulk material 100, shell material 102, first type of catalytic material 104, and second type of catalytic material 106. FIG. 2H is a non-limiting illustration of a nanostructure comprising bulk material 100, shell material 102, first type of catalytic material 104, second type of catalytic material 106, and first type of photosensitizing agent 108 provide between first type of catalytic material 104 and shell material 102. FIG. 2J is a non-limiting illustration of a nanostructure comprising bulk material 100, shell material 102, first type of catalytic material 104, second type of catalytic material 106, first type of photosensitizing agent 108 provided between first type of catalytic material 104 and shell material 102, and second type of photosensitizing agent 110 provided between second type of catalytic material 106 and shell material 102. It should be understood, that the arrangements depicted in FIGS. 2F-2J are in no way limiting, and other suitable arrangements will be understood by those of ordinary skill of the art. For example, another suitable arrangement includes the nanostructure depicted in FIG. 2J, without the inclusion of shell 102. It should be also understood, that while they boundaries of the various components in FIGS. 2F-2J are depicted as blunt, this is by no means limiting, and similar arrangements may be provided where at least some or all of the boundaries are blended or gradual.

Any or all of the above arrangements can be used alone or in combination. For example, the bulk material can be essentially homogenous or can include separate materials and/or sections, a shell can be used but need not be, and the nanostructure can include one or more surface-presenting catalytic materials different from the bulk of the nanostructure. Where surface-presenting catalytic materials are used, they need not coat the nanostructure in a way that would separate the bulk of the nanostructure from a surrounding medium, but can be provided in a island-like manner, a pattern, or otherwise partially (or fully) cover the bulk nanostructure.

Those of ordinary skill in the art will be aware of methods and techniques to determine the components of a nanostructure. For example, in some embodiments, the element composition of a nanostructure may be assessed using electron microscopy (e.g., transmission electron microscopy) in combination with energy dispersive x-ray spectroscopy.

In some embodiments, a nanostructure as described herein may be used for photocatalysis. As used herein, the term "photocatalysis" refers to a process of the acceleration of a photoreaction in the presence of a photocatalyst. In some embodiments, a nanostructure as described herein may be used for the photoelectrolysis of water (or other materials), and in some cases, covert light to electrical energy. In some cases, the nanostructure may solely use solar energy (e.g., sunlight) as the power source. "Electrolysis," as used herein, refers to the use of an electric current to drive an otherwise non-spontaneous chemical reaction. For example, in some cases, electrolysis may involve a change in redox state of at least one species and/or formation and/or breaking of at least one chemical bond, by the application of an electric current. Electrolysis of water can involve splitting water into oxygen gas and hydrogen gas, or oxygen gas and another hydrogen-containing species, or hydrogen gas and another oxygen-containing species, or a combination. "Photoelectrolysis" utilizes electromagnetic radiation to drive an otherwise non-spontaneous chemical reaction. That is, photoelectrolysis is the conversion of light into a current, and then the division of a molecule using that current.

The term "oxidation-reduction reaction" means a chemical reaction between two species involving the transfer of at least one electron from one species to the other species. This type of reaction is also referred to as a "redox reaction." The oxidation portion of the reaction involves the loss of at least one electron by one of the species, and the reduction portion involves the addition of at least one electron to the other species.

A non-limiting example of a nanostructure which may be utilized in a photocatalytic reaction is illustrated in FIG. 1. FIG. 1A illustrates nanostructure (e.g., nanorod) 31 comprising first region 30 and second region 32. In this non-limiting embodiment, the nanostructure comprising a bulk material having first region 30 comprising an n-type semiconductor material and second region 32 comprising a p-type semiconductor material. Upon exposure of electromagnetic radiation, holes propagate to the n-type semiconductor material, as indicated by arrow 36 and electrons propagate to the p-type semiconductor material, as indicated by arrow 38, as shown in FIG. 1B. The holes in the n-type semiconductor material may be used for an oxidation reaction, for example, the production of oxygen gas from water, as indicated by arrow 40 in FIG. 1C, and the electrons in the p-type semiconductor material may be used for a reduction reaction, for example, the production of hydrogen gas from water, as indicated by arrow 44 in FIG. 1C. Other suitable reduction reactions include the formation of H2, the reduction of CO2, the reduction of N2, and the like.

As noted above, in some embodiments, a bulk material may comprise two or more regions having different compositions. As used herein, regions differing in composition may comprise different materials or elements, phases or crystallographic orientations or other structural differences so as to provide different behavior, or they may comprise the same materials or elements, but at different ratios or concentrations. Each region may be of any size or shape within the bulk material. As an Example, FIG. 2A illustrates bulk material (e.g., nanorod) 11 having first region 10 and second region 12 of approximately equal lengths and sizes, wherein the junction between the first and second region is abrupt. FIG. 2B illustrates bulk material (e.g., nanorod) 15 having a first region 14 and second region 16 having different sizes and lengths, wherein the junction between the first region and the second region is abrupt. FIG. 2C illustrates bulk material (e.g., nanorod) 17 having a gradual change between first region 18 and second region 20. In embodiments where two regions are present, generally, the first region and the second region are in physical contact with one another. It should be understood however, that in some embodiments, a bulk material may comprise more than two regions. For example, the first region and the second region may be separated by a third region, wherein the third region comprises a material (e.g., a conductive material) which allows for electrical communication between the first region and the second region. For example, as illustrated in FIG. 2D, bulk material (e.g., nanorod) 25 comprises first region 22, second region 24, and third region 26. In yet another embodiment, the bulk material may comprise a plurality of regions (e.g., in the case of a multi junction semiconductor substrate). For example, as illustrated in FIG. 2E, bulk material (e.g., nanorod) 26 comprises a multi junction layout (e.g., multi junction or triple-junction silicon), where areas 27 comprise an n-type semiconductor material, areas 28 comprise a i-type semiconductor material, and areas 29 comprise a p-type semiconductor material.

In some embodiments, the bulk material comprises a semiconductor material. In some embodiments, the bulk material comprises a single or substantially uniform semiconductor material. In some embodiments, the bulk material comprise more than one type of semiconductor material. For example, in some cases, the first region of a bulk material comprises a first type of semiconductor material and the second region of a bulk material comprises a second type of semiconductor material. In some cases, the first type of semiconductor material and the second type of semiconductor material comprise similar types of semiconductor materials, but the first region comprises the semiconductor material which has been n-doped and the second region comprises the semiconductor material which has been p-doped. In some cases, the first type of semiconductor material and the second type of semiconductor materials are different (e.g., are not an n-type doped and a p-typed doped version of a single semiconductor material). In either case, the materials may be selected such that a junction (e.g., a heterojunction or a p/n-junction, as described herein) is formed between the first region and the second region.

Junctions may form between two or more different semiconductor materials of a bulk material. In one set of embodiments, the junction is a p/n-junction, wherein the bulk material is provided comprising a first region and a second region, wherein the first region comprises an n-type semiconductor material and the second region comprises a p-type semiconductor material. That is, the bulk material comprises a semiconductor material, wherein a first portion of the semiconductor material is doped with an n-type element and a second portion of the semiconductor material is doped with a p-type element material. Doping is described in more detail herein. In some cases, the nanostructure comprises two different semiconductor materials, and a heterojunction is formed. Other non-limiting examples of junctions are p/p junctions, n/n junctions, p/i junctions (where i refers to an intrinsic semiconductor), n/i junctions, i/i junctions, and the like.

In certain embodiments of the invention, bulk material having more than one junction between two regions having different compositions are also contemplated. For example, a nanostructure may have 2, 3, 4, or more overlap regions. The number of periods and the repeat spacing may be constant or varied during growth. For example, in some embodiments, the bulk semiconductor material comprises a multiple junctions, for example a triple junction. In a particular embodiment, the bulk material comprises a triple junction silicon nanostructure (e.g., nanorod). Multi junction materials will be known to those of ordinary skill in the art.

The regions of the bulk material may be distinct from each other with minimal cross-contamination, or the composition of the bulk material may vary gradually from one region to the next. The regions may be both longitudinally arranged relative to each other, or radially arranged (e.g., as in a core/shell arrangement) on the bulk material.

In some embodiments, the junction between two differing regions may be "atomically-abrupt," where there is a sharp transition at the atomic scale between two adjacent regions that differ in composition. However, in other embodiments, the junction between two differing regions may be more gradual. For example, the "overlap region" between the adjacent regions can comprise a few nanometers wide, for example, less than about 10 nm, less than about 20 nm, less than about 40 nm, less than about 50 nm, less than about 100 nm, or less than about 500 nm. In certain embodiments, the overlap region between a first region having a composition and a second region having a composition different from the first region (i.e., different concentrations or different species) can be defined as the distance between where the composition of the overlap region ranges between about 10 vol % and about 90 vol % of the composition of the first region, with the remainder having a complementary amount of the composition of the second region.

Semiconductor materials will be known to those of ordinary skill in the art. Non-limiting examples of semiconductor materials include $TiO_2$, $WO_3$, $SrTiO_3$, $TiO_2$—Si, $BaTiO_3$, $LaCrO_3$—$TiO_2$, $LaCrO_3$—$RuO_2$, $TiO_2$—$In_2O_3$, GaAs, GaP, p-GaAs/n-GaAs/p$Ga_{0.2}In_{0.48}P$, AlGaAs/Si$RuO_2$, PbO, $FeTiO_3$, $KTaO_3$, $MnTiO_3$, $SnO_2$, $Bi_2O_3$, $Fe_2O_3$ (including hematite), ZnO, CdS, $MoS_2$, CdTe, CdSe, CdZnTe, ZnTe, HgTe, HgZnTe, HgSe, ZnTe, ZnS, HgCdTe, HgZnSe, Si, etc., or composites thereof. The semiconductor material may be provided in any suitable morphology or arrangement. In some embodiments, the semiconductor material is a metal oxide and/or metal hydroxide. In some cases, the semiconductor material is not silicon oxide and/or hydroxide. In some embodiments, the semiconductor material is an iron oxide and/or iron hydroxide. Those of ordinary skill in the art will be aware of methods and techniques for preparing a bulk material in a chosen form, and methods are described herein In some cases, a semiconductor material may be doped. As will be understood by those of ordinary skill in the art, doping refers to the process of introducing impurities into a pure semiconductor to change its electrical and/or physical properties. In some embodiments, each region of the bulk material (e.g., nanorod) may be doped or essentially undoped, i.e., the region of the bulk material (e.g., nanorod) does not contain dopant at a concentration that is sufficient to produce a significant fraction of the charge carriers within the bulk material (e.g., nanorod). For example, a dopant may be present in an essentially undoped amount such that about 80%, about 90%, about 95%, or nearly 100% of the charge carriers within the bulk material (e.g., nanorod) do not arise from dopant. In some cases, there are no dopants present in a region of a bulk material (e.g., nanorod) at a detectable level. If a dopant is present, the dopant may be, for example, a solid solution of various elemental semiconductors. In some cases, a dopant is present in an amount of or in an amount of at least about 1 atom %, about 2 atom %, about 3 atom %, about 4 atom %, about 5 atom %, about 10 atom %, about 20 atom %, about 30 atom %.

In some cases, a semiconductor material may be doped with an n-type element, where the n-type element is capable of providing extra conduction electrons to the host material. In some cases, a semiconductor material may be doped with a p-type element, wherein the p-type element is capable of increasing the number of free charge carriers in the semiconductor material. Those of ordinary skill in the art will be able to select appropriate dopants based upon the desired semiconductor properties. For example, $TiO_2$ may be doped with Y, V, Mo, Cr, Cu, Al, Ta, B, Ru, Mn, Fe, Li, Nb, In, Pb, Ge, C, N, S, Si, etc.

In some embodiments, the dopant or the semiconductor may include mixtures of Group IV elements, for example, a mixture of silicon and carbon, or a mixture of silicon and germanium. In other embodiments, the dopant or the semiconductor may include a mixture of a Group III and a Group V element, for example, BN, BP, BAs, MN, AlP, AlAs, AlSb, GaN, GaP, GaAs, GaSb, InN, InP, InAs, or InSb. Mixtures of these may also be used, for example, a mixture of BN/BP/BAs, or BN/AlP. In other embodiments, the dopants may include alloys of Group III and Group V elements. For example, the alloys may include a mixture of AlGaN, GaPAs, InPAs, GaInN, AlGaInN, GaInAsP, or the like. In other embodiments, the dopants may also include a mixture of Group II and Group VI semiconductors. For example, the semiconductor may include ZnO, ZnS, ZnSe, ZnTe, CdS, CdSe, CdTe, HgS, HgSe, HgTe, BeS, BeSe, BeTe, MgS, MgSe, or the like. Alloys or mixtures of these dopants are also possible, for example, (ZnCd)Se, or Zn(SSe), or the like. Additionally, alloys of different groups of semiconductors may also be possible, for example, a combination of a Group II-Group VI and a Group III-Group V semiconductor, for example, $(GaAs)_x(ZnS)_{1-x}$. Other examples of dopants may include combinations of Group IV and Group VI elements, such as GeS, GeSe, GeTe, SnS, SnSe, SnTe, PbO, PbS, PbSe, or PbTe. Other semiconductor mixtures may include a combination of a Group I and a Group VII, such as CuF, CuCl, CuBr, Cut, AgF, AgCl, AgBr, AgI, or the like.

For Group IV dopant materials, a p-type dopant may be selected from Group III, and an n-type dopant may be selected from Group V, for example. For silicon semiconductor materials, a p-type dopant may be selected from the group consisting of B, Al and In, and an n-type dopant may be selected from the group consisting of P, As and Sb. For Group III-Group V semiconductor materials, a p-type dopant may be selected from Group II, including Mg, Zn, Cd and Hg, or Group IV, including C and Si. An n-type dopant may be selected from the group consisting of Si, Ge, Sn, S, Se and Te. It will be understood that the invention is not limited to these dopants, but may include other elements, alloys, or materials as well.

In an exemplary embodiment, a bulk material (or nanostructure) of the present invention comprises iron oxide (e.g., $Fe_2O_3$). In a particular embodiment, the iron oxide may be alpha-$Fe_2O_3$, also known as hematite. The iron oxide may comprise a first region and a second region. For example, a nanostructure may comprise a first region comprising an n-type iron oxide and a second region comprising a p-type iron oxide. For example, the first region may comprise iron oxide doped with Ta, Zr, In, Sb, or Si, etc., and the second region may comprise iron oxide doped with Mg, Ca, Ti, Mn, Co, Ni, Sn, or Zn, etc.

In some cases, a semiconductor material may be selected to have an appropriate band gap. As will be know to those of ordinary skill in the art, if a band gap of a semiconductor material is too small, the semiconductor may be unstable. On the other hand, if the band gap is too large, the semiconductor may not be capable of efficiently absorbing light energy. Accordingly, in some cases, the band gap of the semiconductor material(s) may be selected such that the material(s) advantageously absorb(s) a sufficient fraction of solar energy. The semiconductor materials may be selected such that the band gap is between about 1.0 eV and about 3.0 eV, between about 1.0 eV and about 2.5 eV, between about 1.5 eV, and about 2.5 eV, between about 1.7 eV and about 2.3 eV, between about 1.8 eV and about 2.2 eV, between about 1.2 and about 1.8 eV, between about 1.4 and about 1.8 eV, between about 1.5 and about 1.7 eV, or is about 2.0 eV. In some cases, the bad gap is less than about 2.0 eV.

As will be known by those of ordinary skill in the art, the band gap of a material is the energy difference between the top of the valence band and the bottom of the conduction band. If a photon has energy greater than or equal to the band gap of the material, then electrons can form in the conduction band and holes can form in the valence band, related by the following Equation 1:

$$h\nu \rightarrow e' + h\cdot \quad (1)$$

where h is Planck's constant, v is the frequency of the photon, e' is an electron, and h· is an electron hole. In many instances, without an electric field or bias (e.g., provided through doping of the semiconductor material and/or through the application of an external voltage) the electron and the hole may recombine. Advantageously, many embodiments of the present invention avoid this challenging problem, as described herein, for example, through use of catalytic materials. For example, the use of catalytic material(s) may reduce the number of holes and electrons that recombine prior to participation in a reaction.

In some embodiments, the process that takes place at a first region is shown in Equation 2.

$$4h\cdot + H_2O \text{ (liquid or gas)} \rightarrow > O_2 \text{ (gas)} + 4H^+ \quad (2)$$

The process shown in Equation 2, in some cases, may take place at the first region (e.g., comprising an n-type semiconductor material). This process produces oxygen gas which may be released, stored, and/or used in various systems/methods. The electrons and the hydrogen ions may combine at the second region (e.g., comprising a p-type semiconductor material) to form hydrogen gas, as shown in Equation 3.

$$2H^+ + 2e' \rightarrow H_2 \text{ (gas)} \quad (3)$$

The overall reaction that takes place is shown in Equation 4.

$$4h\nu + H_2O \text{ (liquid or gas)} \rightarrow O_2 \text{ (gas)} + 2H_2 \text{ (gas)} \quad (4)$$

The overall reaction can occur if the energy of the photons absorbed by the first electrode is equal to or greater than the electric potential difference for the reaction, E ($= E°_r - E°_o$, where $E°_r$ and $E°_o$ are the standard reduction potentials for the reduction and oxidation half-reactions, respectively). Half-reactions of interest (e.g., reactions which may be carried out using the methods and systems described herein), along with their standard reduction potential relative to the normal hydrogen electrode (NHE) are listed below:

| Half-Reaction | E°/V vs. NHE |
|---|---|
| $2H^+ + 2e^- \rightarrow H_2$ | 0 |
| $O_2 + 4e^- + 4H^+ \rightarrow 2H_2O$ | 1.23 |
| $Br_{2(aq)} + 2e^- \rightarrow Br_2$ | 1.098 |
| $N_{2(g)} + 8H^+ + 6e^- \rightarrow 2NH_4^+$ | 0.274 |
| $CO_{2(g)} + 2H^+ + 2e^- \rightarrow CO_{(g)} + H_2O$ | −0.1038 |
| $CO_{2(g)} + 2H^+ + 2e^- \rightarrow HCO_2H$ | −0.114 |

In some cases, the semiconductor materials comprised in the bulk material may be selected, at least in part, according to the energy levels of the conduction and valence bands. For example, in some embodiments, the energy level of valence band of the first region is selected to be less positive than the energy level of the valence band of the second region; the semiconductor material comprising the first region may be selected such that its valence band potential is more positive than the reduction potential for oxidation half-reaction; the energy level of the conduction band of the first region may be selected to be more negative than the energy level of the conduction band of the second region; and/or the semiconductor material comprising the second region may be selected such that its conduction band potential is more negative than the reduction potential for the desired reduction half-reaction at the given pH (e.g., the evolution of hydrogen from water, the evolution of carbon monoxide and/or hydrocarbons from carbon dioxide, the evolution of ammonia from nitrogen).

A semiconductor material may be transparent, substantially transparent, substantially opaque, or opaque. A semiconductor material may be a solid, semi-solid, semi-porous, or porous.

Those of ordinary skill in the art will be aware of methods for forming a bulk material (e.g., for a nanostructure) comprising at least a first region and a second region. For example, a nanostructure bulk material (e.g., a nanorod) may be grown in sequential fashion with the appropriate p-type dopant followed by the appropriate n-type dopant, thereby forming a nanostructure with a p/n-junction within the nanostructure. In certain embodiments, a nanostructure bulk material (e.g., nanorod) may be produced using techniques that allow for direct and controlled growth of the nanostructure. Techniques for forming nanostructure bulk material include, but are not limited to, direct fabrication of nanostructure bulk materials comprising heterojunctions during synthesis, or doping of nanostructure bulk materials via post-synthesis techniques (e.g., annealing of dopants from contacts or solution-processing techniques). A p/n-junction may be formed during synthesis by changing the dopant at any point during the growth of the nanostructure bulk material, whereas a heterojunction may be formed during synthesis by changing the materials being employed for the growth of the nanostructure bulk material.

In various aspects, a method of preparing a bulk material (e.g., for a nanostructure) may utilize metal-catalyzed CVD techniques ("chemical vapor deposition"). CVD synthetic procedures useful for preparing individual wires directly on surfaces and in bulk form are generally known, and can readily be carried out by those of ordinary skill in the art. Nanowires or nanorods may also be grown through laser catalytic growth. With the same basic principles as laser catalytic growth ("LCG", described herein), if uniform diameter nanoclusters (less than 10% to 20% variation depending on how uniform the nanoclusters are) are used as the catalytic cluster, nanowires or nanorods with uniform size (diameter) distribution can be produced, where the diameter of the wires or rods is determined by the size of the catalytic clusters. By controlling growth time, nanowires or nanorods with different lengths can be grown.

In some cases, a bulk material (e.g., for a nanostructure) may be formed using catalytic chemical vapor deposition ("C-CVD"). In C-CVD, reactant molecules are formed from the vapor phase. If doping is desired, the nanostructure bulk material may be doped by introducing the doping element into the vapor phase reactant. The doping concentration may be controlled by controlling the relative amount of the doping compound introduced in the composite target. The final doping concentration or ratios are not necessarily the same as the vapor-phase concentration or ratios. By controlling growth conditions, such as temperature, pressure or the like, nanostructures having the same doping concentration may be produced.

To produce a bulk material (e.g., for a nanostructure) having adjacent regions with different compositions within the nanostructure bulk material, the ratio of gas reactant may be varied (e.g. from about 1 ppm to about 10%, from about 10 ppm to about 20%, from about 100 ppm to about 50%, or the like), and/or the types of gas reactants used may be altered during growth of the nanostructure bulk material (e.g. to form a second, differing, semiconductor material, or to change from an n-type dopant to a p-type dopant, or vice versa). The gas reactant ratio or the type of gas reactants used may be altered several times during growth of the nanostructure bulk material, which may produce the nanostructure bulk material comprising regions having multiple compositions, all of which may or may not be unique.

In some embodiments, a bulk material (e.g., for a nanostructure) may be formed using laser catalytic growth ("LCG"). In LCG, reactants and/or dopants are controllably introduced during vapor phase growth of nanostructure bulk materials. Laser vaporization of a composite target composed of a desired material and a catalytic material (e.g., catalytic cluster) may create a hot, dense vapor. The vapor may condense into liquid nanostructure bulk materials through collision with a buffer gas. Growth may begin when the liquid nanostructure bulk materials become supersaturated with the desired phase and can continue as long as reactant is available. Growth may terminate when the nanostructure bulk material passes out of the hot reaction zone and/or when the temperature is decreased. The nanostructure bulk material wire may be further subjected to different semiconductor reagents during growth.

In LCG, vapor phase semiconductor reactants required for nanostructure bulk material growth may be produced by laser ablation of solid targets, vapor-phase molecular species, or the like. To create a junction within a nanostructure bulk material, the addition of the one or more of the first-provided reactants may be stopped during growth, and then a one or more second-provided reactants may be introduced.

The catalytic clusters or the vapor phase reactants may be produced by any suitable technique. For example, laser ablation techniques may be used to generate catalytic clusters or vapor phase reactant that may be used during LCG. Other techniques may also be contemplated, such as thermal evaporation techniques. The laser ablation technique may generate liquid nanoclusters that may subsequently define the size and direct the growth direction of the nanoscopic wires. The diameters of the resulting nanostructure bulk materials may be determined by the size of the catalyst cluster, which in turn may be determined using routine experiments that vary the growth conditions, such as background pressure, temperature, flow rate of reactants, and the like. For example, lower pressure generally produces nanowires or nanorods with smaller diameters. Further diameter control may be achieved by using uniform diameter catalytic clusters.

In some cases, a bulk material (e.g., for a nanostructure) may be formed using a nanostructure-forming catalyst (e.g., different from the catalytic materials described herein which may be associated with a nanostructure). A nanostructure-forming catalyst can be, for example, gold or a gold-containing material in certain embodiments. A wide range of other nanostructure-forming catalysts may also be contemplated for forming a nanostructure bulk material, for example, a transition metal such as silver, copper, zinc, cadmium, iron, nickel, cobalt, and the like. Generally, any metal able to form an alloy with the desired semiconductor material, but does not form a more stable compound than with the elements of the desired semiconductor material may be used as the catalyst. The buffer gas may be any inert gas, for example, $N_2$ or a noble gas such as argon. In some embodiments, a mixture of $H_2$ and a buffer gas may be used to reduce undesired oxidation by residual oxygen gas. A reactive gas used during the synthesis of the nanostructure bulk material may also be introduced when desired, for example, ammonia for semiconductors containing nitrogen, such as gallium nitride. Nanostructure bulk materials may also be flexibly doped by introducing one or more dopants into the composite target. The doping concentration may be controlled by controlling the relative amount of doping element, for example, between 0 and about 10% or about 20%, introduced in the composite target.

Other techniques to produce bulk materials (e.g., for a nanostructure) of the invention are also contemplated. For example, nanostructure bulk materials of any of a variety of materials may be grown directly from vapor phase through a vapor-solid process. Also, nanostructure bulk materials may also be produced by deposition on the edge of surface steps, or other types of patterned surfaces. Further, nanostructure bulk materials may be grown by vapor deposition in or on any generally elongated template. The porous membrane may be porous silicon, anodic alumina, a diblock copolymer, or any other similar structure. The natural fiber may be DNA molecules, protein molecules carbon nanotubes, any other elongated structures. For all the above described techniques, the source materials may be a solution or a vapor. In some cases, while in solution phase, the template may also include be column micelles formed by surfactant. In yet another embodiment, a nanostructure bulk material may be formed using supercritical fluid phase inclusion techniques (see, for example, Crowley et al., Chem. Mater., 2003, 14, 3518). In some cases, a metal oxides and/or metal hydroxides can be formed by the oxidation and/or hydrolysis of a metal-containing compound. In a particular embodiment, a doped iron oxide can be formed by the oxidation and/or hydrolysis of an iron-containing compound in the presence of a dopant.

In some embodiments, a semiconductor material (e.g., for a nanostructure) may be doped after formation (e.g., of the nanostructure). In one technique, a nanostructure bulk material having a substantially homogeneous composition is first synthesized, then is doped post-synthetically with various dopants. Such doping may occur throughout the entire nanostructure bulk material, or in one or more portions of the nanostructure bulk material, for example, in a nanowire or nanorod having multiple regions differing in composition.

In some embodiments, a nanostructure comprises at least one surface-presenting catalytic material which is compositional different than the bulk material (e.g., a semiconductor material). In some cases, a first catalytic material is associated with a first region of a bulk and a second catalytic material is associated with a second region of the bulk, wherein the first type and the second type of catalytic materials are compositionally different than the bulk material(s). Association of at least one surface-presenting catalytic material with the first and/or second region of a bulk material may aid in the photocatalytic reaction. For example, the association of at least one surface-presenting catalytic material with the bulk material may increase the efficiency of the photocatalysis. As will be known to those of ordinary skill in the art, a challenge associated with the use of semiconductor materials is that the charge separation of the photogenerated electrons and holes may not be long-lived. That is, the electrons may diffuse back into the semiconductor to recombine with a hole within a time frame faster than what is needed for the electrochemical reaction to proceed. Accordingly, association of at least one catalytic material may increase the efficiency of the photocatalysis by allowing for rapid reaction between the photoexcited electron and/or electron-hole with the bulk.

In some embodiments, a nanostructure of the present invention comprises a bulk material (e.g. comprising one or more semiconductor material) and at least one surface-presenting catalytic material (e.g., which is compositionally different than the bulk material). In some cases, a first type of surface-presenting catalytic material is associated with a first region of the bulk material and a second type of surface-presenting catalytic material is associated with a second region of the bulk material. In some cases, the surface-presenting catalytic material is a catalytic material. Many species of the class of catalytic material provided by the invention are made of readily-available, low-cost material, and are simple to make, and non-limiting examples are described herein.

A "catalytic material" as used herein, means a material that is involved in and increases the rate of a chemical reaction, but is largely unconsumed by the reaction itself, and may participate in multiple chemical transformations. A catalytic material may also be referred to as a catalyst and/or a catalyst composition. A catalytic material is generally not simply a bulk semiconductor material. For example, a catalytic material might involve a metal center which undergoes a change from one oxidation state to another during the catalytic process. In another example, the catalytic material might involve metal ionic species which bind to one or more oxygen atoms from water and release the oxygen atoms as dioxygen (i.e., $O_2$). Thus, catalytic material is given its ordinary meaning in the field in connection with this invention. As will be understood from other descriptions herein, a catalytic material of the invention that may be consumed in slight quantities during some uses and may be, in many embodiments, regenerated to its original chemical state. In some cases, a catalytic material upon oxidation, catalyzed an oxidation reaction and in other cases, a catalytic material upon reduction, catalyzes a reduction reaction.

In some embodiments, methods are provided for forming a nanostructure comprising a bulk material (e.g., comprising a first region and a second region), and at least one surface-presenting catalytic material associated with at least the first region and/or the second region. In some embodiments, the nanostructure comprising at least one surface-presenting catalytic material may be formed by exposing a bulk material (e.g. comprising a semiconductor material) having a first region and a second region to a solution comprising metal ionic species and anionic species, followed by exposing the bulk material to electromagnetic radiation, thereby forming at least a first surface-presenting catalytic material associated with the first region of the bulk and/or at least a second surface presenting catalytic material associated with the second region of the bulk. The metal ionic species and anionic species may associate with the bulk and form a composition (e.g., a catalytic material) associated with the bulk, thereby forming a nanostructure.

In some embodiments, a first catalytic material associates with a first region of a bulk and a second catalytic material associates with a second region of the bulk substantially simultaneously. "Substantially simultaneously" when used in connection with the formation of a first catalytic material and the second catalytic material means that the catalytic materials associate with the bulk during the same period, but does not necessarily mean that the catalytic materials form in the same quantity or quality. For example, a greater amount of the first catalytic material may associate with the first region of the bulk as compared to the amount of second catalytic material which associates with the second region of the semiconductor material, a lesser amount of the first catalytic material may associate with the first region of the bulk as compared to the amount of second catalytic material which associates with the second region of the bulk.

It should be understood, that while a bulk may comprise a first region and a second region (e.g., a first material and a second material), the catalytic material may not necessarily be associated with all portions of the first region and the second region. For example, the first catalytic material may associate with only a portion of the first region. In some cases, however, the catalytic material may associate with essentially the entire first region. In some cases, the association occurs at the surface of the material. In some cases, if the material is porous, the catalytic material may form in the pores of the material.

The formation of the catalytic material(s) associated with a bulk comprising a semiconductor material will now be described in more detail. Catalytic materials are known which associate with a semiconductor material upon exposure of the semiconductor material to appropriate catalyst-forming conditions to electromagnetic radiation. The invention provides methods for forming one or more catalytic material on a semiconductor substrate, wherein the semiconductor substrate is in the form of a nanostructure.

As an example, a semiconductor substrate (e.g., a bulk material) is provided comprising a first region comprising an n-type semiconductor material and a second region comprising a p-type semiconductor material. As described herein, upon exposure to electromagnetic radiation, the separation of holes and electrons may occur in the n-type and p-type semiconductor materials. The holes in the n-type material may be used for the formation of a first catalytic material and the electrons in the p-type material may be used for the formation of the second catalytic material. The catalytic materials may aid in an oxidation and/or reduction reaction of an electrochemical reaction.

In some cases, surface-presenting catalytic materials may form as follows. A semiconductor substrate (e.g., a bulk material) comprising a first region and a second region can be exposed to a solution comprising at least one metal ionic species and at least one anionic species. Upon exposure of the semiconductor substrate to electromagnetic radiation, at the first region (e.g., n-type region), the metal ionic species may be oxidized from an oxidation state of (n) to an oxidation state greater than (n), and a catalytic material comprising the metal ionic species in an oxidation state greater than (n) may associated with the first region. The first catalytic material may addition comprise anionic species. Similarly, at the second region (e.g., p-type region), the metal ionic species may be reduced from an oxidation state of (n) to an oxidation state less than (n) (e.g., 0), and a catalytic material comprising the metal ionic species in an oxidation state less than (n) may then associate with the second region. In another set of embodiments, a similar protocol can be carried out but, instead of driving the formation of the nanostructures' catalytic regions with electromagnetic radiation (or, in addition to the use of electromagnetic radiation), a chemical reaction and/or a change in the chemical and/or physical environment can be used to drive formation. E.g., a change in pH, temperature, and/or the like of an environment to which (e.g. a solution in which) the nanoparticles are exposed, addition of reaction-driving constituents, etc. Those of ordinary skill in the art will be able to select reactants and/or conditions to drive such reactions with aid of the present disclosure.

A non-limiting example of a method of forming a first and/or second catalytic material associated with a semiconductor substrate (e.g., a bulk material) comprising a first region and a second region is illustrated in FIG. 3. Semiconductor substrate 51 comprising first region 50 and second region 52 is provided, wherein first region 50 comprises an n-type semiconductor material and second region 52 comprises a p-type semiconductor material. The semiconductor substrate is immersed in a solution comprising metal ionic species (grey circles) having an oxidation state of (n) and anionic species (white circles). Upon exposure of semiconductor substrate 51 to electromagnetic radiation, holes propagate to the n-type material, as indicated by arrow 56 and electrons propagate to the p-type material, as indicated by arrow 58, as illustrated in FIG. 3B. The holes in the n-type material may aid in the formation of and/or association of first catalytic material 60 comprising the metal ionic species (dashed circles) in an oxidation state greater than (n) and the anionic species (white circles) with first region 50 and the electrons in the p-type material may aid in the formation of and/or association of second catalytic material 62 comprising metal ionic species (dotted circles) having an oxidation state less than (n) to with second region 52, as illustrated in FIG. 3C. Following formation of the catalytic materials and upon further exposure of the nanostructure to electromagnetic radiation, the first catalytic material (in combination with the holes present in the n-type material) may aid in an oxidation reaction, for example, the production of oxygen gas from water, as indicated by arrow 64 in FIG. 3D, and the second catalytic material (in combination with the electrons present in the p-type material) may aid in a reduction reaction, for example, the production of hydrogen gas from water, as indicated by arrow 66 in FIG. 3D.

A catalytic material "associated with" a semiconductor substrate (e.g., a bulk material) will now be described with reference to a metal ionic species and/or anionic species which can define a catalytic material of the invention. In some cases, the anionic species and the metal ionic species may interact with each other prior to, simultaneously to, and/or after the association of the species with the semiconductor substrate, and result in a catalytic material with a high degree of solid content resident on, or otherwise immobilized with respect to, the semiconductor substrate. In this arrangement, the catalytic material can be solid including various degrees of electrolyte or solution (e.g., the material can be hydrated with various amounts of water), and/or other species, fillers, or the like, but a unifying feature among such catalytic material associated with semiconductor substrate is that they can be observed, visually or through other techniques described more fully below, as largely resident on or immobilized with respect to the semiconductor substrate, either in electrolyte solution or after removal of the semiconductor substrate from solution.

In some cases, the catalytic material may associate with a semiconductor substrate via formation of a bond, such as an ionic bond, a covalent bond (e.g., carbon-carbon, carbon-oxygen, oxygen-silicon, sulfur-sulfur, phosphorus-nitrogen, carbon-nitrogen, metal-oxygen, or other covalent bonds), a hydrogen bond (e.g., between hydroxyl, amine, carboxyl, thiol, and/or similar functional groups), a dative bond (e.g., complexation or chelation between metal ions and monodentate or multidentate ligands), Van der Waals interactions, and the like. "Association" of the composition (e.g., catalytic material) with the semiconductor substrate would be understood by those of ordinary skill in the art based on this description. In some embodiments, the interaction between a metal ionic species and an anionic species may comprise an ionic interaction, wherein the metal ionic species is directly bound to other species and the anionic species is a counterion not directly bound to the metal ionic species. In a specific embodiment, an anionic species and a metal ionic species form an ionic bond and the complex formed is a salt.

A catalytic material associated with a bulk may be most often arranged with respect to the bulk so that it is in sufficient electrical communication with the bulk to carry out purposes of the invention as described herein. "Electrical communication," as used herein, is given its ordinary meaning as would be understood by those of ordinary skill in the art whereby electrons can flow between the bulk and the catalytic material in a facile enough manner for the bulk to operate as described herein. That is, charge may be transferred between the bulk and the catalytic material (e.g., the metal ionic species and/or anionic species present in the catalytic material). In one arrangement, the composition is in direct contact with the bulk. In another arrangement, a material may be present between the composition and the bulk (e.g., a shell as described herein, an insulator, a conducting material, etc.).

In some cases, a surface-presenting catalytic material may be in "direct electrical communication" with the bulk. "Direct electrical communication," as used herein, is given its ordinary meaning as defined above with respect to electrical communication, but in this instance, the bulk and the surface-presenting catalytic material are in direct contact with one another (e.g., as opposed to through a secondary material, through use of circuitry, etc.). In some embodiments, the bulk and the surface-presenting catalytic material may be integrally connected. The term "integrally connected," when referring to two or more objects, means objects that do not become separated from each other during the course of normal use, e.g., separation requires at least the use of tools, and/or by causing damage to at least one of the components, for example, by breaking, peeling, dissolving, etc. A surface-presenting catalytic material may be considered to be in direct electrical communication with a bulk material during operation of a nanostructure even in instances where a portion of the surface-presenting catalytic material may dissociate from the photoactive composition when taking part in a dynamic equilibrium.

Without wishing to be bound by theory, the formation of a catalytic material on a bulk material (e.g., comprising a semiconductor material), wherein the catalytic material comprising metal ionic species in an oxidation state greater than the oxidation state in solution may proceed according to the following example. The bulk (e.g., a plurality of nanorods each comprising at least one semiconductor material) may be immersed in a solution comprising metal ionic species (M) with an oxidation state of (n) (e.g., $M^n$) and anionic species (e.g., $A^{-y}$). The bulk (e.g., the plurality of nanorods) may be exposed to electromagnetic radiation, and metal ionic species near to the bulk material (or nanostructure) may be oxidized to an oxidation state of (n+x) (e.g., $M^{(n+x)}$). The oxidized metal ionic species may interact with an anionic species near the bulk material (or nanostructure) nanostructure to form a substantially insoluble complex, thereby forming a catalytic material. In some cases, the catalytic material may be in electrical communication with the bulk material.

A non-limiting example of this process is depicted in FIG. 4. FIG. 4A shows a single metal ionic species 140 with an oxidation state of (n) in solution 142. Metal ionic species 144 may be near bulk (e.g., nanorod) 146, as depicted in FIG. 4B. As shown in FIG. 4C, metal ionic species may be oxidized to an oxidized metal ionic species 148 with an oxidation state of (n+x) and (x) electrons 150 may be transferred to bulk 152 or to another species near or associated with the metal ionic species and/or the bulk. FIG. 4D depicts a single anionic species 154 nearing oxidized metal ionic species 156. In some instances, as depicted in FIG. 4E, anionic species 158 and oxidized metal ionic species 160 may associate with bulk 162 to form a catalytic material. In some instances, the oxidized metal ionic species and the anionic species may interact and form a complex (e.g., a salt) before associating with the bulk. In other instances, the metal ionic species and anionic species may associate with each other prior to oxidation of the metal ionic species. In other instances, the oxidized metal ionic species and/or anionic species may associate directly with the bulk and/or with another species already associated with the bulk. In these instances, the metal ionic species and/or anionic species may associate with the bulk (either directly, or via formation of a complex) to form the catalytic material (e.g., a composition associated with the bulk).

Similarly, the formation of a catalytic material on a semiconductor substrate (e.g., a nanorod comprising a least one semiconductor material), wherein the catalytic material comprising metal ionic species in an oxidation state less than the oxidation state in solution may proceed according to the following example. A semiconductor substrate may be immersed in a solution comprising metal ionic species (M) with an oxidation state of (n) (e.g., $M^n$). The semiconductor substrate may be exposed to electromagnetic radiation, and metal ionic species near to the semiconductor substrate may be reduced to an oxidation state of (n−w) (e.g., $M^{(n-w)}$). The reduced metal ionic species may thereby form a catalytic material associated with the semiconductor substrate. In some cases, the catalytic material may be in electrical communication with the semiconductor substrate. In some cases, the catalytic material may comprise species in addition to the reduced metal species.

The selection of appropriate metal ionic species and anionic species will now be discussed in more detail. It should be understood, that while much of the discussion herein focuses on a first catalytic material and a second catalytic material comprising the same metal species in different oxidation states, this is by no means limiting, and in some cases, the first catalytic material and the second catalytic material can comprise different metal species. For example, a first catalytic material may comprise cobalt in an oxidation state of (II), (III) and/or (IV), and the second catalytic material may comprise nickel in an oxidation state of (0). Formation of two catalytic material comprises different metal species may be accomplished by exposing a semiconductor substrate (e.g., a nanorod comprising at least one semiconductor material) to more than one type of metal ionic species (e.g., Co(II) and Ni(II)). In such embodiments, the first catalytic material may comprise the first metal species (e.g., Co(III) and/or Co(IV)) in an oxidation state greater than the oxidation state of the first metal species in solution and the second catalytic material may comprise the second type of metal species (e.g., Ni(0)) in an oxidation state less than the oxidation state of the second metal species in solution. In some cases, the first catalytic material may comprise a first metal species and the second catalytic material may comprise the first metal species and a second metal species. For example, the first catalytic material may comprise Ni (e.g., in an oxidation state of (II) and/or (III)) and the second catalytic material may comprise Ni (e.g., in an oxidation state of (0)) and molybdenum (e.g., in an oxidation state of (0)).

In some cases, the metal ionic species is chosen and presented in an oxidation state such that both lower and higher oxidation states are available. For example, Co(II) may be provided, wherein cobalt has access to lower oxidation states (e.g., Co(0)) and higher oxidation states (e.g., Co(III), Co(IV)). In some cases, the metal ionic species is selected such that it capable of forming a first catalytic material comprising the anionic species according to the methods, guidelines, and parameters described elsewhere (e.g., see U.S. Provisional Patent Application Ser. No. 61/103,898, filed Oct. 8, 2008, entitled "Catalyst Compositions and Photoanodes for Photosynthesis Replication and Other Photoelectrochemical Techniques," by Nocera, et al., U.S. Provisional Patent Application Ser. No. 61/218,006, filed Jun. 17, 2009, entitled "Catalytic Materials, Photoanodes, and Systems for Water Electrolysis and Other Electrochemical Techniques," by Nocera, et al., U.S. Provisional Patent Application Ser. No. 61/103,905, filed Oct. 8, 2008, entitled "Catalyst Compositions and Photoanodes for Photosynthesis Replication and Other Photoelectrochemical Techniques," by Nocera, et al., U.S. Provisional Patent Application Ser. No. 61/187,995, filed Jun. 17, 2009, entitled "Catalytic Materials, Photoanodes, and Systems for Water Electrolysis and Other Electrochemical Techniques," by Nocera, et al., U.S. Provisional Patent Application Ser. No. 61/073,701, filed Jun. 18, 2008, entitled "Catalyst Compositions and Electrodes for Photosynthesis Replication and Other Electrochemical Techniques," by Nocera, et al., U.S. Provisional Patent Application Ser. No. 61/084,948, filed Jul. 30, 2008, entitled "Catalyst Compositions and Electrodes for Photosynthesis Replication and Other Electrochemical Techniques," by Nocera, et al., U.S. Provisional Patent Application Ser. No. 61/103,879, filed Oct. 8, 2008, entitled "Catalyst Compositions and Electrodes for Photosynthesis Replication and Other Electrochemical Techniques," by Nocera, et al., U.S. Provisional Patent Application Ser. No. 61/146,484, filed Jan. 22, 2009, entitled "Catalyst Compositions and Electrodes for Photosynthesis Replication and Other Electrochemical Techniques," by Nocera, et al., U.S. Provisional Patent Application Ser. No. 61/179,581, filed May 19, 2009, entitled "Catalyst Compositions and Electrodes for Photosynthesis Replication and Other Electrochemical Techniques," by Nocera, et al., and U.S. patent application Ser. No. 12/486,694, filed Jun. 17, 2009, entitled "Catalytic Materials, Electrodes, and Systems for Water Electrolysis and Other Electrochemical Techniques," each herein incorporated by reference).

In some embodiments, the metal ionic species ($M^n$) and the anionic species ($A^{-y}$) may be selected such that they exhibit the following properties in connection with forming a catalytic material wherein the oxidation state of the metal ionic species is greater than the oxidation state of the metal ionic species in solution. Without wishing to be bound by theory, the solubility of a material comprising anionic species and oxidized metal ionic species may influence the association of the metal ionic species and/or anionic species with the current collector. For example, if a material formed by (c) number of anionic species and (b) number of oxidized metal ionic species is substantially insoluble in the solution, the material may be influenced to associate with the current collector. This non-limiting example may be expressed according to Equation 9:

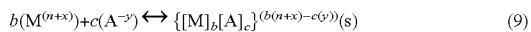

$$b(M^{(n+x)}) + c(A^{-y}) \leftrightarrow \{[M]_b[A]_c\}^{(b(n+x)-c(y))}(s) \qquad (9)$$

where $M^{(n+x)}$ is the oxidized metal ionic species, $A^{-y}$ is the anionic species, and $\{[M]_b[A]_c\}^{(b(n+x)-c(y))}$ is at least a portion of catalytic material formed, where b and c are the number of metal ionic species and anionic species, respectively. It should be understood, however, that the catalytic material does not necessarily consist essentially of a material defined by the formula $\{[M]_b[A]_c\}^{(n+x-y)}$, as, in most cases, additional components can be present in the catalytic material (e.g., a second type of anionic species).

In most embodiments, a metal ionic species will also have access to oxidation states less than the oxidation states of the metal ionic species in solution. In some cases, the selection of the metal ionic species may also take into consideration the ease of reduction of the metal ionic species to a lower oxidation state of that in solution, for example, such that a second catalytic material forms on a second portion of the semiconductor substrate. In some cases, the reduction potential necessary to reduce the metal ionic species in an oxidation state of (n) (e.g., the oxidation state in solution) to an oxidation state of (0) is within the range of the electron energy available via exposure of the semiconductor substrate to electromagnetic radiation.

Metal ionic species useful as one portion of a catalytic material of the invention may be any metal ion selected according to the guidelines described herein. In most embodiments, the metal ionic species have access to oxidation states of at least (n) and (n+x). In some cases, the metal ionic species have access to oxidation states of (n), (n+1) and (n+2). The value, (n), may be any whole number, and includes, but is not limited to, 0, 1, 2, 3, 4, 5, 6, 7, 8, and the like. In some cases, (n) is not zero. In particular embodiments, (n) is 1, 2, 3 or 4. The value, (x), may be any whole number and includes, but is not limited to 0, 1, 2, 3, 4, and the like. In particular embodiments, (x) is 1, 2, or 3. Non-limiting examples of metal ionic species include Sc, Ti, V, Cr, Mn, Fe, Co, Ni, Cu, Y, Zr, Nb, Mo, Tc, Rh, Ru, Ag, Cd, Pt, Pd, Ir, Hf, Ta, W, Re, Os, Hg, Pb, Au and the like. In some cases, the metal ionic species may be a lanthanide or actinide (e.g., Ce, Pr, Nd, Sm, Eu, Gd, Tb, Dy, Ho, Er, Tm, Yb, Lu, Th, Pa, U, etc.). In a particular embodiment, the metal ionic species comprises cobalt ions, which may be provided as a catalytic material in the form of Co(II), Co(III) or the like. In some embodiments, the metal ionic species is not Mn. The metal ionic species may be provided (e.g., to the solution) as a metal compound, wherein the metal compound comprises metal ionic species and counter anions. For example, the metal compound may be an oxide, a nitrate, a hydroxide, a carbonate, a phosphite, a phosphate, a sulphite, a sulphate, a triflate, and the like.

An anionic species selected for use as a catalytic material of the invention may be any anionic species that is able to interact with the metal ionic species as described herein and to meet threshold catalytic requirements as described. In some cases, the anionic compound may be able to accept and/or donate hydrogen ions, for example, $H_2PO_4^-$ or $HPO_4^{-2}$. Non-limiting examples of anionic species include forms of phosphate ($H_3PO_4$ or $HPO_4^{-2}$, $H_2PO_4^{-2}$ or $PO_4^{-3}$), forms of sulphate ($H_2SO_4$ or $HSO_4^-$, $SO_4^{-2}$), forms of carbonate ($H_2CO_3$ or $HCO_3^-$, $CO_3^{-2}$), forms of arsenate ($H_3AsO_4$ or $HAsO_4^{-2}$, $H_2AsO_4^-$ or $AsO_4^{-3}$), forms of phosphite $H_3PO_3$ or $HPI_3^{-1}$, $H_2PO_3^{-2}$ or $PO_3^{-3}$), forms of sulphite ($H_2SO_3$ or $HSO_3^-$, $SO_3^{-2}$), forms of silicate, forms of borate (e.g., $H_3BO_3$, $H_2BO_3^-$, $HBO_3^{-2}$, etc.), halides ($F^-$, $Cl^-$, $Br^-$, $I^-$), nitrate, nitrite, and the like.

In some cases, the anionic species may be a form of phosphonate. A phosphonate is a compound comprising the structure $PO(OR^1)(OR^2)(R^3)$ wherein $R^1$, $R^2$, and $R^3$ can be the same or different and are H, an alkyl, an alkenyl, an alkynyl, a heteroalkyl, a heteroalkenyl, a heteroalkynyl, an aryl, or a heteroaryl, all optionally substituted, or are optionally absent (e.g., such that the compound is an anion, dianion, etc.). In a particular embodiment, $R^1$, $R^2$, and $R^3$ can be the same or different and are H, alkyl, or aryl, all optionally substituted. A non-limiting example of a phosphonate is a form of $PO(OH)_2R^1$ (e.g., $PO_2(OH)(R^1)^-$, $PO_3(R^1)^{-2}$), wherein $R^1$ is as defined above (e.g., alkyl such as methyl, ethyl, propyl, etc.; aryl such as phenol, etc.). In a particular embodiment, the phosphonate may be a form of methyl phosphonate ($PO(OH)_2Me$), or phenyl phosphonate ($PO(OH)_2Ph$). Other non-limiting examples of phosphorus-containing anionic species include forms of phosphinites (e.g., $P(OR^1)R^2R^3$) and phosphonites (e.g., $P(OR^1)(OR^2)R^3$) wherein $R^1$, $R^2$, and $R^3$ are as described above. In other cases, the anionic species may comprise one any form of the following compounds: $R^1SO_2(OR^2)$, $SO(OR^1)(OR^2)$, $CO(OR^1)(OR^2)$, $PO(OR^1)(OR^2)$, $AsO(OR^1)(OR^2)(R^3)$, wherein $R^1$, $R^2$, and $R^3$ are as described above. With respect to the anionic species discussed above, those of ordinary skill in the art will be able to determine appropriate substituents for the anionic species. The substituents may be chosen to tune the properties of the catalytic material and reactions associated with the catalytic material. For example, the substituent may be selected to alter the solubility constant of a composition comprising the anionic species and the metal ionic species.

The anionic species may be provided as a compound comprising the anionic species and a counter cation. The counter cation may be any cationic species, for example, a metal ion (e.g., $K^+$, $Na^+$, $Li^+$, $Mg^{+2}$, $Ca^{+2}$, $Sr^{+2}$), $NR_4^+$ (e.g., $NH_4^+$), $H^+$, and the like. In a specific embodiment, the compound employed may be $K_2HPO_4$.

In some embodiments, a catalytic material of the invention may comprise more than one type of metal ionic species and/or anionic species (e.g., at least about 2 types, at least about 3 types, at least about 4 types, at least about 5 types, or more, of metal ionic species and/or anionic species). For example, more than one type of metal ionic species and/or anionic species may be provided to the solution in which the bulk material is immersed. In such instances, the catalytic material may comprise more than one type of metal ionic species and/or anionic species. Without wishing to be bound by theory, the presence of more than one type of metal ionic species and/or anionic species may allow for the properties of the nanostructure to be tuned, such that the performance of the nanostructure may be altered by using combinations of species in different ratios. In a particular embodiment, a first type of metal ionic species (e.g., Co(II)) and second type of metal ionic species (e.g., Ni(II)) may be provided in the solution in which the bulk material or nanostructure is immersed, such that the catalytic material comprises the first type of metal ionic species and the second type of metal ionic species (e.g., Co(II) and Ni(II)). Where a first and second type of metal ionic species are used together, each can be selected from among metal ionic species described as suitable for use herein.

Where both first type and a second type of metal ionic and/or anionic species are used, both the first and second species need not both be catalytically active, or if both are catalytically active they need not be active to the same level or degree. The ratio of the first type of metal ionic and/or anionic species to the second type of metal ionic and/or anionic species may be varied and may be about 1:1, about 1:2, about 1:3, about 1:4, about 1:5, about 1:6, about 1:7, about 1:8, about 1:9, about 1:10, about 1:20, or greater. In some instances, the second type of species may be present in a very small amount and serve as a dopant to, for example, to improve the conductivity or other properties of the material. In these instances, the ratio of the first type of species to the second type of metal ionic species may be about 1:0.1, about 1:0.005, about 1:0.001, about 1:0.0005, etc.

In some embodiments, a catalytic material comprising more than one metal ionic species and/or anionic species may be formed by first forming a catalytic material comprising a first type of metal ionic species and a first type of anionic species, followed by exposing the nanostructure to a solution comprising a second type of metal ionic species and/or second type of anionic species and exposing the nanostructure to electromagnetic radiation. This may cause the second type of metal ionic species and/or second type of anionic species to be comprised in the catalytic material. In other embodiments, the catalytic material may be formed by exposing a bulk material nanostructure to a solution comprising the components (e.g., first and second type of metal ionic species, and anionic species) and applying a voltage to the nanostructure, thereby forming a catalytic material comprising the components. In yet another embodiment, the catalytic material may be formed by exposing a bulk material or nanostructure to a solution comprising the components (e.g., first and second type of metal ionic species, and anionic species) and an appropriate reducing (e.g., $LiBH_4$, $LiAlH_3$, lithium triethylborohydride, Zn, Na, Li, etc.) or oxidizing agent (e.g., $O_2$, $H_2O_2$, hypochlorite salts, $Ce^{+3}$ salts, etc.) in solution.

In some cases, a first type of anionic species and a second type of anionic species (e.g., a form of borate and a form of phosphate) may be provided to the solution and/or otherwise used in combination in a catalytic material of the invention. Where both first and second catalytically active anionic species are used, they can be selected from among anionic species described as suitable for use herein.

In some instances, the first type of anionic species is hydroxide and/or oxide ions, and the second type of anionic species is not hydroxide and/or oxide ions. It should be understood, however, that when at least type of anionic species is an oxide or hydroxide, the species might not be provided to the solution but instead, may be present in the water or solution the species is provided in and/or may be formed during a reaction (e.g., between the first type of anionic species and the metal ionic species).

In a specific embodiment, the composition (e.g., catalytic material) associated with a bulk material or nanostructure may comprise cobalt ions and anionic species comprising phosphorus (e.g., $HPO_4^{-2}$). In some cases, the composition may additionally comprise cationic species (e.g., $K^+$). An anionic species comprising phosphorus may be any molecule that comprises phosphorus and is associated with a negative charge. Non-limiting examples of anionic species comprising phosphorus include $H_3PO_4$, $H_2PO_4^-$, $HPO_4^{-2}$, $PO_4^{-3}$, $H_3PO_3$, $H_2PO_3^-$, $HPO_3^{-2}$, $PO_3^{-3}$, $R^1PO(OH)_2$, $R^1PO_2(OH)^-$, $R^1PO_3^{-2}$, or the like, wherein $R^1$ is H, an alkyl, an alkenyl, an alkynyl, a heteroalkyl, a heteroalkenyl, a heteroalkynyl, an aryl, or a heteroaryl, all optionally substituted.

The above and other characteristics of the metal ionic species and anionic species can serve as selective screening tests for identification of particular metal ionic and anionic species useful for particular applications. Those of ordinary skill in the art can, through simple bench-top testing, reference to scientific literature, simple diffractive instrumentation, simple electrochemical testing, and the like, select metal ionic and anionic species based upon the present disclosure, without undue experimentation.

In some cases, a catalytic material (e.g., associated with a semiconductor substrate) is a material that is capable of catalyzes the production of $H_2$ from water in the presence of $O_2$. In some cases, the catalytic material is capable of catalyzing the production of hydrogen gas at a current density that is at least about 10 times, at least about 50 times, at least about 100 times, at least about 200 times, at least about 500 times, at least about 1000 times, at least about 2000 times, at least about 5000 times, or at least about 10000 times greater than the current density at the catalytic material for the reduction of $O_2$ at overpotentials less negative than about −400 mV for the production of $H_2$ from water. The above may be determined for a catalytic material by using comparing the current density for the production of $H_2$ using a system comprising the catalytic material, in the absence and presence of oxygen gas, under substantially similar conditions.

In some cases, such a catalytic material may be associated with a semiconductor substrate by reduction of a metal ionic species near to the semiconductor substrate (e.g., $M^n$) to an oxidation state of (n−w) (e.g., $M^{(n-w)}$; or in some cases, $M^0$). In some embodiments, such a catalytic material comprises a plurality of metal elements (e.g., two, three, four, five, or more, metal elements). For example, the catalytic material may be an alloy. The term "alloy," as used herein, is given its ordinary meaning in the art and refers to a composition comprising two or more metals or metalloids that have physical properties different than those of any of the metals by themselves. Alloys may be binary, ternary, quaternary, etc., depending on the number of metals or metalloids present in the mixture. An alloy may be single phase solid solutions, stoichiometric compounds or consist of two or more phases where each phase may be a solid solution or stoichiometric compound. The alloy may or might not have the same composition throughout. In some embodiments, the catalytic material comprises nickel. Non-limiting embodiments of compositions include binary alloys (e.g., NiMo, NiFe, NiSn, NiS, NiZn, NiP, NiW, NiCu, NiCo, NiAl, CoP, CoMo, NiTi, etc.), ternary alloys (e.g., NiMoX where X is a metal such as Fe, Cu, Zn, Co, W, Cr, Cd, V, Ti, or the like, NiCoP, NiFeP, NiFeZn, NiCoZn, NiCuFe, NiCuMo, LaNiSi, etc.), or quaternary alloys (e.g., NiCoMnAl, etc.). Each of the metals or metalloids in the composition may be present in an atomic percent between 0.001 and 99.999%, such that the total atomic percent of the metal, metalloids, and/or other elements or compounds present totals about 100%. The amount of each of the metal or metalloid component of the composition may be varied in the composition. This may be accomplished using techniques known to those of ordinary skill in the art, for example, by providing varying amounts of each of the starting material prior to forming the composition. In a particular embodiment, the catalytic material comprises or consists essentially of nickel and molybdenum.

The physical structure of the catalytic materials described herein may vary. For example, the catalytic material may be a coating (e.g., film) and/or particles associated with at least a portion of the bulk material or nanostructure (e.g., surface and/or pores). In some embodiments, the catalytic material might not form a coating associated with the bulk material or nanostructure. A pattern in some cases can form spontaneously upon deposition of catalytic material onto the bulk material or nanostructure.

In some cases, the thickness of catalytic material may be of substantially the same throughout the material. In other cases, the thickness of the catalytic material may vary throughout the material (e.g., a film does not necessarily have uniform thickness). In some cases, the average thickness of the catalytic material may be less than about less than about 100 nm, less than about 50 nm, less than about 25 nm, less than about 15 nm, less than about 15 nm, less than about 10 nm, less than about 5 nm, less than about 2 nm, less than about 1 nm, less than about 0.5 nm, less than about 0.1 nm, or less.

In some cases, the performance of a photocatalyst may be analyzed by determining the quantum efficiency. The term "quantum efficiency," as used herein, is given its ordinary meaning in the art and refers to a measure of the efficiency of the photocatalyst for utilizing photons of a given energy to catalyze a given reaction. As will be known to those of ordinary skill in the art, quantum efficiency may be determined from measuring the monochromatic light power density and the rate of the photocatalyzed chemical reaction. In some cases, the quantum efficiency of a photocatalyst of the present invention is greater than about 1%, about 2%, about 5%, about 10%, about 20%, about 25%, about 30%, about 40%, about 50%, about 75%, about 100%. In other cases the performance of the photocatalyst may be analyzed by determining the efficiency of the photocatalyst for utilizing AM 1.5 simulated sunlight to catalyze a given reaction. In some embodiments, a photocatalyst as described herein is capable of producing at least about 1 umol (micromole), at least about 5 umol, at least about 10 umol, at least about 20 umol, at least about 50 umol, at least about 100 umol, at least about 200 umol, at least about 500 umol, at least about 1000 umol oxygen and/or hydrogen, or more, per $cm^2$ of incident simulated sunlight (i.e., AM 1.5 illumination) respectively, per hour.

Individual aspects of the overall chemistry involved in systems such as those described herein are generally known, and not all will be described in detail herein. It is to be understood that the specific systems described herein are exemplary only, and the components, connections, and techniques as described herein can be applied to virtually any suitable electrochemical system including those with a variety of solid, liquid, and/or gaseous fuels, and a variety of electrolytes, which may be liquid or solid under operating conditions (e.g., where suitable; generally, for adjacent components, one is solid and one is be liquid if any are liquids). It is also to be understood that system unit arrangements discussed are merely examples of systems that can make use of nanostructures as described herein. Many structural arrangements other than those disclosed herein, which make use of and are enabled by the present invention, will be apparent to those of ordinary skill in the art.

Any of the nanostructures described herein (e.g., comprising a bulk material, at least one catalytic material, a shell, and/or a photosensitizing agent) may be incorporated into devices known to those of ordinary skill in the art. In some cases, the device may be a solar energy conversion device, wherein the device converts solar energy (e.g., sunlight) via a chemical or electrical reaction. For example, the solar energy may be used to drive a reduction and/or oxidation reaction (e.g., as described herein).

In some cases, a device comprises a plurality of nanostructures in a solution. The solution in which the nanostructures are immersed may be formed from any suitable material. In most cases, the solution may be a liquid and may comprise water. In other cases, the solution may comprise a material for reaction (e.g., material in which a redox reaction is to take), for example, a hydrocarbon, HX, etc.). In some cases, the solution may contain a gas (e.g., $N_2$), wherein the solution may be saturated or substantially saturated with the gas. In some embodiments the solution may consist of or consist essentially of water, i.e. be essentially pure water or an aqueous solution that behaves essentially identical to pure water, in each case, with the minimum electrical conductivity necessary for an electrochemical system to function. In some embodiments, the solution may be selected such that the metal ionic species and the anionic species used for forming catalytic materials are substantially soluble. In some cases, when the nanostructure is to be used in a system immediately after formation, the solution may be selected such that it comprises water (or other fuel) to be oxidized by a system and/or method as described herein. For example, in instances where oxygen gas is to be catalytically produced from water, the solution may comprise water (e.g., provided from a water source). In some cases, the solution may be contained within a container which is substantially transparent to visible light (e.g., such that the nanostructure may be exposed to electromagnetic radiation through the container).

The metal ionic species and the anionic species may be provided to a solution (e.g. for forming a nanostructure and/or for operation of a system comprising nanostructure) by substantially dissolving compounds comprising the metal ionic species and the anionic species. In some instances, this may comprise substantially dissolving a metal compound comprising the metal ionic species and anionic compound comprising the anionic species. In other instances, a single compound may be dissolved that comprises both the metal ionic species and the anionic species. The metal compound and/or the anionic compound may be of any composition, such as a solid, a liquid, a gas, a gel, a crystalline material, and the like. The dissolution of the metal compound and anionic compound may be facilitated by agitation of the solution (e.g., stirring) and/or heating of the solution. In some cases, the solution may be sonicated. The metal species and/or anionic species may be provided in an amount such that the concentration of the metal ionic species and/or anionic species is at least about 0.1 mM, at least about 0.5 mM, at least about 1 mM, at least about 10 mM, at least about 0.1 M, at least about 0.5 M, at least about 1 M, at least about 2 M, at least about 5M, and the like. In some cases, the concentration of the anionic species may be greater than the concentration of the metal ionic species, so as to facilitate the formation of the catalytic material, as described herein. As non-limiting examples, the concentration of the anionic species may be about 2 times greater, about 5 times greater, about 10 times greater, about 25 times greater, about 50 times greater, about 100 times greater, about 500 times greater, about 1000 times greater, and the like, of the concentration of the metal ionic species. In some instances, the concentration of the metal ionic species will be greater than the concentration of the anionic species.

In some cases, the pH of a solution (e.g., for operation of a system and/or for formation of a nanostructure comprising at least one catalytic material) may be about neutral. That is, the pH of the solution may be between about 6.0 and about 8.0, between about 6.5 and about 7.5, and/or the pH is about 7.0. In other cases, the pH of the solution is about neutral or acidic. In these cases, the pH may be between about 0 and about 8, between about 1 and about 8, between about 2 and about 8, between about 3 and about 8, between about 4 and about 8, between about 5 and about 8, between about 0 and about 7.5, between about 1 and about 7.5, between about 2 and about 7.5, between about 3 and about 7.5, between about 4 and about 7.5, or between about 5 and about 7.5. In yet other cases, the pH may be between about 6 and about 10, between about 6 and about 11, between about 7 and about 14, between about 2 and about 12, and the like. In some embodiments, the pH of the solution may be about neutral and/or basic, for example, between about 7 and about 14, between about 8 and about 14, between about 8 and about 13, between about 10 and about 14, greater than 14, or the like. The pH of the solution may be selected such that the anionic species and the metal ionic species are in the desired state. For example, some anionic species may be affected by a change in pH level, for example, phosphate. If the solution is basic (greater than about pH 12), the majority of the phosphate is the form $PO_4^{-3}$. If the solution is approximately neutral, the phosphate is in approximately equal amounts of the form $HPO_4^{-2}$ and the form $H_2PO_4^{-1}$. If the solution is slightly acidic (less than about pH 6), the phosphate is mostly in the form $H_2PO_4^-$. The pH level may also affect the solubility constant for the anionic species and the metal ionic species.

In some cases, a nanostructure, in addition to the bulk material, at least one catalytic material, and/or at least one shell, may comprise a photosensitizing agent. In some cases, the photosensitizing agent is present between a catalytic material and the bulk and/or a shell material associated with the bulk. The photosensitizing agent may or may not be presented symmetrically or evenly on the nanostructure. For example, the photosensitizing agent may form on only a portion of the bulk material (or shell material associated with the bulk material). In some case, a nanostructure may comprise more than one type of photosensitizing agent. For example, a bulk material may comprise a first region and a second region, wherein the first region is associated with a first photosensitizing agent and/or a first surface-presenting catalytic material and the second region is associated with a second photosensitizing agent and/or a second surface-presenting catalytic material. See, for example, FIGS. 2I-2J for non-limiting arrangements.

In some cases, the photosensitizing agent may comprise functional groups which aid in the association of a catalytic material with the photosensitizing agent. As a specific non-limiting example, in one embodiment, a ruthenium dye is associated with (e.g. provided upon) a bulk material (e.g., comprising a semiconductor material), wherein the dye contains a chelate that is capable of associating with a ruthenium oxide catalytic material.

The incorporation of at least one photosensitizing agent may increase the conversion efficiency of a reduction and/or oxidation reaction. As an illustrative embodiment, electromagnetic radiation absorbed by a dye causes dye molecules to be transferred from a ground-state (Dye) to an excited state (Dye*) (e.g., see Equation 5). The excited state dyes may transfer electrons to the bulk (e.g., comprising a semiconductor material), resulting in the formation of a higher oxidation state dye (Dye⁺) and a reduced nanostructure (e⁻) (e.g., see Equation 6). The oxidized dye molecules may react with water, thereby resulting in the formation of oxygen (e.g., see Equation 7). The electrons may be transferred from a first region of the nanostructure to a second region of the nanostructure where they may react with protons to produce hydrogen gas (e.g., see Equation 8).

$$Dye + h\nu \rightarrow Dye^* \quad (5)$$

$$Dye^* \rightarrow Dye^+ + e^- \quad (6)$$

$$Dye^+ + \tfrac{1}{2}H_2O \rightarrow Dye + \tfrac{1}{4}O_2 + H^+ \quad (7)$$

$$H^+ + e^- \rightarrow \tfrac{1}{2}H_2 \quad (8)$$

A wide variety of photosensitizing agents may be employed. In some cases, the photosensitizing agent is formed on a surface of the bulk or shell associated with a bulk. The photosensitizing agent may have a single, a narrow range (e.g., less than about 100 nm range), a plurality, and/or a wide range (e.g., greater than about 100 nm range) of light absorption peaks. In some cases, the absorption may occur at a wavelength(s) between about 300 nm and about 1000 nm. In some cases, the photosensitizing agent may comprise a metal complex dye, an organic dye, quantum dots, etc. Quantum dots will be known to those of ordinary skill in the art and may comprise ZnS, ZnSe, ZnTe, CdS, CdSe, CdTe, PbS, $Bi_2S_3$, HgS, HgSe, HgTe, MgTe, GaN, GaP, GaAs, GaSb, InN, InP, InAs, InSb, AlAs, AlP, AlSb, AlS, and the like, or combinations thereof (e.g., CdTe/CdSe(core/shell), CdSe/ZnTe(core/shell)). Quantum dots may allow for improved stability as compared to some metal or organic dyes, tailoring of the band gap of the quantum dots (e.g., by size quantification), and/or tailoring of the optical absorption of the quantum dots.

In some cases the photosensitizing agent can be a polyoxometalate (POM), i.e., typically a polyatomic ion, usually an anion, including three or more transition metal oxyanions linked by shared oxygen atoms, where the metal atoms are usually Group 5 of Group 6 transition metals in high oxidation states. I.e., POMs are a class of inorganic metal-oxygen clusters. They generally comprise a polyhedral cage structure or framework bearing at least one negative charge which may be balanced by cations that are external to the cage. The framework of a polyoxometalate generally comprises a plurality of metal atoms, which can be the same or different, bonded to oxygen atoms. The POM may also contain centrally located heteroatom(s) surrounded by the cage framework. Non-limiting examples of classes of POMs which will be known to those of ordinary skill in the art include Keggin-type POMs (e.g., $[XM_{12}O_{40}]^{n-}$), Dawson-type POMs (e.g., $[X_2M_{18}O_{62}]^{n-}$), Lindqvist-type POMs (e.g., $[M_6O_{19}]^{n-}$), and Anderson-type POMs (e.g., $[XM_6O_{24}]^{n-}$) where X is a heteroatom, n is the charge of the compound, M is a metal (e.g., Mo, W, V, Nb, Ta, Co, Zn, etc., or combinations thereof), and O is oxygen.

In some cases the photosensitizing agent can be a metal complex dye and may comprise a metal such as ruthenium, platinum, or any other suitable metal and an organic component (e.g., a ligand) such as biquinoline, bipyridyl, phenanthroline, thiocyanic acid or derivatives thereof. In some instances, an organic dye may comprise an organic component such as a porphyrin-based system. The organic dyes may or might not comprise at least one metal (e.g., Zn, Mg, etc.). In some cases, the sensitizing agent may comprise a composition of the formula $ML_x(L')_y(SCN)_z$ where M is a metal (e.g., Ru), L and L' may be the same or different and are polypyridyl ligands (e.g., 4,4"-($CO_2H$)-2,2"-bipyridine), and x, y, and z can be the same or different and are any whole number 0, 1, 2, 3, etc.

In some cases, the photosensitizing agent comprises a porphyrin-based system, for example:

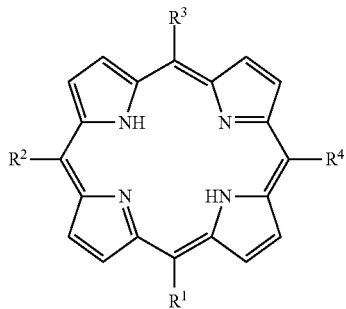

wherein $R^1$, $R^2$, $R^3$, and $R^4$ can be the same or different and are H, an alkyl, an alkenyl, an alkynyl, a heteroalkyl (e.g., $CF_2CF_2CF_3$), a heteroalkenyl, a heteroalkynyl, an aryl, or a heteroaryl, all optionally substituted, or are optionally absent (e.g., such that the compound is an anion, dianion, etc.). In some cases, additional carbons on the porphyrin may be optionally substituted. In some instances, the porphyrin may be an anion, dianion, etc. (e.g., such that at least one center nitrogen atom is an anion). In some embodiments, the porphyrin-based system may comprise a metal ion (e.g., such that the porphyrin is an anion or a dianion, etc., and the metal ion is coordinated in the center of the porphyrin by the nitrogen atoms). Non-limiting examples of such metals include Ru, Rh, Fe, Co, Mg, Al, Ag, Au, Zn, Sn, etc., as known to those of ordinary skill in the art. In a particular case, at least one of $R^1$ through $R^4$ is an aryl, for example, —$C_6H_5$, —$C_6F_5$, —$C_6H_4$(COOH), —$C_6H_4$OH, —$C_6H_4$($CH_3$), —$C_6H_4$(C(=O)O$CH_3$), (ortho, meta, or para)-$C_6H_3X_2$ where X is a halide (e.g., F, Cl, Br, I), etc. Non-limiting examples of porphyrins include, but are not limited to:

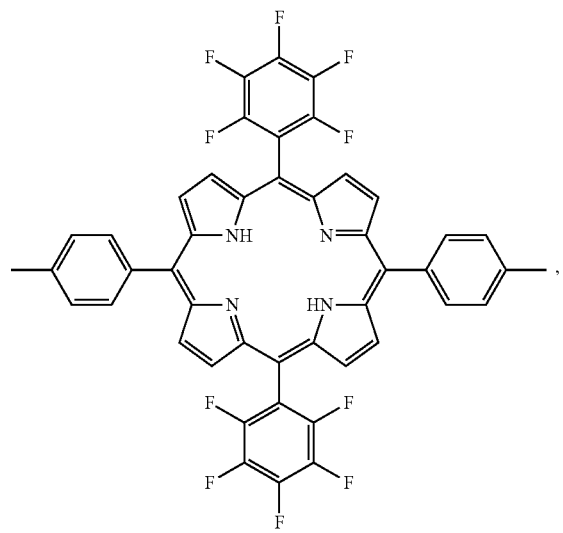

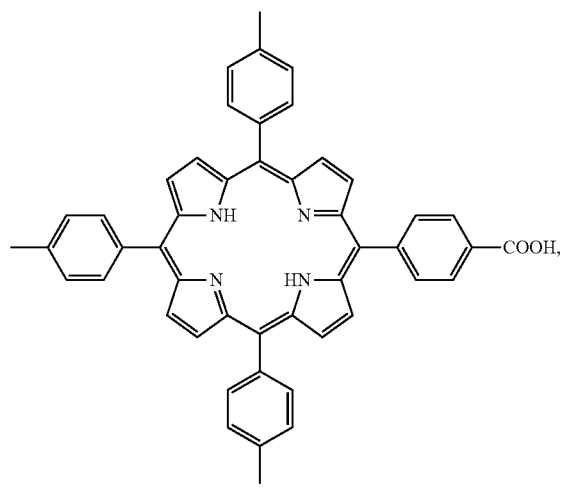

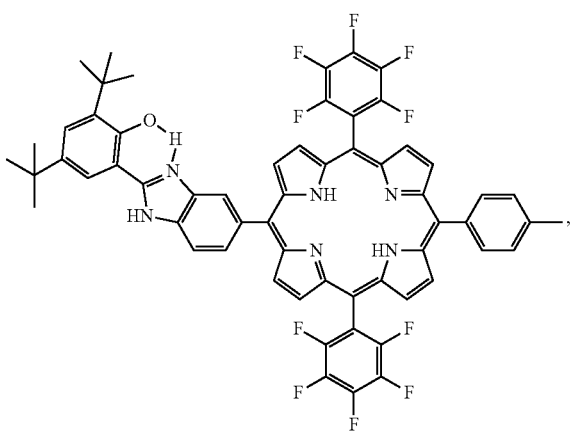

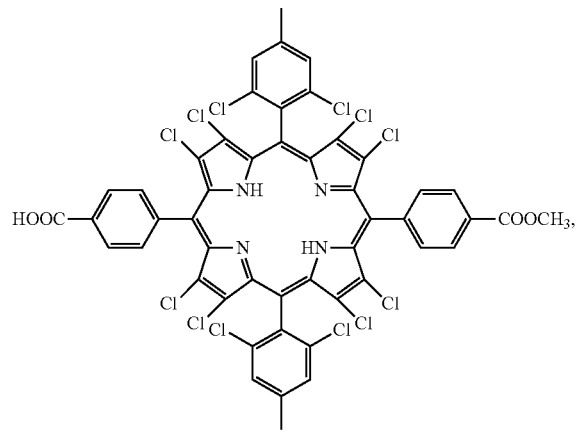

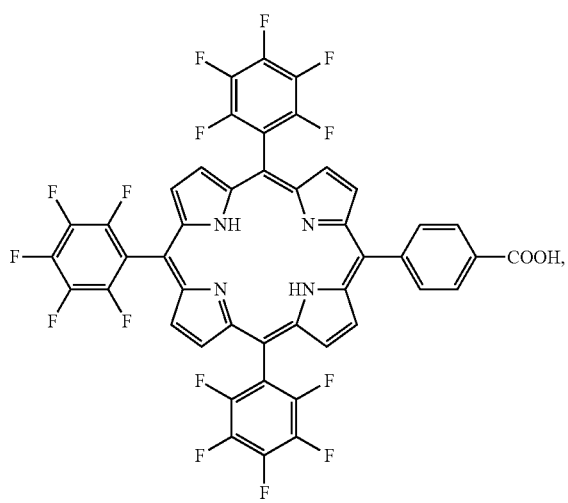

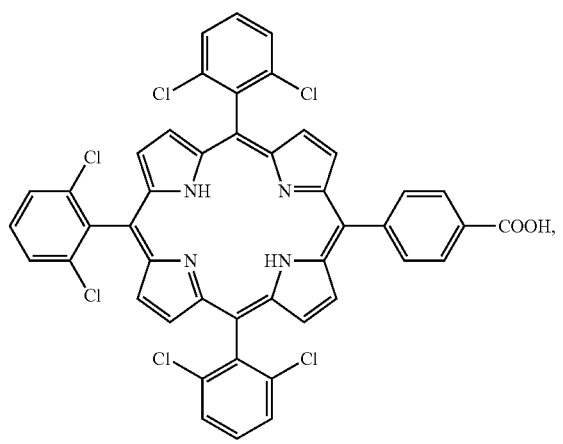

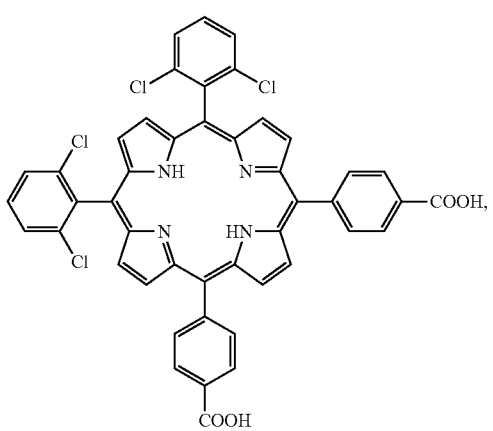

and

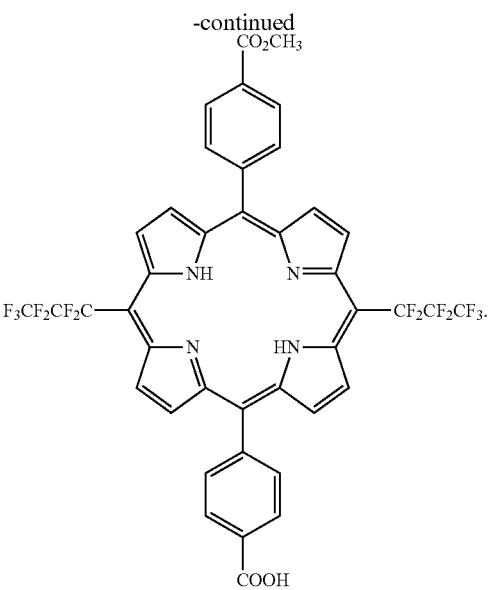

Additional suitable photosensitizing agents may include, for example, dyes that include functional groups, such as carboxyl and/or hydroxyl groups that can chelate to the nanoparticles, e.g., to Ti(IV) sites on a $TiO_2$ surface. Examples of suitable dyes include, but are not limited to, anthocyanins, phthalocyanines, merocyanines, cyanines, squarates, eosins, and metal-containing dyes. In some cases, a metal-containing dye may be a polypyridyl complex of ruthenium(II) (e.g., cis-bis(isothiocyanato)bis(2,2'-bipyridyl-4,4'-dicarboxylato)-ruthenium(II), tris(isothiocyanato)-ruthenium(II)-2,2': 6',2''-terpyridine-4,4',4''-tricarboxylic acid, cis-bis(isothiocyanato)bis(2,2'-bipyridyl-4,4'-dicarboxylato)-ruthenium (II)bis-tetrabutylammonium, cis-bis(isocyanato)(2,2'-bipyridyl-4,4' dicarboxylato)ruthenium (II), and tris(2,2'-bipyridyl-4,4'-dicarboxylato)ruthenium(II) dichloride).

As mentioned above, in some cases, the nanostructures and/or photocatalysts of the present invention may be used for photocatalytic reactions other than water splitting. Based on the teaching described herein, those of ordinary skill in the art would be able to select suitable nanostructure materials and/or related catalytic materials which could be used for other photocatalytic reactions. Non-limiting examples of photocatalytic reactions which may be carried out using a nanostructure of the present invention include formation of $X_2$ and $H_2$ from HX, wherein X is a halide (e.g., F, Cl, Br, I, etc.); formation of $CO_2$ and $H_2$ from organic compounds (e.g., $CH_4$, $CH_3OH$, CHOH, EtOH, n-propanol, glycerol, isopropyl alcohol, $CH_2CH_2$, etc.); and formation of $O_2$ and hydrocarbon from $CO_2$+water; formation of ammonia and $O_2$ from $N_2$ and water.

Electromagnetic radiation may be provided by any suitable source. For example, electromagnetic radiation may be provided by sunlight and/or an artificial light source. In an exemplary embodiment, the electromagnetic radiation is provided by sunlight. In some embodiments, light may be provided by sunlight at certain times of operation of a system (e.g., during daytime, on sunny days, etc.) and artificial light may be used at other times of operation of the system (e.g., during nighttime, on cloudy days, etc.). Non-limiting examples of artificial light sources include a lamp (mercury-arc lamp, a xenon-arc lamp, a quartz tungsten filament lamp, etc.), a laser (e.g., argon ion), and/or a solar simulator. The spectra of the artificial light source may be substantially similar or substantially different than the spectra of natural sunlight. The light provided may be infrared (wavelengths between about 1 mm and about 750 nm), visible (wavelengths between about 380 nm and about 750 nm), and/or ultraviolet (wavelengths between about 10 nm and about 380 nm). In some cases, the electromagnetic radiation may be provided at a specific wavelength, or specific ranges of wavelengths, for example, through use of a monochromatic light source or through the use of filters. The power of the electromagnetic radiation may also be varied. For example, the light source provided may have a power of at least about 100 W, at least about 200 W, at least about 300 W, at least about 500 W, at least about 1000 W, or greater. The formation and properties of the composition are described herein.

In some cases, a system may comprise a light management system and/or solar concentrator, which are capable of focusing electromagnetic radiation and/or solar energy. Generally, light management systems or solar concentrators may receive electromagnetic radiation and/or solar energy over a first surface area and direct the received radiation to a second, smaller, surface area. Light management systems and solar concentrators will be known to those of ordinary skill in the art and may comprise, for example, magnifying lenses, parabolic mirrors, and/or Fresnel lenses for focusing incoming light and/or solar energy. In some cases, the light management system or solar collector may collect and waveguide the light to an area or surface of the system, for example, a surface associated with the catalytic material, a nanostructure, etc.

The systems and methods as described herein, in some cases, may proceed at about ambient conditions. Ambient conditions define the temperature and pressure relating to the system and/or method. For example, ambient conditions may be defined by a temperature of about 25° C. and a pressure of about 1.0 atmosphere (e.g., 1 atm, 14 psi). In some cases, the conditions may be essentially ambient. Non-limiting examples of essentially ambient temperature ranges include between about 0° C. and about 40° C., between about 5° C. and about 35° C., between about 10° C. and about 30° C., between about 15° C. and about 25° C., at about 20° C., at about 25° C., and the like. Non-limiting examples of essentially ambient pressure ranges include between about 0.5 atm and about 1.5 atm, between about 0.7 atm and about 1.3 atm, between about 0.8 and about 1.2 atm, between about 0.9 atm and about 1.1 atm, and the like. In a particular case, the pressure may be about 1.0 atm. Ambient or essentially ambient conditions can be used in conjunction with any of the systems, compositions, catalytic materials, and/or methods described herein, in conjunction with any conditions (for example, conditions of pH, etc.).

In some cases, the systems and/or methods as described herein may proceed at temperatures above ambient temperature. For example, a system and/or method may be operated at temperatures greater than about 30° C., greater than about 40° C., greater than about 50° C., greater than about 60° C., greater than about 70° C., greater than about 80° C., greater than about 90° C., greater than about 100° C., greater than about 120° C., greater than about 150° C., greater than about 200° C., or greater. Efficiencies can be increased, in some instances, at temperatures higher than ambient. The temperature of the system may be selected such that the water provided and/or formed is in a gaseous state (e.g., at temperatures greater than about 100° C.). In other cases, systems and/or methods as described herein may proceed at temperatures below ambient temperature. For example, a system and/or method may be operated at temperatures less than about 20° C., less than about 10° C., less than about 0° C., less than about −10° C., less than about −20° C., less than about −30° C., less than about −40° C., less than about −50° C., less than about −60° C., less than about −70° C. or the like. In some instances, the temperature of the system and/or method may be affected by an external temperature source (e.g., a heating and/or cooling coil, infrared light, refrigeration, etc.). In other instances, however, the temperature of the system and/or method may be affected by internal processes, for example, exothermic and/or endothermic reactions, etc. In some cases, the system and/or method may be operated at approximately the same temperature throughout the use of the system and/or method. In other cases, the temperature may be changed at least once and/or gradually during the use of the system and/or method. In a particular embodiment, the temperature of the system may be elevated during times when the system is used in conjugation with sunlight or other radiative power sources.

In some cases, the systems and methods as described herein, may be carried out at elevated pressures. Non-limiting examples of elevated pressures include at least about 1.5 atm, at least about 2 atm, at least about 3 atm, at least about 5 atm, at least about 10 atm, at least about 20 atm, at least about 50 atm, at least about 100 atm, at least about 200 atm, or greater. In some cases, the pressure is between about 1 atm and about 200 atm, between about 1 atm and about 100 atm, between about 10 atm and about 100 atm, between about 50 atm and about 200 atm, or between about 100 atm and about 200 atm.

Water may be provided to the systems, nanostructures, and/or for the methods provided herein, using any suitable source. In some cases, the water is provided from a substantially pure water source (e.g., distilled water, deionized water, chemical grade water, etc.). In some cases, the water may be bottled water. In some cases, the water is provided from a natural and/or impure water source (e.g., tap water, lake water, river water, ocean water, rain water, lake water, pond water, sea water, potable water, brackish water, industrial process and/or waste water, etc.). In some cases, although it need not be, the water is not purified prior to use (e.g., before being provided to the system/nanostructures for electrolysis).

An electrolyte, as known to those of ordinary skill in the art is any substance containing free ions that is capable of functioning as an ionically conductive medium. In some cases, an electrolyte may comprise water, which may act as the water source. The electrolyte may be a liquid, a gel, and/or solid. The electrolyte may also comprise methanol, ethanol, sulfuric acid, methanesulfonic acid, nitric acid, mixtures of HCl, organic acids like acetic acid, etc. In some cases, the electrolyte comprises mixtures of solvents, such as water, organic solvents, amines and the like. In some cases, the pH of the electrolyte may be about neutral. That is, the pH of the electrolyte may be between about 5.5 and about 8.5, between about 6.0 and about 8.0, about 6.5 about 7.5, and/or the pH is about 7.0. In a particular case, the pH is about 7.0. In other cases, the pH of the electrolyte is about neutral or acidic. In these cases, the pH may range from about 0 to about 8, about 1 to about 8, about 2 to about 8, about 3 to about 8, about 4 to about 8, about 5 to about 8, about 0 to about 7.5, about 1 to about 7.5, about 2 to about 7.5, about 3 to about 7.5, about 4 to about 7.5, about 5 to about 7.5. In yet other cases, the pH may be between about 6 and about 10, about 6 and about 11, about 7 and about 14, about 2 and about 12, and the like. In a specific embodiment, the pH is between about 6 and about 8, between about 5.5 and about 8.5, between about 5.5 and about 9.5, between about 5 and about 9, between about 3 and about 11, between about 4 and about 10, or any other combination thereof. In some cases, when the electrolyte is a solid, the electrolyte may comprise a solid polymer electrolyte. The solid polymer electrolyte may serve as a solid electrolyte that conducts protons and separate the gases produces and or utilized in the electrochemical cell. Non-limiting examples of a solid polymer electrolyte are polyethylene oxide, polyacrylonitrile, and commercially available NAFION. Non-limiting embodiments of non-liquid electrolytes include electrolytes formed by using a lithium salt and an ion-conductive polymer such as polyethylene oxide or polypropylene oxide; gel polymer electrolytes formed by using a non-ionic conductive polymer such as poly(vinyl chloride), polyacrylonitrile, polymethyl methacrylate, poly(vinylidene fluoride), poly(vinyl) sulfone, or combinations thereof.

In some embodiments, the system may comprise an ion exchange membrane For example, anion exchange membranes and/or cation exchange membranes (i.e. ones with anion and/or cation exchangeable ions) may be used and are readily available from commercial sources (e.g., Tokuyama (Japan) or Fuma-Tech (Germany)—quaternary ammonium groups associated with a polymer). Non-limiting examples of anionic exchange membranes include poly(ethylene-co-tetrafluoroethylene), poly(hexafluoropropylene-co-tetrafluoroethylene), poly(epichlorhydrin-ally glycidyl ether), poly(ether imide), poly(ethersulfone)cardo, poly(2,6-dimethyl-1,4-phenylene oxide), polysulfone, or polyethersulfone, associated with a plurality of cationic species (e.g., quaternary ammonium groups, phosphonium groups, etc.).

In some cases, the electrolyte may be used to selectively transport one or more ionic species. In some embodiments, the electrolyte(s) are at least one of oxygen ion conducting membranes, proton conductors, carbonate ($CO_3^{-2}$) conductors, $OH^-$ conductors, and/or mixtures thereof. In some cases, the electrolyte(s) are at least one of cubic fluorite structures, doped cubic fluorites, proton-exchange polymers, proton-exchange ceramics, and mixtures thereof. Further, oxygen-ion conducting oxides that may be used as the electrolyte(s) include doped ceria compounds such as gadolinium-doped ceria ($Gd_{1-x}Ce_xO_{2-d}$) or samarium-doped ceria ($Sm_{1-x}Ce_xO_{2-d}$), doped zirconia compounds such as yttrium-doped zirconia ($Y_{1-x}Zr_xO_{2-d}$) or scandium-doped zirconia ($Sc_{1-x}Zr_xO_{2-d}$), perovskite materials such as $La_{1-x}Sr_xGa_{1-y}Mg_yO_{3-d}$, yttria-stabilized bismuth oxide, and/or mixtures thereof. Examples of proton conducting oxides that may be used as electrolyte(s) include, but are not limited to, undoped and yttrium-doped $BaZrO_{3-d}$, $BaCeO_{3-d}$, and $SrCeO_{3-d}$ as well as $La_{1-x}Sr_xNbO_{3-d}$.

In some cases, the electrolyte may comprise additives. For example, the additive may be an anionic species (e.g., as comprised in the catalytic material associated with a bulk material). The electrolyte may comprise the at least one anionic species. In some cases, the electrolyte can comprise an anionic species which is different from the at least one anionic species comprised in the catalytic material. For example, the catalytic material may comprise phosphate anions and the electrolyte may comprise borate anions. In some cases, when the additive is an anionic species, the electrolyte may comprise counter cations (e.g., when the anionic species is added as a complex, a salt, etc.). The anionic species may be good proton-accepting species. In some cases, the additive may be a good proton-accepting species which is not anionic (e.g., is a neutral base). Non-limiting examples of good proton-accepting species which are neutral include pyridine, imidazole, and the like.

In some cases, a composition is provided comprising a plurality of nanostructures of the invention. In some cases, the plurality of nanostructure comprise individual nanostructures. As used herein, "individual nanostructure" means a nanostructure free or essentially free of contact with another nanostructure (but not excluding contact of a type that may be desired between individual nanostructures, e.g., as in a crossbar array). For example, an "individual" or a "free-standing" article may, at some point in its life, not be attached to another article, for example, with another nanostructure, or the free-standing article may be in solution. This is in contrast to nanotubes produced primarily by laser vaporization techniques that produce materials formed as ropes. This is also in contrast to conductive portions of articles which differ from surrounding material only by having been altered chemically or physically, in situ, i.e., where a portion of a uniform article is made different from its surroundings by selective doping, etching, etc. An "individual" or a "free-standing" article is one that can be (but need not be) removed from the location where it is made, as an individual article, and transported to a different location and combined with different components to make a functional system such as those described herein and those that would be contemplated by those of ordinary skill in the art upon reading this disclosure.

The nanostructures of the present invention may be of any size or shape. In some embodiments, a nanostructure is a nanowire or a nanorod. The term "nanorod" refers to a nanoparticle having a longest dimension of at most 200 nm, and having an aspect ratio of from 3:1 to 20:1. In some cases, the nanorod has a maximum length of about 200 nm, or about 150 nm, or about 100 nm, or about 50 nm, or about 25 nm, or about 10 nm, or about 5 nm, or about 1 nm. The term "nanowire" means a nanofiber having a longest dimension greater than about 200 nm, about 300 nm, about 400 nm, about 500 nm, about 600 nm, about 700 nm, about 800 nm, about 900 nm, about 1 um, or greater. In one set of embodiments, the nanowire has at least one cross-sectional dimension ranging from 0.5 nm to 200 nm. The cross-section of the elongated semiconductor may have any arbitrary shape, including, but not limited to, circular, square, rectangular, tubular, or elliptical, and may a regular or an irregular shape. The wires or rods may have an aspect ratio (length to thickness) of at least about 2:1, or greater than about 5:1, or greater than about 10:1, or greater than about 100:1, or greater than about 500:1, or greater than about 1000:1, or greater.

The nanostructure size may be determined using techniques known to those of ordinary skill in the art, for example, standard microscopy techniques, including transmission electron microscopy (TEM) or dynamic light scattering (DLS).

In some embodiments, a nanostructure is a nanotube. As used herein, a "nanotube" is generally nanoscopic wire that is hollow, or that has a hollowed-out core, including those nanotubes known to those of ordinary skill in the art. The dimensions of nanotubes can be similar to those described above for nanowires.

In some embodiments, a nanostructure is a nanoparticle. The term "nanoparticle" generally refers to a particle having a maximum cross-sectional dimension of no more than 1 micron. Nanoparticles are generally spherical in shape, though other shapes are also possible. As used herein, the term "particle size" refers to the diameter of a particle, such as a substantially spherical particle, as determined by microscopy. In the event that a particle of the invention is not absolutely spherical, then size is determined by approximating the shape of the particle in the form of a sphere.

In some cases, a composition comprising a plurality of individual nanostructures may be formed by providing a solution of a plurality of nanostructures in solution. Nanostructures in solution may form a suspension wherein the nanostructure are free or essentially free of contact with other nanostructures. In some cases, the nanostructures in solution may be agitated (e.g., stirring, shaking) to prevent the nanostructures from settling in the solution. In some cases, however, the size of the nanostructures may be selected such that the nanostructures generally remain suspended in solution (e.g., do not settle) based upon solution mechanics and/or properties. In some cases, the nanostructures have a maximum dimension of less than 200 nm, thereby promoting the nanostructures to remain suspended in solution. In some cases, the nanostructures are nanorods having an average length of less than about 200 nm, less than about 150 nm, less than about 100 nm, or less.

In some aspects of the present invention, methods of using a nanostructure for photochemical reaction are provided. In some cases, a nanostructure is capable of carrying out photochemical water splitting. The method may comprise exposing a plurality of nanostructures (e.g., as described herein, and in some embodiments, comprising a first region and a second distinct region) to electromagnetic radiation. Upon exposure to electromagnetic radiation, an oxidation reaction may occur at the first region (e.g., n-type doped region of a nanostructure) and a reduction reaction may occur at the second region (e.g., p-type doped region of a nanostructure). As described herein, upon exposure to electromagnetic radiation, electrons and holes may be separated in the nanostructure, and the electrons and holes may be used to carry out a photochemical reaction (e.g., $H_2O$ to $H_2$ and/or $O_2$; $N_2$ and $H_2O$ to $NH_3$ and $O_2$; HX to $H_2$ and $X_2$, etc.). In some embodiments, the nanostructures comprise metal oxides.

In a particular embodiment, the photochemical reaction is water splitting, wherein oxygen and hydrogen gases are produced from water. In some cases, the nanostructure comprises a heterojunction (e.g., between two differing semiconductor materials with appropriate band gaps, and/or a p/n-junction). In the case of a nanostructure comprising a p/n-junction, electrons which are excited in the nanostructure upon exposure to electromagnetic radiation can travel to the p-type region of the nanostructure, where they can be used to reduce protons to hydrogen. Similarly, formed electron holes can travel to the n-type region of the nanostructure, where they can be used to oxidize water to oxygen.

A variety of definitions are now provided which may aid in understanding various aspects of the invention.

As used herein, an "elongated" article (e.g. a semiconductor or a section thereof) is an article for which, at any point along the longitudinal axis of the article, the ratio of the length of the article to the largest width at that point is greater than 2:1. This ratio is termed the "aspect ratio."

As used herein, a "width" of an article is the distance of a straight line from a point on a perimeter of the article, through the center of the article, to another point on the perimeter of the article. As used herein, a "width" or a "cross-sectional dimension" at a point along a longitudinal axis of an article is the distance along a straight line that passes through the center of a cross-section of the article at that point and connects two points on the perimeter of the cross-section. The "cross-section" at a point along the longitudinal axis of the article is a plane at that point that crosses the article and is orthogonal to the longitudinal axis of the article. The "longitudinal axis" of an article is the axis along the largest dimension of the article. Similarly, a "longitudinal section" of an article is a portion of the article along the longitudinal axis of the article that can have any length greater than zero and less than or equal to the length of the article. Additionally, the "length" of an elongated article is a distance along the longitudinal axis from end to end of the article.

As used herein, a "cylindrical" article is an article having an exterior shaped like a cylinder, but does not define or reflect any properties regarding the interior of the article. In other words, a cylindrical article may have a solid interior or may have a hollowed-out interior. Generally, a cross-section of a cylindrical article appears to be circular or approximately circular, but other cross-sectional shapes are also possible, such as a hexagonal shape. The cross-section may have any arbitrary shape, including, but not limited to, square, rectangular, or elliptical. Regular and irregular shapes are also included.

As used herein, the term "Group," with reference to the Periodic Table, is given its usual definition as understood by those of ordinary skill in the art. For instance, the Group II elements include Mg and Ca, as well as the Group II transition elements, such as Zn, Cd, and Hg. Similarly, the Group III elements include B, Al, Ga, In and Tl; the Group IV elements include C, Si, Ge, Sn, and Pb; the Group V elements include N, P, As, Sb and Bi; and the Group VI elements include O, S, Se, Te and Po.

In general, the term "aliphatic," as used herein, includes both saturated and unsaturated, straight chain (i.e., unbranched) or branched aliphatic hydrocarbons, which are optionally substituted with one or more functional groups, as defined below. As will be appreciated by those of ordinary skill in the art, "aliphatic" is intended herein to include, but is not limited to, alkyl, alkenyl, alkynyl moieties. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents, as previously defined.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups.

In some embodiments, a straight chain or branched chain alkyl may have 30 or fewer carbon atoms in its backbone, and, in some cases, 20 or fewer. In some embodiments, a straight chain or branched chain alkyl has 12 or fewer carbon atoms in its backbone (e.g., $C_1$-$C_{12}$ for straight chain, $C_3$-$C_{12}$ for branched chain), has 6 or fewer, or has 4 or fewer. Likewise, cycloalkyls have from 3-10 carbon atoms in their ring structure or from 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclohexyl, and the like. In some cases, the alkyl group might not be cyclic. Examples of non-cyclic alkyl include, but are not limited to, methyl, ethyl, propyl, isopropyl, n-butyl, tert-butyl, n-pentyl, neopentyl, n-hexyl, n-heptyl, n-octyl, n-decyl, n-undecyl, and dodecyl.

The terms "alkenyl" and "alkynyl" refer to unsaturated aliphatic groups analogous in length and possible substitution to the alkyls described above, but that contain at least one double or triple bond respectively. Alkenyl groups include, but are not limited to, for example, ethenyl, propenyl, butenyl, 1-methyl-2-buten-1-yl, and the like. Non-limiting examples of alkynyl groups include ethynyl, 2-propynyl (propargyl), 1-propynyl, and the like.

The terms "heteroalkenyl" and "heteroalkynyl" refer to unsaturated aliphatic groups analogous in length and possible substitution to the heteroalkyls described above, but that contain at least one double or triple bond respectively.

As used herein, the term "halogen" or "halide" designates —F, —Cl, —Br, or —I.

The term "aryl" refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated Pi electron system, while other, adjoining rings can be cycloalkyls, cycloalkenyls, cycloalkynyls, aryls, and/or heterocycles. The aryl group may be optionally substituted, as described herein. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl group. Non-limiting examples of aryl groups include phenyl, naphthyl, tetrahydronaphthyl, indanyl, indenyl and the like.

The terms "heteroaryl" refers to aryl groups comprising at least one heteroatom as a ring atom, such as a heterocycle. Non-limiting examples of heteroaryl groups include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein, may be attached via an aliphatic, alicyclic, heteroaliphatic, heteroalicyclic, alkyl or heteroalkyl moiety and thus also include -(aliphatic)aryl, -(heteroaliphatic)aryl, -(aliphatic)heteroaryl, -(heteroaliphatic)heteroaryl, -(alkyl)aryl, -(heteroalkyl)aryl, -(heteroalkyl)aryl, and -(heteroalkyl)-heteroaryl moieties. Thus, as used herein, the phrases "aryl or heteroaryl" and "aryl, heteroaryl, (aliphatic)aryl, -(heteroaliphatic)aryl, -(aliphatic)heteroaryl, -(heteroaliphatic)heteroaryl, -(alkyl)aryl, -(heteroalkyl)aryl, -(heteroalkyl)aryl, and -(heteroalkyl)heteroaryl" are interchangeable.

Any of the above groups may be optionally substituted. As used herein, the term "substituted" is contemplated to include all permissible substituents of organic compounds, "permissible" being in the context of the chemical rules of valence known to those of ordinary skill in the art. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and can not be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms.

Examples of substituents include, but are not limited to, aliphatic, alicyclic, heteroaliphatic, heteroalicyclic, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, heteroalkylthio, heteroarylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, (e.g., $SO_4(R')_2$), a phosphate (e.g., $PO_4(R')_3$), a silane (e.g., $Si(R')_4$), a urethane (e.g., R'O (CO)NHR'), and the like. Additionally, the substituents may be selected from F, Cl, Br, I, —OH, —$NO_2$, —CN, —NCO, —$CF_3$, —$CH_2CF_3$, —$CHCl_2$, —$CH_2OR_x$, —$CH_2CH_2OR_x$, —$CH_2N(R_x)_2$, —$CH_2SO_2CH_3$, —$C(O)R_x$, —$CO_2(R_x)$, —$CON(R_x)_2$, —$OC(O)R_x$, —$C(O)OC(O)R_x$, —$OCO_2R_x$, —$OCON(R_x)_2$, —$N(R_x)_2$, —$S(O)_2R_x$, —$OCO_2R_x$, —$NR_x$ $(CO)R_x$, —$NR_x(CO)N(R_x)_2$, wherein each occurrence of $R_x$ independently includes, but is not limited to, H, aliphatic, alicyclic, heteroaliphatic, heteroalicyclic, aryl, heteroaryl, alkylaryl, or alkylheteroaryl, wherein any of the aliphatic, alicyclic, heteroaliphatic, heteroalicyclic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted.

In some embodiments, a user may employ a single reactor compartment, container, or chamber. The systems may include a photocatalyst adapted to catalytically evolve $H_2$ and $O_2$ from water under illumination; a container capable of containing $H_2$, and a separator system adapted to separate $H_2$ from a mixture comprising at least $H_2$ and $O_2$.

Such reactors use water as a substrate for $H_2$ and $O_2$ production. The water need not be perfectly pure, as the water may include salt, minerals, or other impurities. Sea water may be used, as well as lake, stream, river, and rain water. Purified water may be used, but purified water is not a requirement. The water may even be waste water, and may include a supporting electrolyte (e.g. salts of hydroxide, chloride, sulfate, phosphate, borate, nitrate, and mixtures thereof). The water may be liquid or gaseous form.

The systems also suitably include a photocatalyst material. The photocatalyst is suitably adapted to photocatalyze the evolution of $O_2$ and $H_2$ from water. The photocatalyst is suitably disposed within the water container. Suitable photocatalysts are described herein, as well as in U.S. application 61/478,364 and in international application PCT/US2009/005521, both of which applications are incorporated herein by reference in their entireties for any and all purposes. Photocatalysts suitably include a semiconductor, a molecule, a polymer, a composite material, a protein or other biomolecule, or a biological organism (e.g. bacteria or algae). Photocatalysts may be of various shapes and sizes (e.g. rods, spheres, cubes, tetrapods, or irregular shapes and from 0.1 nm-1 cm or larger in size).

In some embodiments, suitable photocatalysts may operate according to the following mechanism. In some embodiments, a semiconductor particle may be in contact with water. Particles sizes may vary from less than 1 nm to about 1 nm-10 nm, 5 nm-50 nm, 20 nm-200 nm, 100 nm-1 micro-m, and larger than 1 micro-m. Upon excitation, electrons are produced in the semiconductor conduction band and electron-holes are produced in the semiconductor valence band. Electrons may then react with water to produce $H_2$ and the corresponding electron-holes may react with water to produce $O_2$. Typical semiconductor materials include metal oxides (e.g. $TiO_2$ and other suboxides of titanium, $Fe_2O_3$ and other iron oxides, $SrTiO_3$, $CuO$, $Cu_2O$, $BiVO_4$, $WO_3$) III-V semiconductor materials (e.g. GaAs, GaP, AlGaAs, InGaAs, InGaP, GaAsP, AlInAs), II-VI semiconductor materials (e.g., CdS, CdSe, CdTe, ZnTe, CdZnTe), and silicon, as well as doped versions thereof.

In embodiments where a nanostructure comprising a first region and a second region is exposed to light, charge separation may occur between the first region and the second region, wherein an excess of electrons are present in the first region and an excess of holes are present in the second region. For example, for a nanostructure comprising a first region defining primarily or exclusively a first semiconductor material and a second region defining primarily or exclusively a second semiconductor material, upon exposure to electromagnetic radiation, electrons may be excited from the valence band to the conduction band in the first region (e.g., comprising an n-type semiconductor), thereby creating holes in the valence band and free electrons in the conduction band. The excited electron and corresponding electron-hole may separate spatially within the n-type semiconductor material from the point of generation. The electrons produced at the first region may be transported (e.g., via the nanostructure material) to the second region of the nanostructure (e.g., comprising a p-type semiconductor). The separated electron-holes may be transported to a nanostructure-electrolyte interface at each region where they may be used to carry out an electrochemical reaction, e.g., a redox reaction. For example, the holes/electrons can react with a water molecule, resulting in the formation of oxygen gas and/or hydrogen ions. As another example, the holes/electrons can react with a halide ion (e.g., Br—; alternatively in the form HBr), resulting in the formation of halogen (e.g., $Br_2$; or $H_2$ and $Br_2$).

In some embodiments, the combination of the nanostructure bulk, any optional shell material, and any surface-presenting catalytic material (if different from the bulk), together, defines a nanostructure that is at least somewhat non-uniform with respect to semiconductor characteristic, and/or becomes at least somewhat non-uniform upon exposure to electromagnetic radiation. For example, in some embodiments, the nanostructure comprises a semiconductor material with dopants which are primarily n-type in nature in a first region and dopants which are primarily p-type in nature in a second region. For example, where the nanostructure is a nanorod, one region (e.g., end) of the nanorod can exhibit more n-type dopants with a second region (e.g., the other end) exhibiting more p-type dopants. Further information concerning suitable photocatalysts may be found in U.S. application 61/478,364 and in international application PCT/US2009/005521.

In some embodiments, the semiconductor particle may be in contact with a co-catalyst for the hydrogen evolution reaction (HER) and/or the oxygen evolution reaction (OER). Co-catalysts may consist of one or more islands deposited on the surface of the semiconductor particle or may consists of uniform shells which coat the particle. Typical HER catalysts include metals and metal alloys, such as Pt, Pd, Ni and Ni-based alloys (e.g. NiMo, NiZn, NiMoCd, NiMoZn, etc), Co and Co-based alloys (e.g. CoMo, CoZn, CoMoCd, CoMoZn, etc), Rh, Re, Ru, $MoS_2$, molecular catalysts, enzymes, and other biomolecules. Typical OER catalysts include metal oxides, such as oxides of Ir (e.g. $IrO_2$), oxides of Ru (e.g. $RuO_2$), oxides of Ni (e.g. NiO, NiO(OH)), oxides of Co (e.g. $Co_3O_4$, CoO(OH)), mixed metal oxides (e.g. NiFe), and various perovskites and pyrochlores. Other OER catalysts may include mixed metal-anionic species (e.g. Co-phosphate, Co-borate, and Ni-borate as described in the original MIT case), molecular catalysts (including coordination compounds and clusters of Ru and Ir), enzymes, and other biomolecules. Exemplary embodiments are described in U.S. application 61/478,364 and in international application PCT/US2009/005521.

In some embodiments, the photocatalyst may be dispersed in water (FIG. 1). In this case, the dispersion may be in the form of a colloidal suspension in which the particles do not settle out over a time (e.g. 1 week). In other cases, the dispersion may be a suspension of photocatalyst particles that readily settle from solution. In this case, the dispersion may or may not be mixed. Mixing may be achieved through convection, pumping, or stirring of the fluid. Additionally or alternatively, the system may include catalyst disposed on a surface of the container or compartment that contacts the water. The system may also include a catalyst support (e.g., a porous medium) on which the photocatalyst is deposited. Such embodiments allow the user to increase the contact between the photocatalyst and the water.

The reactors may also suitably include an apparatus, material, or system to collect gas (e.g., hydrogen) evolved within the system. The collector may be configured to contain gas at a given purity and, if desired, at a given pressure. Ranges for purity may be greater than 50%, greater than 70%, greater than 90%, greater than 95%, greater than 99%, and the like. Ranges for pressure include greater than 0.5 atm, of or about 1 atm, greater than 1 atm, greater than 10 atm, greater than 100 atm, greater than 1000 atm, and the like.

The system may also include a gas purification apparatus. The apparatus may be used to separate $H_2$ and $O_2$. In some embodiments, the $H_2$ and $O_2$ are present in a gaseous mixture. In this case, the $H_2$ and $O_2$ are to have an initial and final molar ratio, corresponding to the ratio of moles of $H_2$ to $O_2$ before and after being processed by the gas purification apparatus. Initial ratios of $H_2$:$O_2$ may be greater than 100:1, greater than 50:1, greater than 10:1, or about 2:1, or less than 1:10, less than 1:50, or less than 1:100. In other cases, the $H_2$ and $O_2$ may be dissolved in solution or may consist of bubbles in solution (e.g. during the generation of $H_2$ and $O_2$ from water).

In some cases, the gas purification apparatus may contain an electrochemical device. This device may, in some embodiments, be a proton-exchange membrane (PEM) fuel cell that is run in hydrogen pump mode to effect a selective transport of $H_2$ across the PEM membrane. The anode electrode in the cell may be comprised of supported platinum catalyst and a hydrocarbon ionomer (non-PFSA) ionomer. Such ionomers include aromatic structures with sulfonic acid functionalities, such as sulfonated polysulfones and the like. These ionomers have the characteristic of low oxygen solubility, which may aid in avoiding a combustible mixture being formed near the catalyst during the hydrogen pump. A gas diffusion medium may be impregnated with an oxygen-absorbing material (e.g, fluoropolymer) to further limit the diffusion of oxygen into the electrode. In addition to the above, cells comprised of porous water transport bipolar plates (e.g. as found in U.S. Pat. No. 6,723,461) may also be used to effectively bathe the electrode in water. This has the dual benefit of imparting high conductivity through high hydration, and quenching thermal energy should hydrogen-oxygen combustion occur over the catalyst due to both the high enthalpy of vaporization for water, and the local dilution of the combustible mixture that would result.

The gas purification apparatus may also include a gas absorbing material. The gas absorbing material may have a higher affinity for oxygen in the presence of hydrogen (deemed an "oxygen absorbing material") or a higher affinity for hydrogen in the presence of oxygen (deemed an "hydrogen absorbing material"). Exemplary oxygen absorbing materials include those used in the separation of oxygen from air, such as cyano-complexes of cobalt, cobalt salen complexes, and suitable polymer-based membranes. Other oxygen absorbing materials include globins (e.g. hemoglobin, myoglobin), oxygen binding proteins and molecules, and fluorinated polymers (fluorocarbons). Exemplary hydrogen absorbing materials include metals (e.g. Ni, Pd, Pt, Li, Mg) and forms of carbon (e.g., nanotubes). The gas absorbing material may be loaded and depleted of the desired gas through changes in temperature and/or pressure. Such pressure- and temperature-swing processes are well known to those of ordinary skill in the art.

In some cases the gas purification apparatus may separate hydrogen and oxygen through condensation. Because oxygen has a higher boiling point (90.15 K) than hydrogen (20.28 K), thus oxygen may be preferentially condensed as a liquid in the presence of hydrogen, as is known to those of ordinary skill in the art. The condenser may, in some embodiments, be powered by a fuel cell that itself operates using hydrogen, oxygen, or both that is evolved from the photocatalysis of water.

The gas collection apparatus may comprise a containment vessel for the water and the photocatalyst. At least a portion of this containment vessel is suitably transparent to at least a portion of the solar radiation spectrum. Containment vessels may comprise plastic, glass, metal, or combinations thereof or a host of other materials. In some cases, the containment vessel is a plastic bag or a plastic container. In other cases, the containment vessel may comprise a natural and/or man-made pond, lake, or body of water, which has been covered with a material to prevent mixing of the evolved gases with the atmosphere. The container is suitably impermeable to hydrogen, oxygen, or both. The container may be made of such an impermeable material. Alternatively, the container may be made of a first material and then be coated (inside or outside) with a quantity of impermeable material so as to confer impermeability on the container.

The container may be rigid or flexible. A system may include a plurality of bladders (e.g., formed in rollable plastic) that are in fluid communication with a gas collector or gas purifier. In this way, a user may have 2, 5, 10, or more hydrogen-producing vessels that feed to a gas purifier or separator that collects the hydrogen. A condenser or other separator may be disposed within or connected to the container. Alternatively, the separator may be in fluid communication with the container. For example, the container may have an outlet that places gas evolved from water within the container into fluid communication with a condenser or other separator system. As described elsewhere herein, the separator system may include a material that preferentially retains (e.g., adsorbs or absorbs) hydrogen or oxygen. In one embodiment, the user may deploy one or more containers across a body of water (e.g., ocean, lake, river). The containers may contain photocatalyst and be operated to evolve H2 and O2 from sea water. The containers may comprise separator systems to separate H2 from O2, or, alternatively, may be in fluid connection with a separator system that separates gas evolved from two or more containers.

Containers may also be deployed to collect rainwater, dew, or other condensation. The system may then be operated to evolve H2 or O2 from the gas mixture evolved from the water.

In some embodiments, the evolved gas is used to operate a fuel cell so as to produce electricity. The electricity may be used to power a device, or, alternatively, the electricity may be stored for later use. The evolved gases may also be combusted to provide energy in a combustion engine or other device.

As described elsewhere herein, a separator system may comprises a membrane that preferentially admits hydrogen or oxygen. The separator may also include an electrochemical device that, under application of power, is capable of transporting H2 across a membrane, or any combination thereof.

The disclosed systems may be configured or operated such that headspace above the water substrate may be flooded with hydrogen so as to reduce the relative concentration of oxygen present. This may reduce the risk of combustion with the hydrogen and oxygen. For example, the user may modulate the gas content within a container or compartment such that the ratio of H2 to O2 is below about 5:95 or above about 95:5.

In other embodiments, the reactor systems include two compartments or containers. As described elsewhere herein, the reactor suitably uses water as a substrate for $H_2$ and $O_2$ production. The systems suitably include a HER photocatalyst (absorbs light and catalyzes HER reaction). The systems also suitably include an OER photocatalyst (absorbs light and catalyzes OER reaction). The HER and OER photocatalysts suitably evolve H2 and O2, respectively, from water when illuminated. The systems also suitably include a gas collection apparatus (suitable for collection hydrogen, oxygen, or both), a redox mediator, and an ion conductor. In some embodiments, the HER photocatalyst is suitably disposed within one compartment, and OER photocatalyst is suitably disposed within another compartment, which are separated by a porous separator, membrane, salt bridge, or other mechanism to separate the $H_2$ and $O_2$ while allowing for the conduction of ions.

The water substrate may be water that is purified or unpurified, as described elsewhere herein. The HER and OER photocatalysts suitably absorb light and may comprise a semiconductor, a molecule, a polymer, a composite material, a protein or other biomolecule, or a biological organism (e.g. bacteria or algae). In some embodiments, the HER and OER photocatalysts are comprised of semiconductors selected such that the conduction and valence bands are of sufficient energy to catalyze the HER and OER reaction from water, respectively. For example, the HER photocatalyst has a conduction band energy more negative than $E°(H^+/H_2)=0$ V vs. the normal hydrogen electrode (NHE) at the standard state (pH 0, 25° C.); similarly, the OER photocatalyst has a valence band energy more positive than $E°(O_2/H_2O)=1.23$ V vs. NHE at standard state. Typical HER semiconductor photocatalyst materials include metal oxides (e.g. CuO, $Cu_2O$) III-V semiconductor materials (e.g. GaAs, GaP, AlGaAs, InGaAs, InGaP, GaAsP, AlInAs), II-VI semiconductor materials (e.g., CdS, CdSe, CdTe, ZnTe, CdZnTe), silicon, and doped versions thereof. Typical OER photocatalyst materials include metal oxides (e.g. $TiO_2$ and other suboxides of titatium, $Fe_2O_3$ and other iron oxides, $SrTiO_3$, CuO, $Cu_2O$, $BiVO_4$, $WO_3$) III-V semiconductor materials (e.g. GaAs, GaP, AlGaAs, InGaAs, InGaP, GaAsP, AlInAs), II-VI semiconductor materials (e.g., CdS, CdSe, CdTe, ZnTe, CdZnTe). Alternatively, HER and OER semiconductor photocatalysts may comprised materials that are connected in series via an ohmic contact to generate the required voltage to catalyze the HER and OER.

Photocatalysts may be of various shapes and sizes (e.g. rods, spheres, cubes, tetrapods, or irregular shapes and from 0.1 nm-1 cm or larger in size). In some cases the photocatalysts are dispersed in water. The dispersion may be in the form of a colloidal suspension in which the particles do not settle out over a reasonable period of time (e.g. 1 week). In other cases, the dispersion may be a suspension of photocatalyst particles that readily settle from solution. In this case, the dispersion may or may not be mixed. Mixing may be achieved through convection, pumping, or stirring of the fluid. In other embodiments, the catalyst is present on a surface of a reactor compartment, or even on a catalyst support (e.g., porous material) that is present inside the compartment.

These two-compartment systems may also include a gas collection apparatus. The apparatus serves to afford at least hydrogen (as obtained from the interaction of light, water, and the HER and OER photocatalysts) of given purity and within a containment vessel at a given pressure. Ranges for purity may be greater than 50%, greater than 70%, greater than 90%, greater than 95%, greater than 99%, and the like. Ranges for pressure include greater than 0.5 atm, of or about 1 atm, greater than 1 atm, greater than 10 atm, greater than 100 atm, greater than 1000 atm, and the like.

In some cases, the gas collection apparatus serves to define at least two compartments. In this case, at least one compartment comprises water and the HER photocatalyst (termed the "hydrogen compartment") and at least one other compartment comprises water and the OER photocatalyst (termed the "oxygen compartment"). Various physical and geometrical arrangements of the hydrogen and oxygen compartments are possible. The arrangements of the hydrogen and oxygen compartments may be selected so as to increase the overall efficiency of the photochemical conversion of sunlight and water to hydrogen and oxygen. For example, in one embodiment the oxygen compartment may be arranged such that it is between the incident solar irradiation and the hydrogen compartment. In such a configuration (termed a "tandem" configuration), OER photocatalysts may be selected such that the oxygen compartment absorbs higher energy photons of the solar spectrum (e.g. purple or blue light) and HER photocatalysts may be selected such that the hydrogen compartment absorbs lower energy photons of the solar spectrum (e.g. orange or red light).

In another embodiment, both the hydrogen and oxygen compartment may be irradiated with the same spectrum (e.g. the full spectrum) of incident solar irradiation. In this particular embodiment, the hydrogen and oxygen compartment may be arranged such that they are both between the incident solar spectrum and the earth (e.g. next to each other). The systems may have multiple containers, i.e., two or more containers for hydrogen evolution, two or more containers for oxygen evolution, or both. The "tandem" configuration may include two, three, or even more containers arranged in a stack, so as to reduce the footprint of the device and increase the amount of gas evolved per square foot of device footprint. The containers are suitably transparent or at least configured such that at least a portion of water and catalyst disposed within the containers may be exposed to illumination from exterior to the container.

The systems may also include one or more redox mediators. The redox mediator suitably serves to transport electrons from the OER photocatalyst to the HER photocatalyst and may consist of one or a variety of substance. The redox mediator may be an atom, a molecule, a protein or other biomolecule, a solid state material. A non-exhaustive list of redox mediators includes carbon, nitrogen, sulfur, boron, a halogen (fluoride, chloride, bromide, iodide), tin, uranium, a molecule, a dye, biomolecules (e.g., ferrodoxin, azurin, plastocyanine, cytochrome c, NADP$^+$/NADPH, NAD$^+$/NADH), transition metal ions (e.g., iron, vanadium, manganese, cobalt, chromium, copper, nickel, palladium, platinum, ruthenium, osmium, rhodium, iridium, rhenium), and/or coordination complexes (e.g. ferrocene/ferrocinium, $Fe(CN)_6^{3-}$/$Fe(CN)_6^{2-}$, $Co(phen)_3^{3+}$/$Co(phen)_3^{2+}$, etc). In some cases, the redox mediators are dispersed in solution with the HER and OER photocatalyst. In such embodiments, upon illumination of the system, electrons are transferred from the OER photocatalyst to a redox mediator or group of redox mediators. In this case, the "reduced" redox mediator or group of mediators is transported from the oxygen compartment to the hydrogen compartment, where electrons are then transferred from the mediator or group of mediators to the HER photocatalyst.

Figure 7:
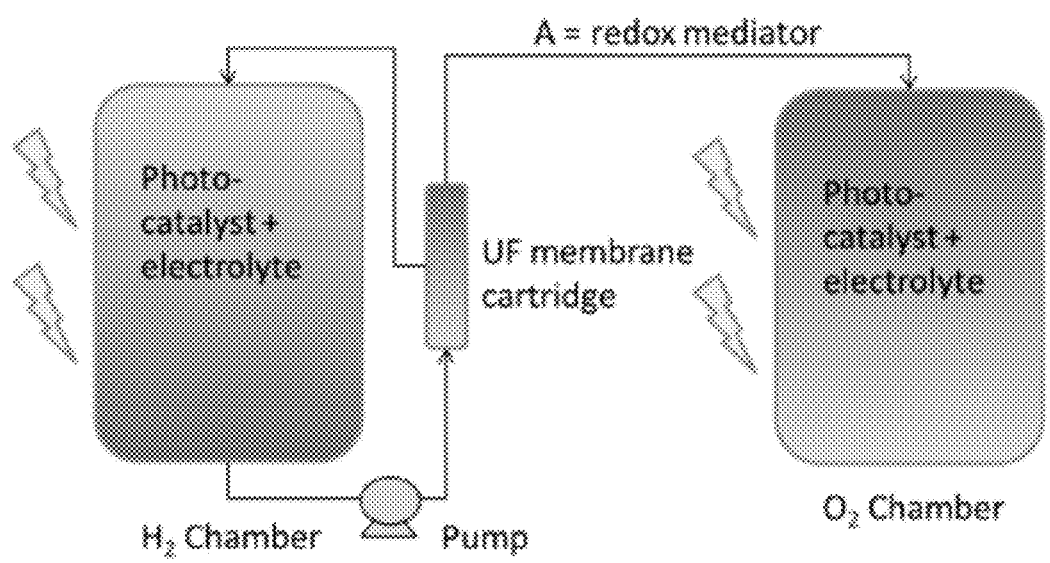
FIG. 7 depicts a UF membrane cartridge embodiment for a two-compartment reactor design.

Various mechanisms for transport of the mediator or group of mediators between the hydrogen and oxygen compartments may be available. In one case, the mediator or group may be transported through a membrane or separator which separates the hydrogen and oxygen compartments. The membrane or separator may be a porous separator, an ion exchange membrane, or other material as known to those skilled in the art. Various geometries for the membrane or separator are available with respect to the hydrogen and oxygen compartments. In some cases, the membrane or separator may comprise a portion or all of the interface between the hydrogen and oxygen compartments. In other cases the membrane or separator may consist of a ultrafiltration (UF) membrane cartridge (FIG. 7). The UF cartridge provides a size selective separation method and may be used to pass water and other ions while preventing mixing of the larger photocatalyst particles. UF cartridges are commercially available (e.g. hollow fiber and cross flow cartridges) and may be readily known by those skilled in the art. A pump, piston, or other device may be used to transport or otherwise circulate the redox mediator.

Figure 8:
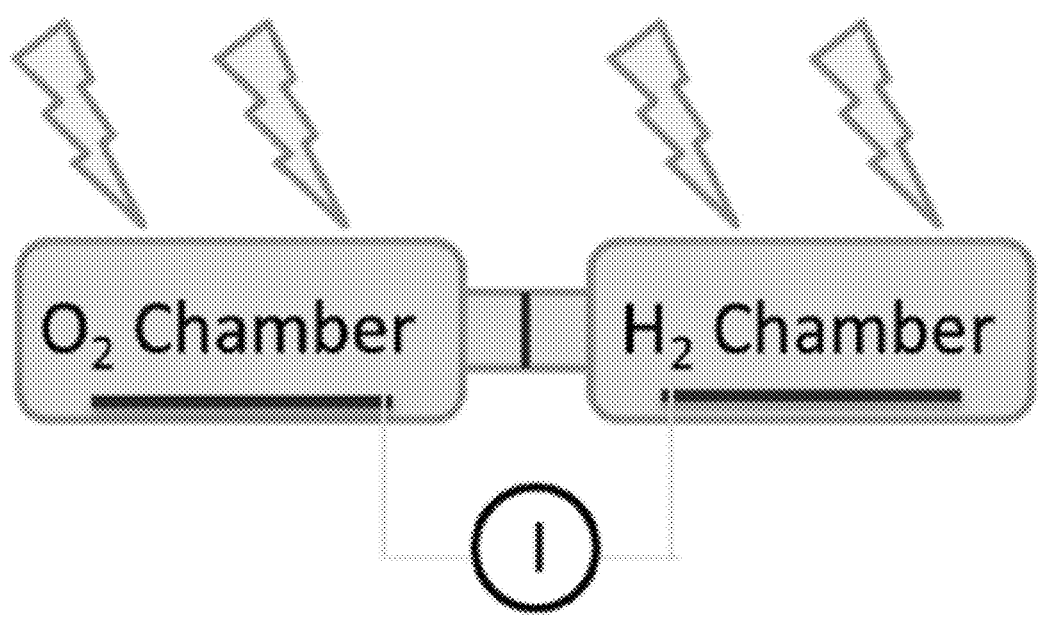
FIG. 8 depicts the use of conductive electrodes as redox mediators for a two-compartment reactor design.

In another embodiment, the redox mediator may comprise conductive electrodes which are immersed in the hydrogen and oxygen compartments and which are connected by wires (FIG. 8). The redox mediation may be a conductive material, such as a metal. In certain embodiments, upon illumination electrons are transferred from the OER photocatalyst to the electrode in the oxygen compartment, through the wire, to the electrode immersed in the hydrogen compartment, and to the HER photocatalyst. Various physical and geometric arrangement of the electrodes with respect to the hydrogen and oxygen compartment are possible. For example, the electrodes may line a portion or all of the inner walls of the hydrogen and/or oxygen compartments or they may be extend from the walls of the compartments into the hydrogen and/or oxygen compartments.

An ion conductor serves to transportions between the hydrogen and oxygen compartment (e.g. the transport of protons or hydronium from the oxygen compartment to the hydrogen compartment, the transport of hydroxide from the hydrogen compartment to the oxygen compartment, etc) and complete the circuit for photocatalytic water splitting. Put another way, an ion conductor places two containers into ionic communication with one another. In one case, the ion conductor may be a membrane or separator which separates the hydrogen and oxygen compartments. The membrane or separator may be a porous separator, an ion exchange membrane, or other material as known to those skilled in the art. Various geometries for the membrane or separator are available with respect to the hydrogen and oxygen compartments. In some cases, the membrane or separator may comprise a portion or all of the interface between the hydrogen and oxygen compartments. In other embodiments, the membrane or separator represents a portion of the interface between the compartments. The ion conductor may preferentially conduct hydronium, protons, hydroxide, sodium, potassium, ammonium, phosphate, borate, or any combination thereof.

The present disclosure also provides methods or producing hydrogen, oxygen, or both. These methods suitably include contacting water to a photocatalytic material adapted to catalytically evolve $H_2$ and $O_2$ from water under illumination. The methods also include illuminating the water and photocatalytic material (e.g., with sunlight) so as to catalytically evolve a mixture of $H_2$ and $O_2$ from the water. The user may also separate $H_2$ from the mixture of $H_2$ and $O_2$, separate $O_2$ from the mixture of $H_2$ and $O_2$, or both.

$H_2$ and/or $O_2$ separation may be effected by a separator system. Such systems include condensers, materials that preferentially retain or admit $H_2$ or $O_2$. The separator may also, as described elsewhere herein include a membrane. The separator may also include an electrochemical device that, under application of power, is capable of transporting $H_2$ across a membrane. Separation may be effected by pressure-swing or temperature-swing processes.

Additional production methods are also provided. These methods include, in a first chamber, contacting water and a first photocatalyst adapted to evolve $H_2$ from water under illumination; in a second chamber, contacting water and a second photocatalyst adapted to evolve $O_2$ from water under illumination; illuminating at least a portion of the first chamber (e.g., with sunlight) so as to effect catalytic production of $H_2$; and illuminating at least a portion of the second chamber (e.g., with sunlight) so as to effect catalytic production of $O_2$.

The methods further include comprising effecting transport of electrons from the second chamber to the first chamber. The methods also include effecting the transport of ions from the first chamber to the second chamber, from the second chamber to the first chamber, or both. The user may collect at least a portion of the $H_2$ evolved in the first chamber, at least a portion of the $O_2$ evolved in the second chamber, or any combination thereof. Methods of collecting (and separating) gases are described elsewhere herein in detail. Electron transport may be effected by a conductive material, such as a metal. Ion transport may be effected by a material that transports anions, cations, or both. Porous separators known to those of ordinary skill in the art may bused for this purpose, as well as an ion exchange membrane, such as Nafion™. The user may recover at least a portion of the evolved $H_2$, at least a portion of the evolved $O_2$, or both.

Ions conducted during the disclosed processes include protons, hydronium, hydroxide, alkali metal ions (e.g. $Li^+$, $Na^+$, $K^+$), alkaline earth metal ions (e.g., $Mg2+$, $Ca2+$, $Sr2+$), halide ions (e.g. F—, Cl—, Br—, I—), oxyanions of nitrogen (e.g., nitrate, nitrite), oxyanions of sulfur (e.g. sulphate), oxyanions of halogens (e.g. chlorate, chlorite, perchlorate, bromate, perbromate, iodate, periodate), oxyanions of boron (e.g. borate), oxyanions of phosphorus (e.g. phosphate), and the like.

In some embodiment, the disclosed materials include a light-absorbing semiconductor materials present in particulate form. These semiconductor materials may, in some embodiments, have a bandgap equal to or smaller than about 2.6 eV. Such materials may absorb much of the visible light in the solar spectrum, and attractive solar-to-hydrogen conversion efficiencies are thus obtained.

The particles catalytically convert sunlight and water to H2 and O2 with a solar-to-hydrogen efficiency of more than about 0.1% over a period of at least about 100 hours.

In some embodiments, the energetic position of the conduction and valence band edges of the materials are less than about 0 V vs. NHE (normal hydrogen electrode) and greater than about 1.23 V vs. NHE at the standard state, respectively. As such, photogenerated electrons have sufficient potential to participate in hydrogen evolution and photogenerated holes in the valence band have sufficient potential to realize O2 evolution. Hence, simultaneous H2 and O2 evolution may be effected. The disclosed materials may perform H2 and O2 evolution without the presence of sacrificial electron donors/acceptors.

In some embodiments, the disclosed materials may include a Hydrogen Evolution Co-catalyst (HEC) and/or an Oxygen Evolution Co-catalyst (OEC) so as to further effect H2 and O2 evolution. Such HEC and/or OEC materials are suitably present on an exterior surface of the body.

In some embodiments of the disclosed materials, light-absorbing materials may be surmounted by a shell. This shell may serve to prevent anodic/cathodic decomposition. Bodies formed of the disclosed light-absorbing materials may be made sufficiently small (e.g., less than 5 nm in cross-sectional dimension) so as to prevent recombination during carrier transport from the point of generation towards the particle/electrolyte interface. By cross-sectional dimension is meant thickness, diameter, or even width, as the bodies may be present as, e.g., particles, flakes, platelets, sheets, and the like.

In one embodiment, the disclosed materials may be in a core-shell structure; core-shell nanoparticles are considered especially suitable. In such structures, the structure comprises a core that is surmounted by a shell of an insulating material. Bodies having this configuration suitably have at least one cross-sectional dimension of less than about 0.5 mm. A platelet or flake configuration may also be used, where a central layer (which need not be spherical in shape) may be encased in a shell material. The shell suitably encases the entirety of the core, although total coverage is not a requirement.

Without being bound to any particular theory, a core formed from a light-absorbing but unstable material may be coated with a shell of an insulating material that protects the core against corrosion. As an example, dissolution of a light-absorbing particle (e.g. $Cd^{2+}$ dissolution from CdS) is reduced or even prevented by encapsulating the unstable particle in a stable insulating shell, which shell is suitably transparent to at least a portion of the visible illumination spectrum. The core materials are suitably photoactive, being capable of evolving electrons and electron holes in response to illumination.

Some existing catalytic materials entail protection of unstable materials by encapsulation in conductive shells, such as a gold or gold-SiO2 shell. In such materials, charge transport through the shell relies on conduction. The use of conducting shells, however, may entail at least partial absorption of incident light, which in turn results in reduced solar-to-fuel conversion efficiencies. Also, a conductive coating leads to increased recombination, as the conductive coating may act as a pathway for shunt currents, resulting in increased electron-hole recombination and concomitant lower conversion efficiencies. In addition, a conductive shell frustrates the creation of materials that have two catalytic sites at different potentials.

Without being bound to any particular theory, the disclosed materials operate by way of tunneling transport, and the disclosed coatings do not exhibit the above-mentioned problems of conductive shells. Coatings having a thickness in the range of from about 0.5 nm to about 10 nm are considered especially suitable.

A non-exhaustive listing of core materials includes:
Chalcogenides such as $MoS_2$, $WS_2$, $MoSe_2$, $FeS_2$, CdS, CdSe, and CdTe, etc.
Various (oxy)nitrides and oxysulfides, such as TaON, GaN, $Ge_3N_4$, $Ta_3N_5$, etc.
III-V semiconductor particles such as InP, GaAs, GaInP, InAs, etc.
Crystalline and/or amorphous silicon, germanium, and their alloys.

Any of the forgoing materials may also be doped for use in the disclosed materials. Suitable dopants include $Ag^+$, $Mg^{2+}$, $Ca^{2+}$, $Sr^{2+}$, $Ba^{2+}$, $Zn^{2+}$, $Ca^{2+}$, $Cu^{2+}In^{3+}$, $Ga^{3+}$, $Si^{4+}$, $Ge^{4+}$, $Ti^{4+}$, $Pt^{4+}$, $V^{5+}$, and $Nb^{5+}$. Other transition metal cations and combinations of any of the foregoing may be used. These materials can be synthesized by precipitation techniques, (hydro)thermal synthesis, solid state reactions, gas-phase growth techniques (e.g. VLS, Vapor-Liquid-Solid growth) or a combination of these techniques.

Insulating shell materials include, for example, oxide materials such as $SiO_2$, $Al_2O_3$, $TiO_2$, $ZrO_2$, $HfO_2$, SnO2, and the like. The shell (e.g., oxide) layer may be disposed conformally on the light-absorbing particles and is suitably stable against anodic/cathodic dissolution over a wide range of pH values. Film layers on particles can be deposited with thickness control by using Atomic Layer Deposition (ALD) in a fluidized bed reactor or rotary reactor configuration. ALD is considered an especially suitable deposition method. A shell is suitably uniform in thickness and is also suitably non-porous so as to prevent corrosion. Conformal coatings of insulating layers may also be achieved by means of Stöber, sol-gel, and/or microemulsion techniques.

The choice of a particular shell material may depend on the medium in which water splitting will be performed. In cases when water splitting may be performed under basic conditions (pH of greater than about 12), $TiO_2$ or $HfO_2$ are considered especially suitable in alkaline conditions. The alignment of energy levels between the light absorber and the oxide layer may also inform the choice of the material for the oxide shell. As one example, the energy level of the conduction band edge of $TiO_2$ is positioned lower than that of CdS; after illumination of $TiO_2$-coated CdS particles, the electron may be transferred to the lower-lying $TiO_2$ CB edge, thereby losing some of its potential energy. This charge transfer is not possible when CdS is coated with high-bandgap oxides (e.g. $SiO_2$, $HfO_2$); applying shells of these materials, ballistic electron tunneling is expected to take place without energy losses.

The present disclosure also provides iron oxide (e.g., hematite ($\alpha$-$Fe_2O_3$) or maghemite ($\gamma$-$Fe_2O_3$)) bodies. These bodies are suitably nanoparticles (which need not be spherical in configuration) of less than about 50 nm diameter, on which both water oxidation ($O_2$ evolution) and proton reduction ($H_2$ evolution) take place. Iron oxide bodies (e.g., particles) according to the present disclosure are modified by incorporating cation dopants (e.g. $Mg^{2+}$, $Zn^{2+}$, $Si^{4+}$ transition metal cations, etc.) so as (without being bound to any particular theory) to shift the conduction band edge to a position favorable for proton reduction. The doped p-type iron oxide bodies are suitably of dimensions similar to or smaller than the hole diffusion length—this size enables the carriers to reach the interface and the presence of suitable dopants enables hydrogen evolution on $Fe_2O_3$, opening the prospect of efficient oxygen and hydrogen evolution on $Fe_2O_3$ particles.

The iron oxide bodies (which may be present as particles) can be coated with a thin shell consisting of an oxide material (which may be different than iron oxide) as mentioned elsewhere herein, the iron oxide bodies may be doped. Possible dopants include $Mg^{2+}$, $Zn^{2+}$, $Ca^{2+}$, $Cu^{2+}$, $Si^{4+}$, $Ge^{4+}$, $Ti^{4+}$, $Pt^{4+}$, $V^{5+}$, and $Nb^{5+}$. Other transition metal cations and combinations of any of the foregoing may be used. Long-term catalytic activity of $Fe_2O_3$ based photocatalysts is enhanced by stable aqueous dispersions in which the particles do not agglomerate: once agglomeration occurs, the distance photogenerated carriers have to traverse to the particle surface may become too long, leading to recombination and concomitant lower catalytic activity. Dispersions of particles in aqueous media can be stabilized electrostatically because protons, hydroxyl-ions, or other ions present in the dispersion (e.g. phosphate, borate, perchlorate, sulfate, nitrate, etc.) adsorb to the surface of the particle. Under these conditions, the particles are charged, and electrostatic repulsion prevents aggregation and subsequent precipitation. The surface charge of particles is the result of acid-base equilibria.

When the pH of the medium is close to the Point of Zero Charge (PZC), the surface charge is zero and the dispersion may be unstable. The PZC is a material property; for instance, the PZC for hematite ranges from about 5.5 to about 9. Water oxidation on hematite may be performed under basic conditions (e.g., pH in the range of from about 9 to about 14), which is relatively close to the PZC of hematite. Under such conditions, agglomeration of hematite particles may occur. By contrast, the PZC of silica ($SiO_2$) is located at pH 2-4, which is somewhat removed from typical water oxidation conditions (pH of greater than about 9). Hence, coating hematite particles with an insulating silica shell reduces or prevents $Fe_2O_3$ particle agglomeration in basic (water oxidation) conditions, promoting long-term catalytic activity.

Bodies (e.g., particles) of the disclosed materials may also be decorated with both HEC and OEC materials, i.e., the disclosed materials may present HEC and OEC regions. As described above, the above mentioned generation of $H_2$ and $O_2$ using photocatalytic particles is based on materials having relatively low bandgap ($\leq$about 2.6 eV). For these materials, the driving force for electrons in the conduction band and holes in the valence band to drive hydrogen evolution and oxygen evolution, respectively, is comparatively small compared to materials with a larger bandgap. A small driving force may result in sluggish kinetics of $H_2$ and/or $O_2$ evolution. Such slow reaction kinetics may be overcome by integrating the light-absorbing particles with suitable catalysts for both $H_2$ and $O_2$ evolution. Without being bound to any one theory, effective co-catalysts may increase the solar-to-hydrogen conversion efficiency as a result of one or more of the following:

Increased yields of charge separation. Holes accumulate on the OEC sites and electrons accumulate on the HEC sites, and charge separation is efficient and electron-hole recombination is reduced.

Increased H2 and O2 evolution rates. $H_2$ and $O_2$ evolution are multi-electron reactions and the surfaces of some light-absorbing materials are less than friendly to these chemical reactions. Suitable catalytic centers at the particle interface may greatly enhance reaction rates for both the HER (hydrogen evolving reaction) and OER (oxygen evolving reaction).

Prevention of anodic/cathodic decomposition. In the event that anodic and/or cathodic decomposition reactions compete with $O_2$ and/or $H_2$ evolution, decoration with suitable HEC and OEC catalyst materials may increase the reaction rates for $H_2$ and $O_2$ evolution so as to outcompete the decomposition reactions.

Suitable OEC materials include metal oxides (e.g. RuO2, IrO2, and various cobalt- and nickel-based oxides), amongst others. Suitable HEC materials include Pt, Rh, Ir, Pd, Ru, RuO2, NiO, and Ni, amongst others.

The HEC and OEC can be deposited by various methods such as photodeposition and precipitation. One advantage of photodeposition is that catalyst material is deposited on those surface sites where photogenerated electrons and holes accumulate spontaneously. Hence, the HEC and OEC materials may be deposited on 'active sites' requiring less catalyst material than in the case where light-absorbing particles are conformally coated by HEC/OEC material.

Conventional precipitation techniques may also be used to selectively deposit HEC/OEC material on oxide-coated light-absorbing particles. Adding a precursor solution (for HEC/OEC) to a dispersion of oxide-coated light-absorbing particles may result in selective precipitation of the HEC/OEC material onto the already present particles, as the surface tension at the solid-solid interface is smaller than the surface tension at the solid-solution interface, favoring heterogeneous precipitation at the particle surface over homogeneous precipitation in the solution. Conventional electrodeposition is also a suitable technique for HEC/OEC deposition.

In one embodiment, the present disclosure provides a catalytic body comprising a core portion comprising a material having a bandgap in the range of from about 1.23 eV to about 2.6 eV, the catalytic body being capable of catalytically converting sunlight and water to $H_2$ and $O_2$ with a solar-to-hydrogen efficiency of more than about 0.1% over a period of at least about 100 hours. The solar-to-hydrogen efficiency n is defined as $n=(R_{H2}*2*FE_{red}/P_{sol}$, where $R_{H2}$ is the rate of hydrogen production (per unit of illuminated reactor area), the factor 2 corresponds to the amount of electrons required to make one $H_2$ molecule, F is the Faraday constant, $E_{red}$ is the standard redox potential of 1.23 V for water splitting, and $P_{sol}$ is the power density of solar irradiation.

The rate of $H_2$ production, for purposes of this disclosure, is defined as moles of $H_2$ per second per unit area reactor that is illuminated. This measurement thus refers to the moles of $H_2$ that are produced in a given reactor volume, defined by the unit surface area multiplied with reactor depth. The power density of solar irradiation is defined as being about 100 $mW/cm^2$ for AM1.5 irradiation. The upper limit of the catalytic bodies' efficiency is at least partially defined by the bandgap of the light-absorbing core, determining how many photons can be absorbed, hence setting the upper value for $R_{H2}$.

As described elsewhere herein, catalytic bodies according to the present disclosure may also include a shell portion that surmounts at least a portion of the core portion. The shell suitably has a thickness in the range of from about 0.5 nm to about 10 nm, or even in the range of from about 1 nm to about 5 nm. The bandgap of the core portion is suitably measured using UV-VIS absorption spectroscopy. The thickness of the shell portion may be measured using electron microscopy.

A catalytic body according to the present disclosure suitably has a cross-sectional dimension (defined elsewhere herein) in the range of from about 0.5 nm to about 5 mm, or even in the range of from about 10 nm to about 1 mm, or even from about 1 nm to about 10 nm.

A catalytic body may be characterized as being configured such that the energetic position of the conduction band edge is less than 0 V relative to NHE at the standard state, and wherein the energetic portion of the valence band is greater than about 1.23 V relative to the Normal Hydrogen Electrode (NHE) at the standard state of about 25° C. and about 1 bar.

The shell may be characterized as being essentially transparent to illumination in the range of from about 380 nm to about 700 nm, or from about 400 nm to about 650 nm, or even about 500 nm.

Oxides are considered especially suitable materials for use as shells. Suitable oxides include SiO2, Al2O3, TiO2, ZrO2, HfO2. MgO, ZnO, NiO, $SnO_2$, Ta2O5, $V_2O_5$, cobalt oxide, and the like. Combinations or mixtures of oxides are also suitable. The shell is suitably chemically stable in photocatalytic water splitting conditions, and the shell material is also suitably capable of being applied as a thin film, e.g., via atomic layer deposition (ALD). Without being bound by any particular theory, it is believed that such thin shells allow for electron transport through the shell by tunneling, which mechanism differs from the conductive mechanisms seen in existing materials. The shell may be essentially free (i.e., having less than about 1%) of metal, or may even be a pure oxide that is entirely free of metal.

The cores may be formed from a number of materials. A non-exhaustive listing of such materials includes chalcogenides, (oxy)nitrides, (oxy)sulfides, a Group III-V semiconductor (e.g. InP or GaAs), crystalline silicon, amorphous silicon, crystalline germanium, amorphous germanium, any alloy thereof, or any combination thereof. Photoactive materials (e.g., CdS, CdSe) may be purchased commercially. Alternatively, core particles may be synthesized by techniques known in the art such as (co-)precipitation, sol-gel methods, solid-state synthesis, and gas-phase growth techniques (e.g. chemical vapor deposition or vapor-liquid-solid growth), amongst others. Suitable chalcogenides include MoS2, WS2, MoSe2, FeS2, CdS, CdSe, CdTe, PbS, and combinations thereof. CdS, CdSe, and $MoSe_2$ are considered especially suitable. TaON, GaN, Ge3N4, Ta3N5, or combinations thereof are all considered suitable oxynitrides; TaON and $Ta_3N_5$ are especially suitable. Iron oxides (including maghemite, hematite, and other iron oxide forms) are also suitable.

Suitable (oxy)sulfide materials include $Sm_2Ti_2O_5S_2$, La-based oxysulfides, FeS, NiS, $Ag_2S$, CoS, or any combination thereof. Suitable group III-V semiconductors (which may be present in particle form) include InP, GaAs, GaInP, InAs, and the like, as well as combinations thereof. InP is especially suitable. As is described elsewhere herein, the disclosed bodies may also include hydrogen-evolving (HEC) and oxygen-evolving co-catalyst (OEC) materials. The HEC and OEC materials may contact the core of the body or even contact the shell of the body if such a shell is present.

Figure 9:
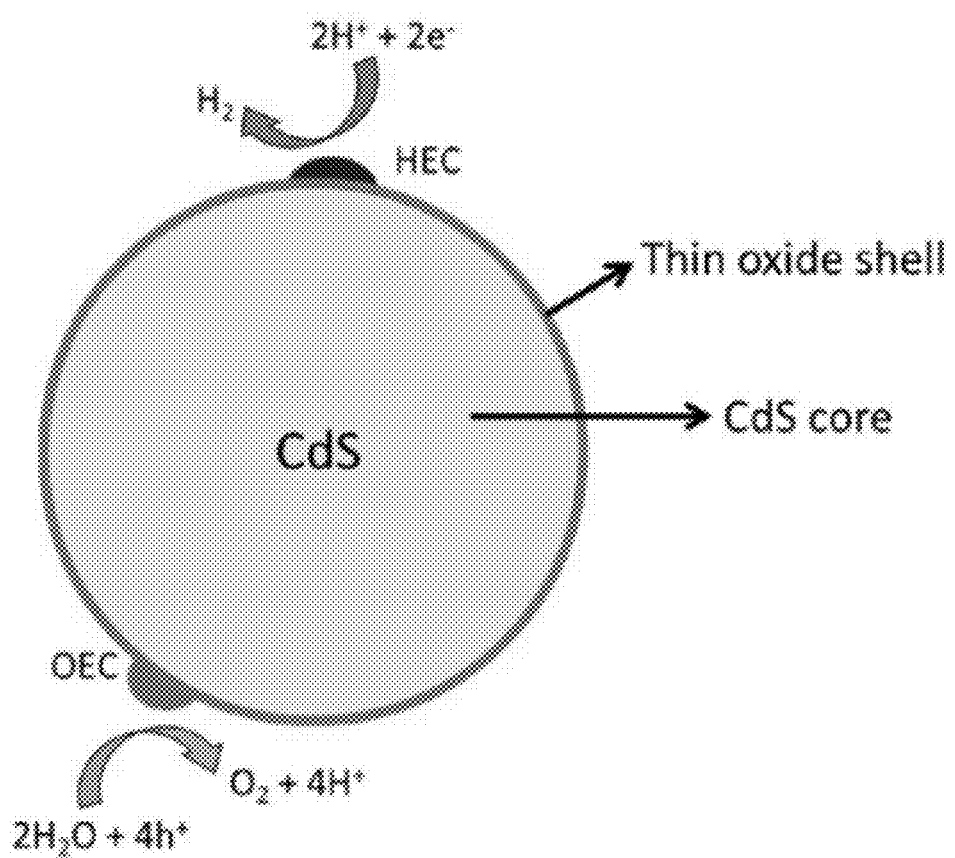
FIG. 9 depicts a schematic of a photocatalytic core-shell particle that comprises a light-absorbing core material that is unstable under water splitting conditions.

FIG. 9 presents a schematic of a photocatalytic core-shell particle. The particle comprises a light-absorbing core material that is unstable under water splitting conditions. In a photocatalyst based on cadmium sulfide (CdS), for instance, illumination in aqueous environment results in dissolution of Cd2+ ions from the particle. The core CdS may be protected by a thin (e.g., from about 0.5 nm to about 10 nm) shell of stable insulating oxide material. This dense film can effectively protect the core particle from dissolution but is sufficiently thin to allow tunneling of photogenerated charge carriers through the thin film, enabling them to participate in water splitting at the HEC and the OEC. As described elsewhere herein, suitable shell materials include TiO2, ZrO2, SiO2, HfO2, amongst others.

Alternative catalytic bodies, in addition to those described previously, are also provided herein. Such bodies suitably include a core comprising iron oxide (e.g., $\alpha$-$Fe_2O_3$, $\gamma$-$Fe_2O_3$, or both), the core further comprising a cationic dopant, and the core defining a cross-sectional dimension in the range of from about 0.5 nm to about 50 $Mg^{2+}$, $Zn^{2+}$, $Ca^{2+}$, $Cu^{2+}$, $Si^{4+}$, $Ge^{4+}$, nm. A variety of cationic dopants may be used, e.g., $Ti^{4+}$, $Pt^{4+}$, $V^{5+}$, $Nb^{5+}$. Other transition metal cations and combinations of any of the foregoing may be used. The cationic dopant may be present at from about 0.01% to about 10% atomic concentrations, or from about 2% to about 8% atomic concentration. Atomic concentrations of from about 0.1% to about 5% atomic concentration are considered especially suitable.

The energetic position of the conduction band edge is suitably less than 0 V relative to NHE at the standard state, and wherein the energetic portion of the valence band is greater than 1.23 V relative to the Normal Hydrogen Electrode (NHE) at the standard state of 25° C. and 1 bar.

In some embodiments, a shell portion encloses the core. As described elsewhere herein, oxides are considered suitable shell materials; the materials is suitably chemically stable in photocatalytic water splitting conditions (over a wide pH range) and may be applied as a very thin film. In some embodiments, a stable colloidal dispersions may be achieved when, the value of the point of zero charge of the shell material differs by about 5 pH units from the pH value in which water splitting is performed. The difference need not be about 5 pH units, as the difference may be less than 5 units (e.g., 1, 2, 3, or about 4 units) or even greater than 5 units (e.g., 6, 7, 8, or even 9 units). The shell is suitably essentially transparent to visible light, as described above.

Figure 10:
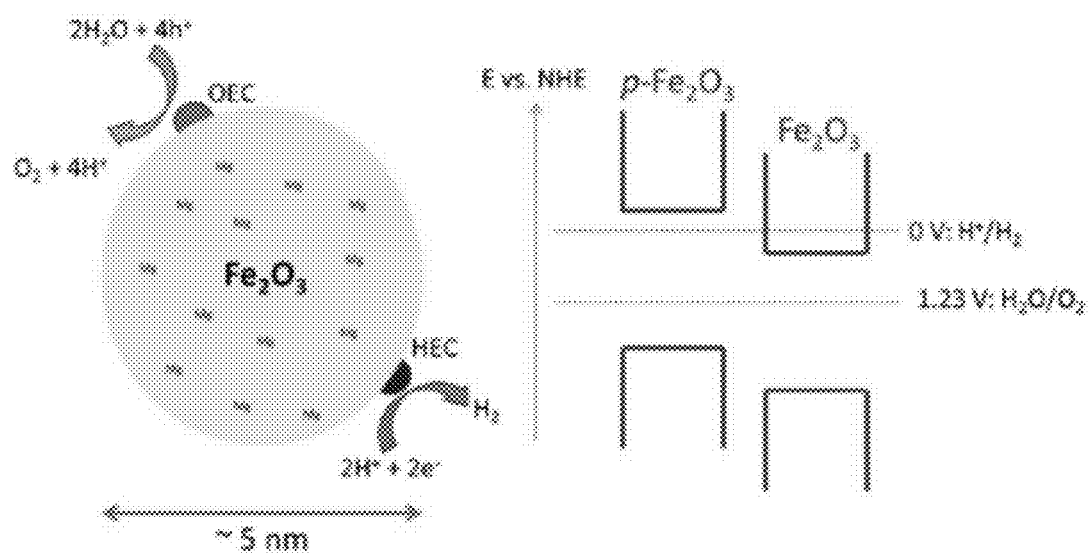
FIG. 10 depicts a schematic of an iron oxide particle for use in photocatalytic water splitting.

Illustrative, non-limiting FIG. 10 presents a schematic of an iron oxide particle according to the present disclosure, and suitable for use in photocatalytic water splitting. Iron oxide is earth-abundant, inexpensive, and absorbs visible light, but the material also presents comparatively poor carrier mobility (causing photogenerated carriers to recombine before they reach the iron oxide/electrolyte interface) and also that the potential of electrons in the iron oxide conduction band is too low to participate in hydrogen evolution. These disadvantages may be overcome by applying small (about 5 nm in diameter) p-type iron oxide particles. By reducing the size of the particles to a diameter of about 5 nm, carriers can reach the surface before recombining. By doping the iron oxide with cations like $Mg^{2+}$ or $Zn^{2+}$, the conduction band edge shifts upwards, enabling photogenerated electrons to participate in hydrogen evolution.

Any of the foregoing catalytic bodies may also comprise a first co-catalyst. This first co-catalyst may be present on exterior surface of the body. It should be understood that this exterior surface of the body may be an exterior surface of the core or, depending on the embodiment, may be an exterior surface of an optional shell, if such a shell (e.g., an oxide shell) is present. The first co-catalyst may be an oxygen evolving catalyst or a hydrogen evolving catalyst. Suitable oxygen evolving catalysts include $RuO_2$, $IrO_2$, gold, palladium, platinum, silver, nickel, NiO, NiFeO, nickel-oxyhydroxide, Ni-borate OEC, Co-borate OEC, Co-phosphate OEC, $Co_3O_4$, CoOx, rhodium, $Rh_xCr_{2-x}O_3$, or any combination thereof. It should be understood, that in some embodiments, the light absorbing material or body performs the function of H2 evolution from water. In some embodiments, one co-catalyst performs O2 evolution, and another co-catalyst effects both light absorption and is also a catalyst for H2 evolution. In some embodiments, the core material acts to produce electrons and electron holes under illumination, and a HEC co-catalyst evolves H2, and a OEC co-catalyst evolves O2. In other embodiments, the core material acts to produce electrons and electron holes under illumination as well as to evolve H2, and a OEC co-catalyst evolves O2. In still other embodiments, the core material acts to produce electrons and electron holes under illumination and evolves O2, and a HEC co-catalyst evolves H2. It should be understood that the core material may thus be a source of electrons and electron holes, a source of electrons and electron holes and H2 evolution, a source of electrons and electron holes and O2 evolution, or even a source of electrons and electron holes and H2 and O2 evolution. A core material that is capable of itself evolving H2 may be supplemented with one or more HEC co-catalysts and optionally one or more OEC catalysts. Similarly, a core material that is capable of itself evolving O2 may be supplemented with one or more OEC co-catalysts and optionally one or more HEC catalysts.

Suitable hydrogen evolving catalysts include platinum, ruthenium, gold, palladium, silver, $RuO_2$, Ni, and alloys thereof, (e.g. NiFe, NiMo, NiMoCd, NiMoZn, and the like) NiO, CoOx, or any combination thereof. In some embodiments, the first co-catalyst may be an oxygen evolving catalyst, and wherein the body further comprises a hydrogen evolving catalyst. Alternatively, the first co-catalyst may be a hydrogen evolving catalyst, and the body further comprises an oxygen evolving catalyst. Without being bound to any particular configuration, a catalytic body may contain from about 1 to 2 weight percent HEC and/or OEC. Catalyst loading may, however, be in the range of from about 0.01 to about 10 or even about 15 weight percent, depending on the user's needs and on other operational parameters. For example, iron oxide particles may be comparatively small (e.g, about 5 nm in diameter), which small size in turn requires that only a modest amount of electrons/holes need to be converted. By contrast, a CdS particle may be comparatively large (e.g, 1 mm in diameter), which particles will in turn absorb more light. Because the surface area of a comparatively larger particle (relative to the volume) is small, more catalyst may be required to process all photogenerated electrons/holes.

Figure 11:
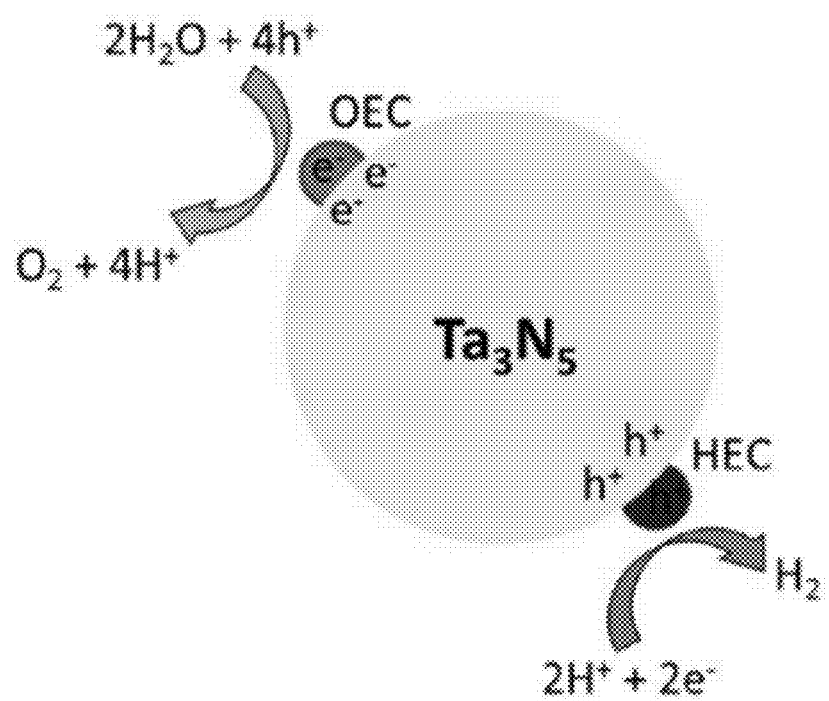
FIG. 11 depicts a schematic of a Ta3N5 particle decorated with both HEC and OEC material.

Illustrative, non-limiting FIG. 11 presents a schematic of an exemplary $Ta_3N_5$ particle decorated with both HEC and OEC material. Existing photocatalytic particles (e.g., $Ta_3N_5$) can facilitate only one of the half-reactions of overall water splitting efficiently (i.e., water oxidation or proton reduction). By decorating such particles by both HEC and OEC material, charge separation is more efficient (reducing recombination), reaction rates are enhanced, and the desired half reactions outcompete undesired half reactions, such as particle dissolution. Accordingly, the disclosed materials present a higher activity for simultaneous hydrogen and oxygen evolution.

The present disclosure also provides methods of evolving hydrogen and oxygen from water. These methods suitably include contacting a catalytic body as described in the present disclosure to a fluid comprising water, and illuminating the catalytic body and water so as to evolve H2, O2, or both. The fluid may be ocean water, river water, rain water, or virtually any other aqueous fluid. The fluid may be pure or may contain pollutants, metals, salts, and the like. It should be understood that these methods encompass the use of multiple particles according to the present disclosure, and that a user may contact water with particles that differ from one another in one or more aspects (e.g., size, material composition).

The user may separate the evolved H2, O2, or both. This separation may be effected, for example, by a condenser or by pressure- or temperature-swing adsorption. Exemplary methods of effecting separation are set forth in U.S. patent application 61/566,078, filed Dec. 2, 2011, "Systems And Methods For Photocatalytic Production Of Hydrogen From Water," the entirety of which is incorporated herein by reference.

The present disclosure also provides methods of evolving H2 and O2 from water. These methods include contacting an iron oxide catalytic body as described elsewhere herein to a fluid comprising water; and illuminating the catalytic body and water so as to evolve H2, O2, or both. The evolution of H2 and O2 is performed at a solar-to-hydrogen efficiency of greater than about 0.1% over a period of at least about 100 hours. The user may separate evolved H2, evolved O2, or both; suitable separation methods are set forth in U.S. patent application No. 61/566,078.

Also provided are methods of forming a catalytic body. These methods include forming a catalytic body comprising one or more core particles of iron oxide (e.g., $\gamma$-$Fe_2O_3$, $\alpha$-$Fe_2O_3$, or both), and the body further comprising a cationic dopant, the one or more particles defining a cross-sectional dimension in the range of from about 0.5 nm to about 50 nm.

Cationic dopant may be introduced during the nucleation of the one or more particles, during the growth of the one or more particles, or both. One may introduce the cationic dopant to a particle precursor material. For instance, one method for synthesizing $\gamma$-$Fe_2O_3$ or $\alpha$-$Fe_2O_3$ particles is to add a solution containing $Fe^{2+}$ and $Fe^{3+}$ ions to an alkaline medium, so as to co-precipitate $Fe_3O_4$ particles (which are oxidized into $\gamma$-$Fe_2O_3$ or $\alpha$-$Fe_2O_3$ in a subsequent step). Doping of the initial $Fe_3O_4$ particles can be achieved by adding a certain amount of dopant ions to the $Fe^{2+}$/$Fe^{3+}$ precursor solution. The dopant may be present in the range of from about 0.1 to about 5 atomic percent. A user may also introduce a cationic dopant by annealing the one or more particles in the presence of the dopant. Doping may, for instance, be achieved by mixing undoped iron oxide powder with the dopant and by subsequent annealing in an oven containing a gaseous atmosphere. Alternatively, an aqueous dispersion to which the dopant is added can be annealed under hydrothermal conditions (e.g. in an autoclave in which temperatures >100° C. can be obtained for aqueous dispersions).

The present disclosure also provides methods. These methods include suspending, under illumination, a catalyst body within a solution that comprises a precursor material for an $O_2$ evolving catalyst, $H_2$ evolving catalyst, the illumination giving rise to photogenerated electrons or holes on the surface of the catalytic body, the photogenerated electrons or holes reducing or oxidizing the precursor material for the $O_2$ evolving catalyst, $H_2$ evolving catalyst, or both so as to result in deposition of $O_2$ evolving catalyst, $H_2$ evolving catalyst, or both on the photo-excited particle.

For the photodeposition process, the catalyst precursor materials (e.g., hexachloroplatinic acid for Pt deposition or $Ni(NO_3)_2$ for Ni/NiO deposition) are suitably dissolved in an aqueous dispersion containing the photocatalytic bodies. The dispersion may be illuminated by a white light source, e.g., a Xe lamp. An advantage of applying both HEC and OEC materials is that charge separation of photogenerated electrons and holes may be more efficient in that holes accumulate on OEC, and electrons on HEC.

The catalyst body may be a catalyst body according to the present disclosure, i.e., one that includes a core portion comprising a material having a bandgap in the range of from about 1.23 eV to about 2.6 eV, the catalytic body being capable of catalytically converting sunlight and water to H2 and O2 with a solar-to-hydrogen efficiency of more than about 0.1% over a period of at least about 100 hours. The catalyst body may include a shell as described elsewhere herein, or may lack such a shell.

The present disclosure also provides systems. These systems suitably include a container configured to contact a catalyst body with water, the container being adapted to permit illumination of the catalyst and water with a source of illumination. The catalyst body is suitably a catalyst body according to the present disclosure. The body may, as described elsewhere herein, include a shell, but the inclusion of such a shell is not a requirement. The catalyst body may be disposed on the surface of a support, such as a porous material. The system may also include a device capable of separating H2 from O2, the device being in fluid communication with the container. Such devices include condensers, materials that preferentially adsorb hydrogen over oxygen or oxygen over hydrogen, and the like. The systems may include a fluidic connection between the container and the device capable of separating H2 from O2. The system may further include a fluidic connection between the device capable of separating H2 from O2 and one or more containers adapted to contain H2, O2, or both.

The container of the system is suitably adapted to permit illumination of the catalyst and water with sunlight. A container may also include a region that is essentially transparent to sunlight. Systems may also include a source of illumination configured to illuminate catalyst and water disposed within the container. Such illumination sources may be white light sources, monochromatic light sources, and the like. Xenon lamps, light-emitting diodes, and the like are suitable illumination sources.

The following examples are intended to illustrate certain embodiments of the present invention, but are not to be construed as limiting and do not exemplify the full scope of the invention.

EXAMPLE 1

The following prophetic example describes photocatalytic production of hydrogen and oxygen gases from water using a colloidal suspension of p/n-doped nanowires or nanorods. The nanowires are comprised of at least one semiconductor material, such that a p/n-junction is formed within the nanowires or nanorods. Upon exposure to electromagnetic radiation, excited electrons travel to one end of the nanowires or nanorod and the corresponding electron hole travels to the other end.

In this example, an iron oxide employed as the semiconductor. Iron oxide semiconductor material is generally stable to corrosion under the conditions for water splitting. In addition, the band positions and band gap of a p/n-junction of an iron oxide is appropriate for (1) efficient absorption of visible light, and (2) the production of hydrogen and oxygen gas from water (e.g., see Leygraf et al., J. Catalysis 1982, 78, 341-351; Turner et al., J. Electrochem Soc. 1984, 131, 1777-1783). The p-type and n-type iron oxide may be formed by doping iron oxide with Mg and Si, respectively, as described previously. Iron oxide nanowires or nanorods can be prepared as described previously (e.g., see Crowley et al., Chem. Rev. 2003, 15, 3518-3522), but using further incorporation of the selected components to be doped. Upon formation of the nanowires or nanorods, the nanowires or nanorods may be exposed to a solution comprising selected metal ionic species and anionic species and exposed to electromagnetic radiation (e.g., sunlight). Excited electrons can travel to the p-type end of the wire, where they can reduce protons to hydrogen. The electron holes can travel to the n-type end of the wire, where they can oxidize water to oxygen.

In some embodiments, a hydrogen evolution and oxygen evolution catalysts may be formed, substantially simultaneously, at the surface of the p:n nanowires or nanorod, respectively. For example, the nanowires or nanorods may be dissolved in a solution containing $Ni^{2+}$ ions and borate buffer electrolyte. In this way, and in the presence of light, a nickel-oxide-borate catalyst can form on the n-type side of the nanowires or nanorod, which can serve as a catalyst for the oxidation of water to oxygen. Similarly, the $Ni^{2+}$ ions can be reduced to Ni metal at the p-type end of the nanowires or nanorod, where the Ni-metal can then serve as a catalyst for the reduction of protons to hydrogen.

In this way, a colloidal suspension of p:n nanowires or nanorods loaded with catalysts for the production of hydrogen and oxygen are readily formed. The "nanoreactors" are comprised of low-cost, earth abundant materials and may operate in buffered borate electrolyte at near neutral pH (pH 9.2). The suspension may be prepared in low-cost containers (i.e. plastic bags) to hold the water and collect the resulting hydrogen and oxygen gases, which may be separated outside of the reactor.

EXAMPLE 2

The following prophetic example describes photocatalytic production of hydrogen and oxygen gases from water using a colloidal suspension of dye-sensitized nanoparticles. Most of the photocatalyst materials explored to date are comprised of metal oxide semiconductors having bandgaps of 3 eV or larger. These materials have proven to be excellent photocatalysts for water oxidation, however their poor absorption of visible light limits the overall efficiency for solar energy conversion. Photoactive dye molecules may be chemically adsorbed to the surface of wide bandgap, metal oxide particles that have been loaded with catalysts for the hydrogen evolution reaction (HER). In this scheme, excitation of the dye molecule promotes the transfer of an electron from the dye to the particle. The electron resides in the semiconductor conduction band, allowing transport of the electron to the hydrogen evolution catalyst. The corresponding electron hole remains on the dye, where it is later consumed by an associated catalytic material. Dye sensitization of $TiO_2$ with polypyridyl complexes of $R^{II}$ has been used for the photoproduction of $H_2$ from protons, with methanol (Kajiwara, T.; Hasimoto, K.; Kawai, T.; Sakata, T. *J. Phys. Chem.* 1982, 86, 4516), and later $I^-$ (Abe, R.; Sayama, K.; Arakawa, H. *Chem. Phys. Leu.* 2003, 379, 230) serving as the electron source. To affect water splitting, the semiconductor and dye molecule should be interfaced with appropriate and selective catalysts for HER and the oxygen evolution reaction (OER), respectively.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:
1. A nanostructure, comprising:
a first region comprising a first material that catalyzes the formation of $O_2$ from water; and
a second region comprising a second material that catalyzes a reduction reaction,
the first and second regions comprising semiconductors, wherein the first region comprises a first type of semiconductor material and the second region comprises a second type of semiconductor material, and wherein the first type of semiconductor material and the second type of semiconductor material comprise the same or different doped iron oxides.

2. The nanostructure of claim 1, wherein the reduction reaction is the formation of $H_2$ from water.

3. The nanostructure of claim 1, wherein the reduction reaction comprises the reduction of $CO_2$.

4. The nanostructure of claim 1, wherein the reduction reaction comprises the reduction of $N_2$.

5. The nanostructure of claim 1, wherein the nanostructure further comprises at least one photosensitizing agent.

6. The nanostructure of claim 1, wherein the nanostructure comprises at least one surface-presenting catalytic material.

7. The nanostructure of claim 1, wherein the first region comprises an n-type semiconductor material and the second region comprises a p-type semiconductor material.

8. The nanostructure of claim 7, wherein a p/n-junction is present between the first region and the second region.

9. The nanostructure of claim 1, wherein a heterojunction is present between the first region and the second region.

10. The nanostructure of claim 1, wherein the first type of semiconductor material and the second type of semiconductor material further comprise the same or different metal oxides and/or metal hydroxides.

11. The nanostructure of claim 1, wherein the first region comprises a first type of surface-presenting catalytic material and/or the second region comprises a second type of surface-presenting catalytic material.

12. The nanostructure of claim 11, wherein the first surface-presenting catalytic material comprises a metal ionic species in an oxidation state greater than zero and one or more anionic species.

13. The nanostructure of claim 11, wherein the second surface-presenting catalytic material comprises the metal ionic species in an oxidation state of zero.

14. The nanostructure of claim 11, wherein the first surface-presenting catalytic material comprises a metal oxide.

15. The nanostructure of claim 11, wherein the second surface-presenting catalytic material comprises a metal.

16. The nanostructure of claim 15, wherein the first and the second surface-presenting catalytic materials comprise cobalt, nickel, or both.

17. The nanostructure of claim 11, wherein the first catalytic surface-presenting material further comprises one or more anionic species.

18. The nanostructure of claim 17, wherein the anionic species comprise phosphorus, boron, or both.

19. The nanostructure of claim 11, further comprising a bulk material, wherein at least one of the first type of surface-presenting catalytic material or the second type of surface-presenting catalytic material is different than the bulk material.

20. The nanostructure of claim 19, wherein the first type of surface-presenting catalytic material is associated with the bulk comprising the first type of semiconductor material and the second type of catalytic material is associated with the bulk comprising the second type of semiconductor material.

21. The nanostructure of claim 19, wherein the bulk material comprises a semiconductor material.

22. The nanostructure of claim 21, wherein the bulk material comprises a first type of semiconductor material and a second type of semiconductor material.

23. The nanostructure of claim 22, wherein the first bulk type of semiconductor material comprises an n-type semiconductor material and the second bulk type of semiconductor material comprises a p-type semiconductor material.

24. The nanostructure of claim 18, wherein the anionic species is selected from the group comprising forms of phosphate, forms of sulphate, forms of carbonate, forms of arsenate, forms of phosphite, forms of silicate, or forms of borate.

25. The nanostructure of claim 1, wherein the nanostructure comprises a nanowire, a nanorod, a nanotube, a nanoparticle, or any combination thereof.

26. The nanostructure of claim 1, wherein a surface-presenting second catalytic material is associated with the second region.

27. The nanostructure of claim 26, wherein the first surface-presenting catalytic material and the surface-presenting second catalytic material comprises cobalt and/or nickel.

28. A method, comprising:
exposing, to electromagnetic radiation, a plurality of nanostructures, at least one of which is a nanostructure according to claim 1; and
catalyzing the formation of $O_2$ from water.

29. A method, comprising:
exposing, to electromagnetic radiation, a plurality of nanostructures, at least one of which is a nanostructure according to claim 1; and
effecting a reduction reaction involving at least some of the nanostructures.

30. A method of forming a system, comprising:
providing a semiconductor substrate, comprising one or more nanostructures that comprises
a first region comprising a first material that catalyzes the formation of $O_2$ from water, and
a second region comprising a second material that catalyzes a reduction reaction,
the first and second regions comprising semiconductors,
wherein the first region comprises a first type of semiconductor material and the second region comprises a second type of semiconductor material,
and wherein the first type of semiconductor material and the second type of semiconductor material comprise the same or different doped iron oxides;
exposing the semiconductor substrate to a solution comprising at least one metal ionic species and an anionic species; and
exposing the semiconductor substrate to electromagnetic radiation so as to form a first surface-presenting catalytic material comprising a reduced metal species in a first region and a second surface presenting catalytic material comprising an oxidized metal species in a second region.

31. A nanostructure, comprising:
an iron oxide and comprising a first, n-type region and a second, p-type region.

32. The nanostructure of claim 31, wherein the n-type region comprises a first material that catalyzes the formation of $O_2$ from water.

33. The nanostructure of claim 31, wherein the p-type region comprises a second material that catalyzes a reduction reaction.

34. The nanostructure of claim 31, wherein a first surface-presenting catalytic material is associated with the first region.

35. The nanostructure of claim 34, wherein the first catalytic material further comprises anionic species comprising phosphorus and/or boron.

36. The nanostructure of claim 31, wherein the nanostructure comprises a nanorod, a nanowire, a nanotube, or a nanoparticle.

37. A photocatalytic device comprising a plurality of nanostructures according to claim 31.

38. The photocatalytic device of claim 37, wherein the plurality of nanostructures is provided in a solution.

39. The nanostructure of claim 31, wherein a p/n-junction is present between the first, n-type region and a second, p-type region.

40. A composition comprising a catalytic material that catalyzes the production of $H_2$ from water in the presence of $O_2$ the catalytic material comprising one or more nanostructures that comprises a first region comprising a first material that catalyzes the formation of $O_2$ from water, and a second region comprising a second material that catalyzes a reduction reaction, the first and second regions comprising semiconductors, wherein the first region comprises a first type of semiconductor material and the second region comprises a second type of semiconductor material, and wherein the first type of semiconductor material and the second type of semiconductor material comprise the same or different doped iron oxides;

the catalytic material being capable of catalyzing the production of $H_2$ at a current density at least 1000 times greater than the current density for the reduction of $O_2$ at the catalytic material, at overpotentials less negative than $-400$ mV for the production of $H_2$ from water.

41. A device for solar energy conversion, the device comprising the composition described in claim 40.

* * * * *